(12) United States Patent
Yanaka et al.

(10) Patent No.: US 11,753,500 B2
(45) Date of Patent: Sep. 12, 2023

(54) EPOXY RESIN SOLUTION

(71) Applicant: UNITIKA LTD., Amagasaki (JP)

(72) Inventors: Ayumi Yanaka, Uji (JP); Yumeto Fukubayashi, Uji (JP); Takatoshi Murakami, Uji (JP)

(73) Assignee: UNITIKA LTD., Amagasaki (JP)

( * ) Notice: Subject to any disclaimer, the term of this patent is extended or adjusted under 35 U.S.C. 154(b) by 121 days.

(21) Appl. No.: 17/426,228

(22) PCT Filed: Jan. 21, 2020

(86) PCT No.: PCT/JP2020/001838
§ 371 (c)(1),
(2) Date: Jul. 28, 2021

(87) PCT Pub. No.: WO2020/158493
PCT Pub. Date: Aug. 6, 2020

(65) Prior Publication Data
US 2022/0106435 A1    Apr. 7, 2022

(30) Foreign Application Priority Data

Jan. 31, 2019 (JP) ................................. 2019-016291
Jun. 11, 2019 (JP) ................................. 2019-108755

(51) Int. Cl.
| | |
|---|---|
| *C08G 59/40* | (2006.01) |
| *C08G 59/42* | (2006.01) |
| *C08L 63/00* | (2006.01) |
| *C08J 5/24* | (2006.01) |
| *B32B 27/38* | (2006.01) |
| *C08G 59/02* | (2006.01) |
| *C08G 59/22* | (2006.01) |
| *C08G 59/32* | (2006.01) |
| *C08J 5/04* | (2006.01) |

(52) U.S. Cl.
CPC ....... *C08G 59/4042* (2013.01); *C08G 59/022* (2013.01); *C08G 59/22* (2013.01); *C08G 59/32* (2013.01); *C08G 59/4238* (2013.01); *C08J 5/04* (2013.01); *C08J 5/249* (2021.05); *C08L 63/00* (2013.01); *C08J 2367/00* (2013.01); *C08L 2201/08* (2013.01); *C08L 2203/20* (2013.01)

(58) Field of Classification Search
None
See application file for complete search history.

(56) References Cited

U.S. PATENT DOCUMENTS

| | | | | |
|---|---|---|---|---|
| 4,076,869 A | * | 2/1978 | Flynn ....................... | C08J 3/21 |
| | | | | 427/430.1 |
| 4,244,857 A | * | 1/1981 | Serafini ................ | C07D 209/48 |
| | | | | 548/461 |
| 4,603,180 A | * | 7/1986 | Nakajima ............... | C08G 59/12 |
| | | | | 525/930 |
| 4,871,832 A | | 10/1989 | Saito et al. | |
| 5,182,392 A | * | 1/1993 | Tanisake ............... | C07D 209/48 |
| | | | | 548/520 |
| 5,693,822 A | * | 12/1997 | Hodgkin ............... | C08L 79/085 |
| | | | | 548/423 |
| 2005/0065295 A1 | * | 3/2005 | Christiansen ........ | C09D 163/00 |
| | | | | 525/523 |
| 2021/0009749 A1 | | 1/2021 | Wakioka et al. | |
| 2021/0130614 A1 | | 5/2021 | Wakioka et al. | |

FOREIGN PATENT DOCUMENTS

| | | | | |
|---|---|---|---|---|
| JP | 60-77652 A | 5/1985 | | |
| JP | 62-29584 A | 2/1987 | | |
| JP | 03275669 A | * 12/1991 | .......... | C07D 209/48 |
| JP | 9-268223 A | 10/1997 | | |
| JP | 11-130859 A | 5/1999 | | |
| JP | 2006-307091 A | 11/2006 | | |
| JP | 2011-208126 A | 10/2011 | | |
| JP | 2012-6992 A | 1/2012 | | |
| JP | 2012-25894 A | 2/2012 | | |
| JP | 2012-111930 A | 6/2012 | | |
| JP | 2013-237844 A | 11/2013 | | |
| JP | 2020-7397 A | 1/2020 | | |
| WO | WO 2018/139559 A1 | 8/2018 | | |
| WO | WO 2019/188436 A1 | 10/2019 | | |

OTHER PUBLICATIONS

Machine translation of JP-03275669-A (no date).*
International Preliminary Report on Patentability and English translation of the Written Opinion of the International Searching Authority for PCT/JP2020/001838, dated Jul. 27, 2021.
European Office Action for European Application No. 20749306.5, dated Aug. 31, 2022.
Extended European Search Report for corresponding European Application No. 20749306.5, dated Jan. 18, 2022.
Japanese Office Action for corresponding Japanese Application No. 2020-007226, dated Apr. 25, 2023, with English translation.
Corresponding Chinese Patent Application No. 202080011325.3 dated Feb. 17, 2023.

* cited by examiner

*Primary Examiner* — Michael J Feely
(74) *Attorney, Agent, or Firm* — Birch, Stewart, Kolasch & Birch, LLP

(57) ABSTRACT

The present invention provides an epoxy resin solution, from which an epoxy resin-cured product adequately excellent in heat-resisting properties and dielectric properties can be obtained with adequately good working properties ensured. The present invention relates to an epoxy resin solution containing at least a curing agent and an epoxy resin mixed in an organic solvent, wherein the curing agent comprises an imide group-containing curing agent having 1-4 imide groups and 2-4 glycidyl group-reactive functional groups in a molecule.

10 Claims, No Drawings

EPOXY RESIN SOLUTION

TECHNICAL FIELD

The present invention relates to an epoxy resin solution, and more particularly to an epoxy resin solution containing an imide group-containing curing agent.

BACKGROUND ART

Epoxy resin-cured products made of an epoxy resin and its curing agent have excellent thermal, mechanical and electrical properties, and are industrially and widely used mainly for electric and electronic materials such as insulating materials for printed wiring boards or semiconductor sealing materials.

In particular, in recent years, larger current, miniaturization, and higher efficiency are further required in the field of power semiconductors typified by vehicle-mounted power modules, and the shift to silicon carbide (SiC) semiconductors is progressing. Since SiC semiconductors can operate under higher temperature conditions than conventional silicon (Si) semiconductors, semiconductor sealing materials used in the SiC semiconductors are also required to have higher heat-resisting properties than ever before.

On the other hand, in the technical field of insulating materials for printed wiring boards, resin materials having a low dielectric constant and low dielectric loss tangent with low signal transmission loss are required for higher-speed and higher-frequency signals in electronic devices.

As described above, the epoxy resin-cured products in the field of electric and electronic materials is required to have higher heat resistance, lower dielectric constant, and lower dielectric loss tangent. In general, an increase of crosslink density is effective for improving the heat-resisting properties of the epoxy resin-cured products. On the other hand, in order to reduce the dielectric constant and the dielectric loss tangent, it is required to reduce hydroxy groups generated at the crosslinking point during curing. However, it is generally known that when the crosslink density is increased in order to improve the heat-resisting properties, a large number of hydroxy groups are generated to deteriorate dielectric properties, and it has thus been difficult to achieve both the heat-resisting properties and the dielectric properties at the same time.

As a method for achieving both the heat-resisting properties and the dielectric properties, a method using an active ester, and a method of introducing a rigid skeleton such as cyclopentadiene, naphthalene, or an imide group into an epoxy cured product are known.

Of these, as the method of introducing an imide group into an epoxy cured product, a method of mixing a polyamide-imide, a polyimide (solvent-soluble) or a polyamic acid (a precursor of polyimide) containing an imide group with an epoxy resin to cure may be used, but the solution before curing becomes highly viscous, disadvantageously resulting in inferior working properties.

Therefore, a technique is disclosed in which a heat-resistant powder obtained by formulating an imide epoxy resin that has been obtained by allowing an imide group-containing dicarboxylic acid and an epoxy compound to react, with a curing agent is powder-coated and cured (Patent Literature 1). Further, a technique is disclosed in which an aromatic polyesterimide varnish obtained by allowing an aromatic diimide dicarboxylic acid that has been obtained by allowing a diamine having three or more aromatic rings and trimellitic anhydride to react, and a diepoxy compound to react, is applied, and the varnish thus applied is then dried and cured (Patent Literature 2). CITATIONS LIST

PATENT LITERATURES

Patent Literature 1: JP S60-77652 A
Patent Literature 2: JP H09-268223 A

SUMMARY OF INVENTION

Problems to be Solved by the Invention

In the technique of Patent Literature 1, specifically, the reaction between the imide group-containing dicarboxylic acid and the epoxy compound is performed in the absence of a solvent, and the obtained imide epoxy resin and the curing agent are formulated to perform powder coating. Therefore, the reaction between the imide group-containing dicarboxylic acid and the epoxy compound is insufficient, resulting in small effect of improving the heat-resisting properties by introducing the rigid skeleton.

In the technique of Patent Literature 2, specifically, the aromatic polyesterimide (varnish) as a reaction product of the aromatic diimide dicarboxylic acid and the diepoxy compound is applied, and then dried and cured. Therefore, the varnish before curing becomes highly viscous, disadvantageously resulting in inferior working properties.

An object of the present invention is to provide an epoxy resin solution, from which an epoxy resin-cured product adequately excellent in heat-resisting properties and dielectric properties can be obtained with adequately good working properties ensured.

In the present specification, dielectric properties refer to performance capable of sufficiently reducing both the dielectric constant and the dielectric loss tangent.

The gists of the present invention are as follows.
<1> An epoxy resin solution containing at least a curing agent and an epoxy resin mixed in an organic solvent, wherein the curing agent comprises an imide group-containing curing agent having 1 to 4 imide groups and 2 to 4 glycidyl group-reactive functional groups in a molecule.
<2> The epoxy resin solution of <1>, wherein the glycidyl group-reactive functional group is a hydroxyl group and/or a carboxyl group.
<3> The epoxy resin solution of <1> or <2>, wherein the imide group-containing curing agent is selected from the group consisting of a diimide dicarboxylic acid-based compound, a diimide tricarboxylic acid-based compound, a diimide tetracarboxylic acid-based compound, a monoimide dicarboxylic acid-based compound, a monoimide tricarboxylic acid-based compound, a triimide tricarboxylic acid-based compound, a tetraimide tetracarboxylic acid-based compound, an amide group-containing diimide dicarboxylic acid-based compound, an amide group-containing monoimide dicarboxylic acid-based compound, an amide group-containing monoimide tetracarboxylic acid-based compound, a diimide dicarboxymonohydroxy-based compound, a diimide dicarboxydihydroxy-based compound, and a triimide tricarboxymonohydroxy-based compound.
<4> The epoxy resin solution of <3>, wherein
the diimide dicarboxylic acid-based compound is a compound in which two molecules of a tricarboxylic acid anhydride component are allowed to react with one molecule of a diamine component to thereby form two imide groups, or a compound in which two molecules of a mono-aminomonocarboxylic acid component are allowed to react with one molecule of a tetracarboxylic dianhydride component to thereby form two imide groups, the diimide tricarboxylic acid-based compound is a compound in which two molecules of a tricarboxylic acid anhydride component are allowed to react with one molecule of a diaminomonocarboxylic acid component to thereby form two imide groups, the diimide tetracarboxylic acid-based compound is a compound in which two molecules of a monoaminodicarboxylic acid component are allowed to react with one molecule of a tetracarboxylic dianhydride component to thereby form two imide groups, the monoimide dicarboxylic acid-based compound is a compound in which one molecule of a monoaminomonocarboxylic acid component is allowed to react with one molecule of a tricarboxylic acid anhydride component to thereby form one imide group, the monoimide tricarboxylic acid-based compound is a compound in which one molecule of a monoaminodicarboxylic acid component is allowed to react with one molecule of a tricarboxylic acid anhydride component to thereby form one imide group, the triimide tricarboxylic acid-based compound is a compound in which three molecules of a tricarboxylic acid anhydride component are allowed to react with one molecule of a triamine component to thereby form three imide groups, the tetraimide tetracarboxylic acid-based compound is a compound in which four molecules of a tricarboxylic acid anhydride component are allowed to react with one molecule of a tetraamine component to thereby form four imide groups, the amide group-containing diimide dicarboxylic acid-based compound is a compound in which two molecules of a tricarboxylic acid anhydride component are allowed to react with one molecule of an amide group-containing diamine component to thereby form two imide groups, the amide group-containing monoimide dicarboxylic acid-based compound is a compound in which two molecules of a monoaminomonocarboxylic acid component is allowed to react with one molecule of a tricarboxylic acid anhydride halide to thereby form one imide group and one amide group, the amide group-containing monoimide tetracarboxylic acid-based compound is a compound in which two molecules of a monoaminodicarboxylic acid component is allowed to react with one molecule of a tricarboxylic acid anhydride halide to thereby form one imide group and one amide group, the diimide dicarboxymonohydroxy-based compound is a compound in which two molecules of a tricarboxylic acid anhydride component are allowed to react with one molecule of a monohydroxydiamine component to thereby form two imide groups, the diimide dicarboxydihydroxy-based compound is a compound in which two molecules of a tricarboxylic acid anhydride component are allowed to react with one molecule of a dihydroxydiamine component to thereby form two imide groups, and the triimide tricarboxymonohydroxy-based compound is a compound in which three molecules of a tricarboxylic acid anhydride component are allowed to react with one molecule of a monohydroxytriamine component to thereby form three imide groups.

<5> The epoxy resin solution of any one of <1> to <4>, wherein the imide group-containing curing agent is a diimide dicarboxylic acid-based compound having a structure of following general formula (1) or (2):

[Chem. 1]

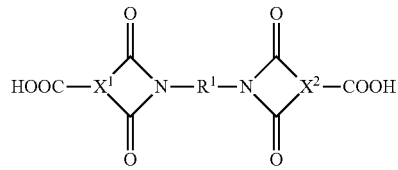

(1)

[In the general formula (1), $X^1$ and $X^2$ each independently represent a structure derived from an aromatic tricarboxylic acid anhydride component, an alicyclic tricarboxylic acid anhydride component, or an aliphatic tricarboxylic acid anhydride component; and $R^1$ represents a structure derived from an aromatic diamine component containing 1 to 2 aromatic rings, an alicyclic diamine component, or an aliphatic diamine component];

[Chem. 2]

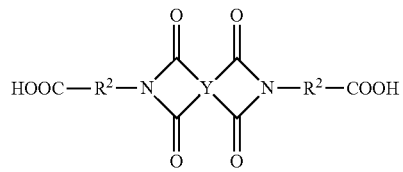

(2)

[In the general formula (2), Y represents a structure derived from an aromatic tetracarboxylic dianhydride component, an alicyclic tetracarboxylic dianhydride component, or an aliphatic tetracarboxylic dianhydride component; and two $R^2$s each independently represent a structure derived from an aromatic monoaminomonocarboxylic acid component, an alicyclic monoaminomonocarboxylic acid component, or an aliphatic monoaminomonocarboxylic acid component].

<6> The epoxy resin solution of any one of <1> to <5>, wherein the epoxy resin has two or more epoxy groups in one molecule.

<7> The epoxy resin solution of any one of <1> to <6>, wherein the organic solvent is a non-halogenated solvent.

<8> The epoxy resin solution of any one of <1> to <7>, wherein a formulating amount of the imide group-containing curing agent is such an amount that the imide group-containing curing agent has a functional group equivalent of 0.5 to 1.5 in terms of equivalent ratio to an epoxy equivalent of the epoxy resin.

<9> The epoxy resin solution of any one of <1> to <8>, wherein a total formulating amount of the imide group-containing curing agent and the epoxy resin is from 30 to 90% by mass based on a total amount of the epoxy resin solution.

<10> The epoxy resin solution of any one of <1> to <9>, wherein a reaction rate of a glycidyl group contained in the epoxy resin in the epoxy resin solution is 10% or less.

<11> The epoxy resin solution of any one of <1> to <10>, wherein the curing agent comprises only the imide group-containing curing agent.

<12> The epoxy resin solution of any one of <1> to <11>, wherein the imide group-containing curing agent and the epoxy resin are dissolved in the organic solvent.

<13> An epoxy resin-cured product, being a cured product of the imide group-containing curing agent and the epoxy resin contained in the epoxy resin solution of any one of <1> to <11>.
<14> The epoxy resin-cured product of <13>, wherein the epoxy resin-cured product is contained in electric and electronic components.
<15> A prepreg, wherein the epoxy resin solution of any one of <1> to <11> is impregnated into or applied to a reinforcing fiber cloth.
<16> A laminated body, comprising the prepreg of <15> being laminated.

Effects of the Invention

According to the epoxy resin solution of the present invention, an epoxy resin-cured product adequately excellent in heat-resisting properties and dielectric properties can be obtained with adequately good working properties ensured.

MODES FOR CARRYING OUT THE INVENTION

<Epoxy Resin Solution>
The epoxy resin solution of the present invention is prepared by mixing at least an imide group-containing curing agent and an epoxy resin with an organic solvent. Specifically, in the epoxy resin solution of the present invention, the imide group-containing curing agent and the epoxy resin are dissolved in the organic solvent, and at least the imide group-containing curing agent, the epoxy resin and the organic solvent are uniformly mixed at the molecular level. Dissolution means that a solute is uniformly mixed in a solvent at the molecular level. A solution is a state in which a solute is uniformly mixed in a solvent at a molecular level, and is a mixed liquid in which a solute is dissolved in a solvent, for example, at normal temperature (25° C.) and normal pressure (101.325 kPa) so that it can be seen transparent with the naked eye.

[Curing Agent]
The curing agent contained in the epoxy resin solution of the present invention contains an imide group-containing curing agent.

The imide group-containing curing agent has 1 to 4 imide groups and 2 to 4 glycidyl group-reactive functional groups in the molecule. The glycidyl group-reactive functional group is a functional group having reactivity with a glycidyl group, and examples thereof include a carboxyl group and a hydroxyl group. The 2 to 4 glycidyl group-reactive functional groups may be each independently selected, and for example, all of the glycidyl group-reactive functional groups may be the same functional group, or some of the glycidyl group-reactive functional groups and the remaining glycidyl group-reactive functional groups may be functional groups different from each other.

Examples of the imide group-containing curing agent include a diimide dicarboxylic acid-based compound, a diimide tricarboxylic acid-based compound, a diimide tetracarboxylic acid-based compound, a monoimide dicarboxylic acid-based compound, a monoimide tricarboxylic acid-based compound, a triimide tricarboxylic acid-based compound, a tetraimide tetracarboxylic acid-based compound, an amide group-containing diimide dicarboxylic acid-based compound, an amide group-containing monoimide dicarboxylic acid-based compound, an amide group-containing monoimide tetracarboxylic acid-based compound, a diimide dicarboxymonohydroxy-based compound, a diimide dicarboxydihydroxy-based compound, and a triimide tricarboxymonohydroxy-based compound. The imide group-containing curing agent may be one or more imide group-containing curing agents selected from these groups.

From the viewpoint of further improving heat-resisting properties and dielectric properties, a preferred imide group-containing curing agent is one or more imide group-containing curing agents selected from the group consisting of a diimide dicarboxylic acid-based compound, a diimide tricarboxylic acid-based compound, a diimide tetracarboxylic acid-based compound, a monoimide dicarboxylic acid-based compound, a monoimide tricarboxylic acid-based compound, a triimide tricarboxylic acid-based compound, a tetraimide tetracarboxylic acid-based compound, an amide group-containing diimide dicarboxylic acid-based compound, an amide group-containing monoimide dicarboxylic acid-based compound, an amide group-containing monoimide tetracarboxylic acid-based compound, a diimide dicarboxymonohydroxy-based compound, a diimide dicarboxydihydroxy-based compound, and a triimide tricarboxymonohydroxy-based compound.

From the viewpoint of further improving heat-resisting properties and dielectric properties, more preferred imide group-containing curing agents are a diimide dicarboxylic acid-based compound containing an aromatic tricarboxylic acid anhydride component (particularly only an aromatic tricarboxylic acid anhydride component) as a tricarboxylic acid anhydride component and containing an aromatic diamine component (particularly only an aromatic diamine component) as a diamine component, and a diimide dicarboxylic acid-based compound containing an aromatic tetracarboxylic dianhydride component (particularly only an aromatic tetracarboxylic dianhydride component) as a tetracarboxylic dianhydride component and containing an aromatic monoaminomonocarboxylic acid component (particularly only an aromatic monoaminomonocarboxylic acid component) as a monoaminomonocarboxylic acid component, as described later.

The molecular weight of the imide group-containing curing agent is not particularly limited, and is preferably from 200 to 1100, more preferably from 300 to 1000, even more preferably from 400 to 900, particularly preferably from 300 to 900, from the viewpoint of further improving heat-resisting properties and dielectric properties.

The functional group equivalent of the imide group-containing curing agent is not particularly limited, and is preferably from 50 to 500, more preferably from 80 to 400, even more preferably from 100 to 400, particularly preferably from 200 to 400, from the viewpoint of further improving heat-resisting properties and dielectric properties.

The formulating amount of the imide group-containing curing agent in the curing agent is not particularly limited, and is preferably 50% by mass or more, more preferably 80% by mass or more, even more preferably 90% by mass or more, most preferably 100% by mass, based on the total amount of the curing agent, from the viewpoint of further improving heat-resisting properties and dielectric properties. When the formulating amount of the imide group-containing curing agent is 100% by mass based on the total amount of the curing agent, it means that the curing agent is composed only of the imide group-containing curing agent. When two or more kinds of imide group-containing curing agents are formulated, the total formulating amount thereof may be within the above range.

(Diimide Dicarboxylic Acid-Based Compound)

A diimide dicarboxylic acid-based compound can be produced as follows. Using a tricarboxylic acid anhydride component and a diamine component or using a tetracarboxylic dianhydride component and a monoaminomonocarboxylic acid component as the raw material compounds, a reaction between functional groups is performed to thereby produce an amic acid-based compound, and the amic acid-based compound is then subjected to an imidization reaction. Here, the reaction between functional groups may be performed in a solution or in a solid phase state, and the production method is not particularly limited. The diimide dicarboxylic acid-based compound is a compound having two imide groups and two carboxyl groups in one molecule. The diimide dicarboxylic acid-based compound does not have an amide group.

The diimide dicarboxylic acid-based compound using a tricarboxylic acid anhydride component and a diamine component is a compound in which two molecules of the tricarboxylic acid anhydride component are allowed to react with one molecule of the diamine component to thereby form two imide groups, and specifically, is a diimide dicarboxylic acid-based compound having a structure of the general formula (1).

[Chem. 3]

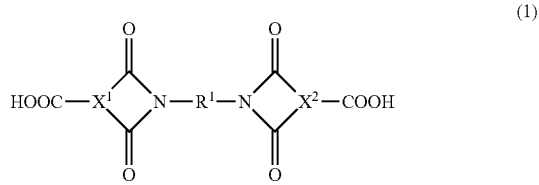

(1)

In the general formula (1), $X^1$ and $X^2$ each independently represent a structure derived from a tricarboxylic acid anhydride component to be described later (e.g., an aromatic tricarboxylic acid anhydride component, an alicyclic tricarboxylic acid anhydride component, or an aliphatic tricarboxylic acid anhydride component).

$R^1$ represents a structure derived from a diamine component to be described later (e.g., an aromatic diamine component (particularly an aromatic diamine component containing 1 to 2 aromatic rings in one molecule), an alicyclic diamine component, or an aliphatic diamine component).

In the production of a diimide dicarboxylic acid-based compound using a tricarboxylic acid anhydride component and a diamine component, the diamine component is usually used in a molar amount of about 0.5 times, for example 0.1 to 0.7 times, preferably 0.3 to 0.7 times, more preferably 0.4 to 0.6 times, even more preferably 0.45 to 0.55 times that of the tricarboxylic acid anhydride component.

The tricarboxylic acid anhydride component capable of constituting the diimide dicarboxylic acid-based compound includes an aromatic tricarboxylic acid anhydride component containing an aromatic ring, an alicyclic tricarboxylic acid anhydride component containing an aliphatic ring but not an aromatic ring, and an aliphatic tricarboxylic acid anhydride component that does not contain an aromatic ring and an alicyclic ring. The tricarboxylic acid anhydride component may contain an ether group and/or a thioether group, and/or one or more hydrogen atoms may be substituted with a halogen atom (e.g., fluorine atom, chlorine atom, and bromine atom). The acid halide component of the tricarboxylic acid anhydride component is a compound in which the OH group of the carboxyl group is substituted with a halogen atom in the tricarboxylic acid anhydride component.

Examples of the aromatic tricarboxylic acid anhydride component include trimellitic anhydride and 1,2,4-naphthalene tricarboxylic acid anhydride. One of these may be used alone, or two or more thereof may be used as a mixture.

Examples of the alicyclic tricarboxylic acid component include 1,2,3-cyclohexanetricarboxylic acid anhydride and 1,2,4-cyclohexanetricarboxylic acid anhydride. One of these may be used alone, or two or more thereof may be used as a mixture.

Examples of the aliphatic tricarboxylic acid anhydride component include 3-carboxymethyl glutaric acid anhydride, 1,2,4-butane tricarboxylic acid-1,2-anhydride, and cis-propene-1,2,3-tricarboxylic acid-1,2-anhydride. One of these may be used alone, or two or more thereof may be used as a mixture.

From the viewpoint of heat-resisting properties and dielectric properties of the diimide dicarboxylic acid-based compound and the epoxy resin-cured product obtained using such compound, the tricarboxylic acid anhydride component of the diimide dicarboxylic acid-based compound preferably contains an aromatic tricarboxylic acid anhydride component and/or an alicyclic tricarboxylic acid anhydride component, more preferably an aromatic tricarboxylic acid anhydride component.

From the viewpoint of further improving the heat-resisting properties and dielectric properties of the diimide dicarboxylic acid-based compound and the epoxy resin-cured product obtained using such compound, the tricarboxylic acid anhydride component of the diimide dicarboxylic acid-based compound preferably contains only an aromatic tricarboxylic acid anhydride component and/or an alicyclic tricarboxylic acid anhydride component, more preferably only an aromatic tricarboxylic acid anhydride component.

From the viewpoint of solubility of the diimide dicarboxylic acid-based compound, among the above-mentioned tricarboxylic acid anhydride components, it is preferable to use an alicyclic tricarboxylic acid anhydride component and/or an aliphatic tricarboxylic acid anhydride component as the tricarboxylic acid anhydride component of the diimide dicarboxylic acid-based compound.

From the viewpoint of further improving the solubility of the diimide dicarboxylic acid-based compound, among the above-mentioned tricarboxylic acid anhydride components, it is preferable to use only an alicyclic tricarboxylic acid anhydride component and/or an aliphatic tricarboxylic acid anhydride component as the tricarboxylic acid anhydride component of the diimide dicarboxylic acid-based compound.

From the viewpoint of non-coloring properties of the diimide dicarboxylic acid-based compound and the epoxy resin-cured product obtained using such compound, among the above-mentioned tricarboxylic acid anhydride components, the tricarboxylic acid anhydride component of the diimide dicarboxylic acid-based compound preferably contains an alicyclic tricarboxylic acid anhydride component and/or an aliphatic tricarboxylic acid anhydride component, more preferably an alicyclic tricarboxylic acid anhydride component.

From the viewpoint of further improving the non-coloring properties of the diimide dicarboxylic acid-based compound and the epoxy resin-cured product obtained using such compound, among the above-mentioned tricarboxylic acid anhydride components, the tricarboxylic acid anhydride component of the diimide dicarboxylic acid-based compound preferably contains only an alicyclic tricarboxylic acid anhydride component and/or an aliphatic tricarboxylic acid anhydride component, more preferably only an alicyclic tricarboxylic acid anhydride component.

From the viewpoint of versatility, among the above-mentioned tricarboxylic acid anhydride components, the tricarboxylic acid anhydride component of the diimide dicarboxylic acid-based compound preferably contains one or more compounds selected from trimellitic anhydride and 1,2,4-cyclohexanetricarboxylic acid anhydride.

From the viewpoint of further improving the versatility, among the above-mentioned tricarboxylic acid anhydride components, the tricarboxylic acid anhydride component of the diimide dicarboxylic acid-based compound preferably contains only one or more compounds selected from trimellitic anhydride and 1,2,4-cyclohexanetricarboxylic acid anhydride.

The diamine component capable of constituting the diimide dicarboxylic acid-based compound includes an aromatic diamine component containing an aromatic ring, an alicyclic diamine component containing an aliphatic ring but not an aromatic ring, and an aliphatic diamine component that does not contain an aromatic ring and an alicyclic ring. The diamine component may contain an ether group and/or a thioether group, and/or one or more hydrogen atoms may be substituted with a halogen atom (e.g., fluorine atom, chlorine atom, and bromine atom). The diamine component may have a side chain.

Examples of the aromatic diamine component include m-phenylenediamine, p-phenylenediamine, 4,4'-diaminodiphenyl ether, 3,4'-diaminodiphenyl ether, 4,4'-diaminobenzanilide, 1,3-bis(4-aminophenoxy)benzene, 1,4-bis(4-aminophenoxy)benzene, 2,2-bis[4-(4-aminophenoxy)phenyl]propane, bis(4-aminophenyl)sulfone, 9,9-bis(4-aminophenyl)fluorene, meta-xylenediamine, 4,4'-bis(3-aminophenoxy)biphenyl, 4,4'-bis(4-aminophenoxy)biphenyl bis[4-(4-aminophenoxy)phenyl]sulfone, and analogs of the above-mentioned diamines. One of these may be used alone, or two or more thereof may be used as a mixture.

Examples of the alicyclic diamine component include trans-1,4-cyclohexanediamine 4,4'-methylenebis(cyclohexylamine), and 1,4-bis(aminomethyl)cyclohexane. One of these may be used alone, or two or more thereof may be used as a mixture.

Examples of the aliphatic diamine component include hexamethylenediamine, 1,10-diaminodecane, and 1,12-diaminododecane. One of these may be used alone, or two or more thereof may be used as a mixture.

From the viewpoint of heat-resisting properties and dielectric properties of the diimide dicarboxylic acid-based compound and the epoxy resin-cured product obtained using such compound, the diamine component of the diimide dicarboxylic acid-based compound preferably contains an aromatic diamine component and/or an alicyclic diamine component, more preferably an aromatic diamine component.

From the viewpoint of further improving the heat-resisting properties and dielectric properties of the diimide dicarboxylic acid-based compound and the epoxy resin-cured product obtained using such compound, the diamine component of the diimide dicarboxylic acid-based compound preferably contains only an aromatic diamine component and/or an alicyclic diamine component, more preferably only an aromatic diamine component.

From the viewpoint of solubility of the diimide dicarboxylic acid-based compound, among the above-mentioned diamine components, it is preferable to use a diamine component having an ether group, a thioether group, a sulfonyl group, a sulfonic acid group, a methyl group, a methylene group, an isopropylidene group, a phenyl group, a fluorene structure, a halogen atom (or a halogen atom-containing substituent), or a siloxane bond, as the diamine component of the diimide dicarboxylic acid-based compound.

From the viewpoint of further improving the solubility of the diimide dicarboxylic acid-based compound, among the above-mentioned diamine components, it is preferable to use only a diamine component having an ether group, a thioether group, a sulfonyl group, a sulfonic acid group, a methyl group, a methylene group, an isopropylidene group, a phenyl group, a fluorene structure, a halogen atom (or a halogen atom-containing substituent), or a siloxane bond, as the diamine component of the diimide dicarboxylic acid-based compound.

From the viewpoint of non-coloring properties of the diimide dicarboxylic acid-based compound and the epoxy resin-cured product obtained using such compound, among the above-mentioned diamine components, the diamine component of the diimide dicarboxylic acid-based compound preferably contains an alicyclic diamine component and/or an aliphatic diamine component.

From the viewpoint of further improving the non-coloring properties of the diimide dicarboxylic acid-based compound and the epoxy resin-cured product obtained using such compound, among the above-mentioned diamine components, the diamine component of the diimide dicarboxylic acid-based compound preferably contains only an alicyclic diamine component and/or an aliphatic diamine component.

From the viewpoint of versatility, among the above-mentioned diamine components, the diamine component of the diimide dicarboxylic acid-based compound preferably contains one or more compounds selected from Group G1 consisting of 4,4'-diaminodiphenyl ether, p-phenylenediamine, m-phenylenediamine, 3,4'-diaminodiphenyl ether, 1,4-bis(4-aminophenoxy)benzene, 1,3-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, bis(4-aminophenyl)sulfone, bis[4-(4-aminophenoxy)phenyl]sulfone, 9,9-bis(4-aminophenyl)fluorene, trans-1,4-cyclohexanediamine, 4,4'-methylenebis(cyclohexylamine), and 1,4-bis(aminomethyl)cyclohexane.

From the viewpoint of further improving the versatility, among the above-mentioned diamine components, the diamine component of the diimide dicarboxylic acid-based compound preferably contains only one or more compounds selected from the above-mentioned Group G1.

The diimide dicarboxylic acid-based compound using a tetracarboxylic dianhydride component and a monoaminomonocarboxylic acid component is a compound in which two molecules of the monoaminomonocarboxylic acid component are allowed to react with one molecule of the tetracarboxylic dianhydride component to thereby form two imide groups, and specifically, is a diimide dicarboxylic acid-based compound having a structure of the general formula (2).

[Chem. 4]

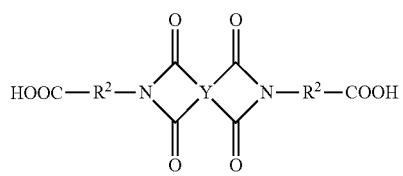

(2)

In the general formula (2), Y represents a structure derived from a tetracarboxylic dianhydride component to be described later (e.g., an aromatic tetracarboxylic dianhydride component, an alicyclic tetracarboxylic dianhydride component, or an aliphatic tetracarboxylic dianhydride component).

Two $R^2$s each independently represent a structure derived from a monoaminomonocarboxylic acid component to be described later (e.g., an aromatic monoaminomonocarboxylic acid component (particularly, an aromatic monoaminomonocarboxylic acid component containing one aromatic ring in one molecule), an alicyclic monoaminomonocarboxylic acid component, or an aliphatic monoaminomonocarboxylic acid component).

In the production of a diimide dicarboxylic acid-based compound using a tetracarboxylic dianhydride component and a monoaminomonocarboxylic acid component, the monoaminomonocarboxylic acid component is usually used in a molar amount of about 2 times the molar amount of the tetracarboxylic dianhydride component, for example 1.5 to 10.0 times, preferably 1.8 to 2.2 times, more preferably 1.9 to 2.1 times, even more preferably 1.95 to 2.05 times.

The tetracarboxylic dianhydride component capable of constituting the diimide dicarboxylic acid-based compound includes an aromatic tetracarboxylic dianhydride component containing an aromatic ring, an alicyclic tetracarboxylic dianhydride component containing an aliphatic ring but not an aromatic ring, and an aliphatic tetracarboxylic dianhydride component that does not contain an aromatic ring and an alicyclic ring. The tetracarboxylic dianhydride component may contain an ether group and/or a thioether group, and/or one or more hydrogen atoms may be substituted with a halogen atom (e.g., fluorine atom, chlorine atom, and bromine atom). An ether group herein is an "—O—" group present between carbon atoms. A thioether group is a "—S—" group present between carbon atoms.

Examples of the aromatic tetracarboxylic dianhydride component include pyromellitic dianhydride, 3,3',4,4'-biphenyltetracarboxylic dianhydride, 2,3,3',4'-biphenyltetracarboxylic dianhydride, 3,3',4,4'-benzophenone tetracarboxylic dianhydride, 4,4'-oxydiphthalic anhydride, 4,4'-(hexafluoroisopropylidene)diphthalic anhydride, and 4,4'-(4,4'-isopropylidenediphenoxy)diphthalic anhydride. One of these may be used alone, or two or more thereof may be used as a mixture.

Examples of the alicyclic tetracarboxylic dianhydride component include cyclohexane-1,2,3,4-tetracarboxylic dianhydride and cyclohexane-1,2,4,5-tetracarboxylic dianhydride. One of these may be used alone, or two or more thereof may be used as a mixture.

Examples of the aliphatic tetracarboxylic dianhydride component include 1,2,3,4-butanetetracarboxylic dianhydride and 1,1,2,2-ethanetetracarboxylic dianhydride. One of these may be used alone, or two or more thereof may be used as a mixture.

From the viewpoint of heat-resisting properties and dielectric properties of the diimide dicarboxylic acid-based compound and the epoxy resin-cured product obtained using such compound, the tetracarboxylic dianhydride component of the diimide dicarboxylic acid-based compound preferably contains an aromatic tetracarboxylic dianhydride component and/or an alicyclic tetracarboxylic dianhydride component, more preferably an aromatic tetracarboxylic dianhydride component.

From the viewpoint of further improving the heat-resisting properties and dielectric properties of the diimide dicarboxylic acid-based compound and the epoxy resin-cured product obtained using such compound, the tetracarboxylic dianhydride component of the diimide dicarboxylic acid-based compound preferably contains only an aromatic tetracarboxylic dianhydride component and/or an alicyclic tetracarboxylic dianhydride component, more preferably only an aromatic tetracarboxylic dianhydride component.

From the viewpoint of solubility of the diimide dicarboxylic acid-based compound, among the above-mentioned tetracarboxylic dianhydride components, it is preferable to use a tetracarboxylic dianhydride component having an ether group, a thioether group, a sulfonyl group, a ketone group, a methyl group, a methylene group, an isopropylidene group, a phenyl group, a fluorene structure, or a halogen atom (or a halogen atom-containing substituent), as the tetracarboxylic dianhydride component of the diimide dicarboxylic acid-based compound.

From the viewpoint of further improving the solubility of the diimide dicarboxylic acid-based compound, among the above-mentioned tetracarboxylic dianhydride components, it is preferable to use only a tetracarboxylic dianhydride component having an ether group, a thioether group, a sulfonyl group, a ketone group, a methyl group, a methylene group, an isopropylidene group, a phenyl group, a fluorene structure, or a halogen atom (or a halogen atom-containing substituent), as the tetracarboxylic dianhydride component of the diimide dicarboxylic acid-based compound.

From the viewpoint of heat-resisting properties, dielectric properties and non-coloring properties of the diimide dicarboxylic acid-based compound and the epoxy resin-cured product obtained using such compound, among the above-mentioned tetracarboxylic dianhydride components, the tetracarboxylic dianhydride component of the diimide dicarboxylic acid-based compound preferably contains an aromatic tetracarboxylic dianhydride component and/or an alicyclic tetracarboxylic dianhydride component (particularly an aromatic tetracarboxylic dianhydride component) containing a fluorine atom.

From the viewpoint of further improving the heat-resisting properties, dielectric properties and non-coloring properties of the diimide dicarboxylic acid-based compound and the epoxy resin-cured product obtained using such compound, among the above-mentioned tetracarboxylic dianhydride components, the tetracarboxylic dianhydride component of the diimide dicarboxylic acid-based compound preferably contains only an aromatic tetracarboxylic dianhydride component and/or an alicyclic tetracarboxylic dianhydride component (particularly an aromatic tetracarboxylic dianhydride component) containing a fluorine atom.

From the viewpoint of versatility, among the above-mentioned tetracarboxylic dianhydride components, the tetracarboxylic dianhydride component of the diimide dicarboxylic acid-based compound preferably contains one or more compounds selected from Group G2 consisting of pyromellitic dianhydride, 3,3',4,4'-biphenyltetracarboxylic dianhydride, 2,3,3',4'-biphenyltetracarboxylic dianhydride, 3,3',4,4'-benzophenone tetracarboxylic dianhydride, 4,4'-oxydiphthalic anhydride, 4,4'-(4,4'-isopropylidenediphenoxy)diphthalic anhydride, and 4,4'-(hexafluoroisopropylidene)diphthalic anhydride.

From the viewpoint of further improving the versatility, among the above-mentioned tetracarboxylic dianhydride components, the tetracarboxylic dianhydride component of the diimide dicarboxylic acid-based compound preferably contains only one or more compounds selected from the above-mentioned Group G2.

The monoaminomonocarboxylic acid component capable of constituting the diimide dicarboxylic acid-based compound includes an aromatic monoaminomonocarboxylic acid component containing an aromatic ring, an alicyclic monoaminomonocarboxylic acid component containing an aliphatic ring but not an aromatic ring, and an aliphatic monoaminomonocarboxylic acid component that does not contain an aromatic ring and an alicyclic ring. The monoaminomonocarboxylic acid component may contain an ether group and/or a thioether group, and/or one or more hydrogen atoms may be substituted with a halogen atom (e.g., fluorine atom, chlorine atom, and bromine atom).

Examples of the aromatic monoaminomonocarboxylic acid component include 2-aminobenzoic acid, 3-aminobenzoic acid, 4-aminobenzoic acid, 2-amino-3-methylbenzoic acid, 2-amino-4-methylbenzoic acid, 2-amino-5-methylbenzoic acid, 2-amino-6-methylbenzoic acid, 3-amino-2-methylbenzoic acid, 3-amino-4-methylbenzoic acid, 4-amino-2-methylbenzoic acid, 4-amino-3-methylbenzoic acid, 5-amino-2-methylbenzoic acid, 2-amino-3,4-dimethylbenzoic acid, 2-amino-4,5-dimethylbenzoic acid, 2-amino-4-methoxybenzoic acid, 3-amino-4-methoxybenzoic acid, and 4-amino-2-methoxybenzoic acid. One of these may be used alone, or two or more thereof may be used as a mixture.

Examples of the alicyclic monoaminomonocarboxylic acid component include 4-aminocyclohexanecarboxylic acid and 3-aminocyclohexanecarboxylic acid. One of these may be used alone, or two or more thereof may be used as a mixture.

Examples of the aliphatic monoaminomonocarboxylic acid component include α-aminobutyric acid and γ-aminobutyric acid. One of these may be used alone, or two or more thereof may be used as a mixture.

From the viewpoint of heat-resisting properties and dielectric properties of the diimide dicarboxylic acid-based compound and the epoxy resin-cured product obtained using such compound, the monoaminomonocarboxylic acid component of the diimide dicarboxylic acid-based compound preferably contains an aromatic monoaminomonocarboxylic acid component and/or an alicyclic monoaminomonocarboxylic acid component, more preferably an aromatic monoaminomonocarboxylic acid component.

From the viewpoint of heat-resisting properties and dielectric properties of the diimide dicarboxylic acid-based compound and the epoxy resin-cured product obtained using such compound, the monoaminomonocarboxylic acid component of the diimide dicarboxylic acid-based compound preferably contains only an aromatic monoaminomonocarboxylic acid component and/or an alicyclic monoaminomonocarboxylic acid component, more preferably only an aromatic monoaminomonocarboxylic acid component.

From the viewpoint of versatility, among the above-mentioned monoaminomonocarboxylic acid components, the monoaminomonocarboxylic acid component of the diimide dicarboxylic acid-based compound preferably contains one or more compounds selected from Group G3 consisting of 2-aminobenzoic acid, 3-aminobenzoic acid, 4-aminobenzoic acid, 2-amino-3-methylbenzoic acid, 2-amino-4-methylbenzoic acid, 2-amino-5-methylbenzoic acid, 2-amino-6-methylbenzoic acid, 3-amino-2-methylbenzoic acid, 3-amino-4-methylbenzoic acid, 4-amino-2-methylbenzoic acid, 4-amino-3-methylbenzoic acid, 5-amino-2-methylbenzoic acid, 2-amino-3,4-dimethylbenzoic acid, 2-amino-4,5-dimethylbenzoic acid, 2-amino-4-methoxybenzoic acid, 3-amino-4-methoxybenzoic acid, and 4-amino-2-methoxybenzoic acid.

From the viewpoint of further improving the versatility, among the above-mentioned monoaminomonocarboxylic acid components, the monoaminomonocarboxylic acid component of the diimide dicarboxylic acid-based compound preferably contains only one or more compounds selected from the above-mentioned Group G3.

(Diimide Tricarboxylic Acid-Based Compound)

A diimide tricarboxylic acid-based compound can be produced as follows. Using a tricarboxylic acid anhydride component and a diaminomonocarboxylic acid component as the raw material compounds, a reaction between functional groups is performed to thereby produce an amic acid-based compound, and the amic acid-based compound is then subjected to an imidization reaction. Here, the reaction between functional groups may be performed in a solution or in a solid phase state, and the production method is not particularly limited. The diimide tricarboxylic acid-based compound is a compound having two imide groups and three carboxyl groups in one molecule.

The diimide tricarboxylic acid-based compound using a tricarboxylic acid anhydride component and a diaminomonocarboxylic acid component is a compound in which two molecules of the tricarboxylic acid anhydride component are allowed to react with one molecule of the diaminomonocarboxylic acid component to thereby form two imide groups.

In the production of a diimide tricarboxylic acid-based compound using a tricarboxylic acid anhydride component and a diaminomonocarboxylic acid component, the diaminomonocarboxylic acid component is usually used in a molar amount of about 0.5 times, for example 0.1 to 0.7 times, preferably 0.3 to 0.7 times, more preferably 0.4 to 0.6 times, even more preferably 0.45 to 0.55 times that of the tricarboxylic acid anhydride component.

The tricarboxylic acid anhydride component capable of constituting the diimide tricarboxylic acid-based compound is a tricarboxylic acid anhydride component that is same as the tricarboxylic acid anhydride component capable of constituting the diimide dicarboxylic acid-based compound, and specifically, includes an aromatic tricarboxylic acid anhydride component, an alicyclic tricarboxylic acid anhydride component, and an aliphatic tricarboxylic acid anhydride component that are same as those of the tricarboxylic acid anhydride component capable of constituting the diimide dicarboxylic acid-based compound.

From the viewpoint of heat-resisting properties of the diimide tricarboxylic acid-based compound and the epoxy resin-cured product obtained using such compound, the tricarboxylic acid anhydride component of the diimide tricarboxylic acid-based compound preferably contains an aromatic tricarboxylic acid anhydride component and/or an alicyclic tricarboxylic acid anhydride component, more preferably an aromatic tricarboxylic acid anhydride component.

From the viewpoint of further improving the heat-resisting properties of the diimide tricarboxylic acid-based compound and the epoxy resin-cured product obtained using such compound, the tricarboxylic acid anhydride component of the diimide tricarboxylic acid-based compound preferably contains only an aromatic tricarboxylic acid anhydride component and/or an alicyclic tricarboxylic acid anhydride component, more preferably only an aromatic tricarboxylic acid anhydride component.

From the viewpoint of versatility, among the above-mentioned tricarboxylic acid anhydride components, the tricarboxylic acid anhydride component of the diimide tricarboxylic acid-based compound preferably contains one or more compounds selected from Group G4 consisting of trimellitic anhydride and 1,2,4-cyclohexanetricarboxylic acid anhydride.

From the viewpoint of further improving the versatility, among the above-mentioned tricarboxylic acid anhydride components, the tricarboxylic acid anhydride component of the diimide tricarboxylic acid-based compound preferably contains only one or more compounds selected from the above-mentioned Group G4.

The diaminomonocarboxylic acid component capable of constituting the diimide tricarboxylic acid-based compound includes an aromatic diaminomonocarboxylic acid component containing an aromatic ring, an alicyclic diaminomonocarboxylic acid component containing an aliphatic ring but not an aromatic ring, and an aliphatic diaminomonocarboxylic acid component that does not contain an aromatic ring and an alicyclic ring. The diaminomonocarboxylic acid component may contain an ether group and/or a thioether group, and/or one or more hydrogen atoms may be substituted with a halogen atom (e.g., fluorine atom, chlorine atom, and bromine atom).

Examples of the aromatic diaminomonocarboxylic acid component include 3,4-diaminobenzoic acid, 3,5-diaminobenzoic acid, 2,5-diaminobenzoic acid, and 3,5-bis(4-aminophenoxy)benzoic acid. One of these may be used alone, or two or more thereof may be used as a mixture.

Examples of the alicyclic diaminomonocarboxylic acid component include 2,5-diaminocyclohexanecarboxylic acid and 3,5-diaminocyclohexanecarboxylic acid. One of these may be used alone, or two or more thereof may be used as a mixture.

Examples of the aliphatic diaminomonocarboxylic acid component include lysine, hydroxylysine, arginine, and histidine. One of these may be used alone, or two or more thereof may be used as a mixture.

From the viewpoint of heat-resisting properties of the diimide tricarboxylic acid-based compound and the epoxy resin-cured product obtained using such compound, the diaminomonocarboxylic acid component of the diimide tricarboxylic acid-based compound preferably contains an aromatic diaminomonocarboxylic acid component and/or an alicyclic diaminomonocarboxylic acid component, more preferably an aromatic diaminomonocarboxylic acid component.

From the viewpoint of further improving the heat-resisting properties of the diimide tricarboxylic acid-based compound and the epoxy resin-cured product obtained using such compound, the diaminomonocarboxylic acid component of the diimide tricarboxylic acid-based compound preferably contains only an aromatic diaminomonocarboxylic acid component and/or an alicyclic diaminomonocarboxylic acid component, more preferably only an aromatic diaminomonocarboxylic acid component.

From the viewpoint of solubility of the diimide tricarboxylic acid-based compound, among the above-mentioned diaminomonocarboxylic acid components, it is preferable to use an aliphatic diaminomonocarboxylic acid component as the diaminomonocarboxylic acid component of the diimide tricarboxylic acid-based compound.

From the viewpoint of further improving the solubility of the diimide tricarboxylic acid-based compound, among the above-mentioned diaminomonocarboxylic acid components, it is preferable to use only an aliphatic diaminomonocarboxylic acid component as the diaminomonocarboxylic acid component of the diimide tricarboxylic acid-based compound.

From the viewpoint of versatility, among the above-mentioned diaminomonocarboxylic acid components, the diaminomonocarboxylic acid component of the diimide tricarboxylic acid-based compound preferably contains one or more compounds selected from Group G5 consisting of 3,4-diaminobenzoic acid, 3,5-diaminobenzoic acid, 2,5-diaminobenzoic acid, and 3,5-bis(4-aminophenoxy)benzoic acid.

From the viewpoint of further improving the versatility, among the above-mentioned diaminomonocarboxylic acid components, the diaminomonocarboxylic acid component of the diimide tricarboxylic acid-based compound preferably contains only one or more compounds selected from the above-mentioned Group G5.

(Diimide Tetracarboxylic Acid-Based Compound)

A diimide tetracarboxylic acid-based compound can be produced as follows. Using a tetracarboxylic dianhydride component and a monoaminodicarboxylic acid component as the raw material compounds, a reaction between functional groups is performed to thereby produce an amic acid-based compound, and the amic acid-based compound is then subjected to an imidization reaction. Here, the reaction between functional groups may be performed in a solution or in a solid phase state, and the production method is not particularly limited. The diimide tetracarboxylic acid-based compound is a compound having two imide groups and four carboxyl groups in one molecule.

The diimide tetracarboxylic acid-based compound using a tetracarboxylic dianhydride component and a monoaminodicarboxylic acid component is a compound in which two molecules of the monoaminodicarboxylic acid component are allowed to react with one molecule of the tetracarboxylic dianhydride component to thereby form two imide groups.

In the production of a diimide tetracarboxylic acid-based compound using a tetracarboxylic dianhydride component and a monoaminodicarboxylic acid component, the monoaminodicarboxylic acid component is usually used in a molar amount of about 2 times the molar amount of the tetracarboxylic dianhydride component, for example 1.5 to 10.0 times, preferably 1.8 to 2.2 times, more preferably 1.9 to 2.1 times, even more preferably 1.95 to 2.05 times.

The tetracarboxylic dianhydride component capable of constituting the diimide tetracarboxylic acid-based compound is a tetracarboxylic dianhydride component that is same as the tetracarboxylic dianhydride component capable of constituting the diimide dicarboxylic acid-based compound, and specifically, includes an aromatic tetracarboxylic dianhydride component, an alicyclic tetracarboxylic dianhydride component, and an aliphatic tetracarboxylic dianhydride component that are same as those of the tetracarboxylic dianhydride component capable of constituting the diimide dicarboxylic acid-based compound.

From the viewpoint of heat-resisting properties of the diimide tetracarboxylic acid-based compound and the epoxy resin-cured product obtained using such compound, the tetracarboxylic dianhydride component of the diimide tetracarboxylic acid-based compound preferably contains an aromatic tetracarboxylic dianhydride component.

From the viewpoint of further improving the heat-resisting properties of the diimide tetracarboxylic acid-based compound and the epoxy resin-cured product obtained using such compound, the tetracarboxylic dianhydride component of the diimide tetracarboxylic acid-based compound preferably contains only an aromatic tetracarboxylic dianhydride component.

From the viewpoint of solubility of the diimide tetracarboxylic acid-based compound, among the above-mentioned tetracarboxylic dianhydride components, it is preferable to use a tetracarboxylic dianhydride component having an ether group, a thioether group, a sulfonyl group, a ketone group, a methyl group, a methylene group, an isopropylidene group, a phenyl group, a fluorene structure, or a halogen atom (or a halogen atom-containing substituent), as the tetracarboxylic dianhydride component of the diimide tetracarboxylic acid-based compound.

From the viewpoint of further improving the solubility of the diimide tetracarboxylic acid-based compound, among the above-mentioned tetracarboxylic dianhydride components, it is preferable to use only a tetracarboxylic dianhydride component having an ether group, a thioether group, a sulfonyl group, a ketone group, a methyl group, a methylene group, a phenyl group, an isopropylidene group, a fluorene structure, or a halogen atom (or a halogen atom-containing substituent), as the tetracarboxylic dianhydride component of the diimide tetracarboxylic acid-based compound.

From the viewpoint of heat-resisting properties, dielectric properties and non-coloring properties of the diimide tetracarboxylic acid-based compound and the epoxy resin-cured product obtained using such compound, among the above-mentioned tetracarboxylic dianhydride components, the tetracarboxylic dianhydride component of the diimide tetracarboxylic acid-based compound preferably contains an aromatic tetracarboxylic dianhydride component and/or an alicyclic tetracarboxylic dianhydride component (particularly an aromatic tetracarboxylic dianhydride component) containing a fluorine atom.

From the viewpoint of heat-resisting properties, dielectric properties and non-coloring properties of the diimide tetracarboxylic acid-based compound and the epoxy resin-cured product obtained using such compound, among the above-mentioned tetracarboxylic dianhydride components, the tetracarboxylic dianhydride component of the diimide tetracarboxylic acid-based compound preferably contains only an aromatic tetracarboxylic dianhydride component and/or an alicyclic tetracarboxylic dianhydride component (particularly an aromatic tetracarboxylic dianhydride component) containing a fluorine atom.

From the viewpoint of versatility, among the above-mentioned tetracarboxylic dianhydride components, the tetracarboxylic dianhydride component of the diimide tetracarboxylic acid-based compound preferably contains one or more compounds selected from Group G6 consisting of pyromellitic dianhydride, 3,3',4,4'-biphenyltetracarboxylic dianhydride, 2,3,3',4'-biphenyltetracarboxylic dianhydride, 3,3',4,4'-benzophenone tetracarboxylic dianhydride, 4,4'-oxydiphthalic anhydride, 4,4'-(4,4'-isopropylidenediphenoxy)diphthalic anhydride, and 4,4'-(hexafluoroisopropylidene)diphthalic anhydride.

From the viewpoint of further improving the versatility, among the above-mentioned tetracarboxylic dianhydride components, the tetracarboxylic dianhydride component of the diimide tetracarboxylic acid-based compound preferably contains only one or more compounds selected from the above-mentioned Group G6.

The monoaminodicarboxylic acid component capable of constituting the diimide tetracarboxylic acid-based compound includes an aromatic monoaminodicarboxylic acid component containing an aromatic ring, an alicyclic monoaminodicarboxylic acid component containing an aliphatic ring but not an aromatic ring, and an aliphatic monoaminodicarboxylic acid component that does not contain an aromatic ring and an alicyclic ring. The monoaminodicarboxylic acid component may contain an ether group and/or a thioether group, and/or one or more hydrogen atoms may be substituted with a halogen atom (e.g., fluorine atom, chlorine atom, and bromine atom).

Examples of the aromatic monoaminodicarboxylic acid component include 2-aminoterephthalic acid, 5-aminoisophthalic acid, 3-aminophthalic acid, and 4-aminophthalic acid. One of these may be used alone, or two or more thereof may be used as a mixture.

Examples of the alicyclic monoaminodicarboxylic acid component include 5-amino-1,3-cyclohexanedicarboxylic acid. One of these may be used alone, or two or more thereof may be used as a mixture.

Examples of the aliphatic monoaminodicarboxylic acid component include glutamic acid and aspartic acid. One of these may be used alone, or two or more thereof may be used as a mixture.

From the viewpoint of heat-resisting properties of the diimide tetracarboxylic acid-based compound and the epoxy resin-cured product obtained using such compound, the monoaminodicarboxylic acid component of the diimide tetracarboxylic acid-based compound preferably contains an aromatic monoaminodicarboxylic acid component and/or an alicyclic monoaminodicarboxylic acid component, more preferably an aromatic monoaminodicarboxylic acid component.

From the viewpoint of further improving the heat-resisting properties of the diimide tetracarboxylic acid-based compound and the epoxy resin-cured product obtained using such compound, the monoaminodicarboxylic acid component of the diimide tetracarboxylic acid-based compound preferably contains only an aromatic monoaminodicarboxylic acid component and/or an alicyclic monoaminodicarboxylic acid component, more preferably only an aromatic monoaminodicarboxylic acid component.

From the viewpoint of versatility, among the above-mentioned monoaminodicarboxylic acid components, the monoaminodicarboxylic acid component of the diimide tetracarboxylic acid-based compound preferably contains one or more compounds selected from Group G7 consisting of 2-aminoterephthalic acid, 5-aminoisophthalic acid, 3-aminophthalic acid, and 4-aminophthalic acid.

From the viewpoint of further improving the versatility, among the above-mentioned monoaminodicarboxylic acid components, the monoaminodicarboxylic acid component of the diimide tetracarboxylic acid-based compound preferably contains only one or more compounds selected from the above-mentioned Group G7.

(Monoimide Dicarboxylic Acid-Based Compound)

A monoimide dicarboxylic acid-based compound can be produced as follows. Using a tricarboxylic acid anhydride component and a monoaminomonocarboxylic acid component as the raw material compounds, a reaction between functional groups is performed to thereby produce an amic acid-based compound, and the amic acid-based compound is then subjected to an imidization reaction. Here, the reaction between functional groups may be performed in a solution or in a solid phase state, and the production method is not particularly limited. The monoimide dicarboxylic acid-based compound is a compound having one imide group and two carboxyl groups in one molecule. The monoimide dicarboxylic acid-based compound does not have an amide group.

The monoimide dicarboxylic acid-based compound using a tricarboxylic acid anhydride component and a monoaminomonocarboxylic acid component is a compound in which one molecule of the monoaminomonocarboxylic acid component is allowed to react with one molecule of the tricarboxylic acid anhydride component to thereby form one imide group.

In the production of a monoimide dicarboxylic acid-based compound using a tricarboxylic acid anhydride component and a monoaminomonocarboxylic acid component, the monoaminomonocarboxylic acid component is usually used in a molar amount of about 1 time the molar amount of the tricarboxylic acid anhydride component, for example 0.5 to 5.0 times, preferably 0.8 to 1.2 times, more preferably 0.9 to 1.1 times, even more preferably 0.95 to 1.05 times.

The tricarboxylic acid anhydride component capable of constituting the monoimide dicarboxylic acid-based compound is a tricarboxylic acid anhydride component that is same as the tricarboxylic acid anhydride component capable of constituting the diimide dicarboxylic acid-based compound, and specifically, includes an aromatic tricarboxylic acid anhydride component, an alicyclic tricarboxylic acid anhydride component, and an aliphatic tricarboxylic acid anhydride component that are same as those of the tricarboxylic acid anhydride component capable of constituting the diimide dicarboxylic acid-based compound.

From the viewpoint of heat-resisting properties of the monoimide dicarboxylic acid-based compound and the epoxy resin-cured product obtained using such compound, the tricarboxylic acid anhydride component of the monoimide dicarboxylic acid-based compound preferably contains an aromatic tricarboxylic acid anhydride component and/or an alicyclic tricarboxylic acid anhydride component, more preferably an aromatic tricarboxylic acid anhydride component.

From the viewpoint of further improving the heat-resisting properties of the monoimide dicarboxylic acid-based compound and the epoxy resin-cured product obtained using such compound, the tricarboxylic acid anhydride component of the monoimide dicarboxylic acid-based compound preferably contains only an aromatic tricarboxylic acid anhydride component and/or an alicyclic tricarboxylic acid anhydride component, more preferably only an aromatic tricarboxylic acid anhydride component.

From the viewpoint of solubility and non-coloring properties of the monoimide dicarboxylic acid-based compound, among the above-mentioned tricarboxylic acid anhydride components, it is preferable to use an alicyclic tricarboxylic acid anhydride component and/or an aliphatic tricarboxylic acid anhydride component as the tricarboxylic acid anhydride component of the monoimide dicarboxylic acid-based compound.

From the viewpoint of further improving the solubility and non-coloring properties of the monoimide dicarboxylic acid-based compound, among the above-mentioned tricarboxylic acid anhydride components, it is preferable to use only an alicyclic tricarboxylic acid anhydride component and/or an aliphatic tricarboxylic acid anhydride component as the tricarboxylic acid anhydride component of the monoimide dicarboxylic acid-based compound.

From the viewpoint of versatility, among the above-mentioned tricarboxylic acid anhydride components, the tricarboxylic acid anhydride component of the monoimide dicarboxylic acid-based compound preferably contains one or more compounds selected from Group G8 consisting of trimellitic anhydride and 1,2,4-cyclohexanetricarboxylic acid anhydride.

From the viewpoint of further improving the versatility, among the above-mentioned tricarboxylic acid anhydride components, the tricarboxylic acid anhydride component of the monoimide dicarboxylic acid-based compound preferably contains only one or more compounds selected from the above-mentioned Group G8.

The monoaminomonocarboxylic acid component capable of constituting the monoimide dicarboxylic acid-based compound is a monoaminomonocarboxylic acid component that is same as the monoaminomonocarboxylic acid component capable of constituting the diimide dicarboxylic acid-based compound, and specifically, includes an aromatic monoaminomonocarboxylic acid component, an alicyclic monoaminomonocarboxylic acid component, and an aliphatic monoaminomonocarboxylic acid component that are same as those of the monoaminomonocarboxylic acid component capable of constituting the diimide dicarboxylic acid-based compound.

From the viewpoint of heat-resisting properties of the monoimide dicarboxylic acid-based compound and the epoxy resin-cured product obtained using such compound, the monoaminomonocarboxylic acid component of the monoimide dicarboxylic acid-based compound preferably contains an aromatic monoaminomonocarboxylic acid component and/or an alicyclic monoaminomonocarboxylic acid component, more preferably an aromatic monoaminomonocarboxylic acid component.

From the viewpoint of further improving the heat-resisting properties of the monoimide dicarboxylic acid-based compound and the epoxy resin-cured product obtained using such compound, the monoaminomonocarboxylic acid component of the monoimide dicarboxylic acid-based compound preferably contains only an aromatic monoaminomonocarboxylic acid component and/or an alicyclic monoaminomonocarboxylic acid component, more preferably only an aromatic monoaminomonocarboxylic acid component.

From the viewpoint of solubility and non-coloring properties of the monoimide dicarboxylic acid-based compound, among the above-mentioned monoaminomonocarboxylic acid components, it is preferable to use an alicyclic monoaminomonocarboxylic acid component and/or an aliphatic monoaminomonocarboxylic acid component as the monoaminomonocarboxylic acid component of the monoimide dicarboxylic acid-based compound.

From the viewpoint of further improving the solubility and non-coloring properties of the monoimide dicarboxylic acid-based compound, among the above-mentioned monoaminomonocarboxylic acid components, it is preferable to use only an alicyclic monoaminomonocarboxylic acid component and/or an aliphatic monoaminomonocarboxylic acid component as the monoaminomonocarboxylic acid component of the monoimide dicarboxylic acid-based compound.

From the viewpoint of versatility, among the above-mentioned monoaminomonocarboxylic acid components, the monoaminomonocarboxylic acid component of the monoimide dicarboxylic acid-based compound preferably contains one or more compounds selected from Group G9 consisting of 2-aminobenzoic acid, 3-aminobenzoic acid, 4-aminobenzoic acid, 2-amino-3-methylbenzoic acid, 2-amino-4-methylbenzoic acid, 2-amino-5-methylbenzoic acid, 2-amino-6-methylbenzoic acid, 3-amino-2-methylbenzoic acid, 3-amino-4-methylbenzoic acid, 4-amino-2-methylbenzoic acid, 4-amino-3-methylbenzoic acid, 5-amino-2-methylbenzoic acid, 2-amino-3,4-dimethylbenzoic acid, 2-amino-4,5-dimethylbenzoic acid, 2-amino-4-methoxybenzoic acid, 3-amino-4-methoxybenzoic acid, and 4-amino-2-methoxybenzoic acid.

From the viewpoint of further improving the versatility, among the above-mentioned monoaminomonocarboxylic acid components, the monoaminomonocarboxylic acid component of the monoimide dicarboxylic acid-based compound preferably contains only one or more compounds selected from the above-mentioned Group G9.

(Monoimide Tricarboxylic Acid-Based Compound)

A monoimide tricarboxylic acid-based compound can be produced as follows. Using a tricarboxylic acid anhydride component and a monoaminodicarboxylic acid component as the raw material compounds, a reaction between functional groups is performed to thereby produce an amic acid-based compound, and the amic acid-based compound is then subjected to an imidization reaction. Here, the reaction between functional groups may be performed in a solution or in a solid phase state, and the production method is not particularly limited. The monoimide tricarboxylic acid-based compound is a compound having one imide group and three carboxyl groups in one molecule.

The monoimide tricarboxylic acid-based compound using a tricarboxylic acid anhydride component and a monoaminodicarboxylic acid component is a compound in which one molecule of the monoaminodicarboxylic acid component is allowed to react with one molecule of the tricarboxylic acid anhydride component to thereby form one imide group.

In the production of a monoimide tricarboxylic acid-based compound using a tricarboxylic acid anhydride component and a monoaminodicarboxylic acid component, the monoaminodicarboxylic acid component is usually used in a molar amount of about 1 time the molar amount of the tricarboxylic acid anhydride component, for example 0.5 to 5.0 times, preferably 0.8 to 1.2 times, more preferably 0.9 to 1.1 times, even more preferably 0.95 to 1.05 times.

The tricarboxylic acid anhydride component capable of constituting the monoimide tricarboxylic acid-based compound is a tricarboxylic acid anhydride component that is same as the tricarboxylic acid anhydride component capable of constituting the diimide dicarboxylic acid-based compound, and specifically, includes an aromatic tricarboxylic acid anhydride component, an alicyclic tricarboxylic acid anhydride component, and an aliphatic tricarboxylic acid anhydride component that are same as those of the tricarboxylic acid anhydride component capable of constituting the diimide dicarboxylic acid-based compound.

From the viewpoint of heat-resisting properties of the monoimide tricarboxylic acid-based compound and the epoxy resin-cured product obtained using such compound, the tricarboxylic acid anhydride component of the monoimide tricarboxylic acid-based compound preferably contains an aromatic tricarboxylic acid anhydride component and/or an alicyclic tricarboxylic acid anhydride component, more preferably an aromatic tricarboxylic acid anhydride component.

From the viewpoint of further improving the heat-resisting properties of the monoimide tricarboxylic acid-based compound and the epoxy resin-cured product obtained using such compound, the tricarboxylic acid anhydride component of the monoimide tricarboxylic acid-based compound preferably contains only an aromatic tricarboxylic acid anhydride component and/or an alicyclic tricarboxylic acid anhydride component, more preferably only an aromatic tricarboxylic acid anhydride component.

From the viewpoint of solubility and non-coloring properties of the monoimide tricarboxylic acid-based compound, among the above-mentioned tricarboxylic acid anhydride components, it is preferable to use an alicyclic tricarboxylic acid anhydride component and/or an aliphatic tricarboxylic acid anhydride component as the tricarboxylic acid anhydride component of the monoimide tricarboxylic acid-based compound.

From the viewpoint of further improving the solubility and non-coloring properties of the monoimide tricarboxylic acid-based compound, among the above-mentioned tricarboxylic acid anhydride components, it is preferable to use only an alicyclic tricarboxylic acid anhydride component and/or an aliphatic tricarboxylic acid anhydride component as the tricarboxylic acid anhydride component of the monoimide tricarboxylic acid-based compound.

From the viewpoint of versatility, among the above-mentioned tricarboxylic acid anhydride components, the tricarboxylic acid anhydride component of the monoimide tricarboxylic acid-based compound preferably contains one or more compounds selected from Group G10 consisting of trimellitic anhydride and 1,2,4-cyclohexanetricarboxylic acid anhydride.

From the viewpoint of further improving the versatility, among the above-mentioned tricarboxylic acid anhydride components, the tricarboxylic acid anhydride component of the monoimide tricarboxylic acid-based compound preferably contains only one or more compounds selected from the above-mentioned Group G10.

The monoaminodicarboxylic acid component capable of constituting the monoimide tricarboxylic acid-based compound is a monoaminodicarboxylic acid component that is same as the monoaminodicarboxylic acid component capable of constituting the diimide tetracarboxylic acid-based compound, and specifically, includes an aromatic monoaminodicarboxylic acid component, an alicyclic monoaminodicarboxylic acid component, and an aliphatic monoaminodicarboxylic acid component that are same as those of the monoaminodicarboxylic acid component capable of constituting the diimide tetracarboxylic acid-based compound.

From the viewpoint of heat-resisting properties of the monoimide tricarboxylic acid-based compound and the epoxy resin-cured product obtained using such compound, the monoaminodicarboxylic acid component of the monoimide tricarboxylic acid-based compound preferably contains an aromatic monoaminodicarboxylic acid component and/or an alicyclic monoaminodicarboxylic acid component, more preferably an aromatic monoaminodicarboxylic acid component.

From the viewpoint of further improving the heat-resisting properties of the monoimide tricarboxylic acid-based compound and the epoxy resin-cured product obtained using such compound, the monoaminodicarboxylic acid component of the monoimide tricarboxylic acid-based compound preferably contains only an aromatic monoaminodicarboxylic acid component and/or an alicyclic monoaminodicarboxylic acid component, more preferably only an aromatic monoaminodicarboxylic acid component.

From the viewpoint of versatility, among the above-mentioned monoaminodicarboxylic acid components, the monoaminodicarboxylic acid component of the monoimide tricarboxylic acid-based compound preferably contains one or more compounds selected from Group G11 consisting of 2-aminoterephthalic acid, 5-aminoisophthalic acid, 3-aminophthalic acid, and 4-aminophthalic acid.

From the viewpoint of further improving the versatility, among the above-mentioned monoaminodicarboxylic acid components, the monoaminodicarboxylic acid component of the monoimide tricarboxylic acid-based compound preferably contains only one or more compounds selected from the above-mentioned Group G11.

(Triimide Tricarboxylic Acid-Based Compound)

A triimide tricarboxylic acid-based compound can be produced as follows. Using a tricarboxylic acid anhydride component and a triamine component as the raw material compounds, a reaction between functional groups is performed to thereby produce an amic acid-based compound, and the amic acid-based compound is then subjected to an imidization reaction. Here, the reaction between functional groups may be performed in a solution or in a solid phase state, and the production method is not particularly limited. The triimide tricarboxylic acid-based compound is a compound having three imide groups and three carboxy groups in one molecule.

The triimide tricarboxylic acid-based compound using a tricarboxylic acid anhydride component and a triamine component is a compound in which three molecules of the tricarboxylic acid anhydride component are allowed to react with one molecule of the triamine component to thereby form three imide groups.

In the production of a triimide tricarboxylic acid-based compound using a tricarboxylic acid anhydride component and a triamine component, the triamine component is usually used in a molar amount of about 0.33 times, for example 0.1 to 0.7 times, preferably 0.2 to 0.6 times, more preferably 0.25 to 0.5 times, even more preferably 0.3 to 0.4 times that of the tricarboxylic acid anhydride component.

The tricarboxylic acid anhydride component capable of constituting the triimide tricarboxylic acid-based compound is a tricarboxylic acid anhydride component that is same as the tricarboxylic acid anhydride component capable of constituting the diimide dicarboxylic acid-based compound, and specifically, includes an aromatic tricarboxylic acid anhydride component, an alicyclic tricarboxylic acid anhydride component, and an aliphatic tricarboxylic acid anhydride component that are same as those of the tricarboxylic acid anhydride component capable of constituting the diimide dicarboxylic acid-based compound.

From the viewpoint of heat-resisting properties of the triimide tricarboxylic acid-based compound and the epoxy resin-cured product obtained using such compound, the tricarboxylic acid anhydride component of the triimide tricarboxylic acid-based compound preferably contains an aromatic tricarboxylic acid anhydride component and/or an alicyclic tricarboxylic acid anhydride component, more preferably an aromatic tricarboxylic acid anhydride component.

From the viewpoint of further improving the heat-resisting properties of the triimide tricarboxylic acid-based compound and the epoxy resin-cured product obtained using such compound, the tricarboxylic acid anhydride component of the triimide tricarboxylic acid-based compound preferably contains only an aromatic tricarboxylic acid anhydride component and/or an alicyclic tricarboxylic acid anhydride component, more preferably only an aromatic tricarboxylic acid anhydride component.

From the viewpoint of versatility, among the above-mentioned tricarboxylic acid anhydride components, the tricarboxylic acid anhydride component of the triimide tricarboxylic acid-based compound preferably contains one or more compounds selected from trimellitic anhydride and 1,2,4-cyclohexanetricarboxylic acid anhydride.

From the viewpoint of further improving the versatility, among the above-mentioned tricarboxylic acid anhydride components, the tricarboxylic acid anhydride component of the triimide tricarboxylic acid-based compound preferably contains only one or more compounds selected from trimellitic anhydride and 1,2,4-cyclohexanetricarboxylic acid anhydride.

The triamine component capable of constituting the triimide tricarboxylic acid-based compound includes an aromatic triamine component containing an aromatic ring, an alicyclic triamine component containing an aliphatic ring but not an aromatic ring, and an aliphatic triamine component that does not contain an aromatic ring and an alicyclic ring. The triamine component may contain an ether group and/or a thioether group, and/or one or more hydrogen atoms may be substituted with a halogen atom (e.g., fluorine atom, chlorine atom, and bromine atom).

Examples of the aromatic triamine component include 1,3,5-triaminobenzene, 1,2,4-triaminobenzene, 1,2,3-triaminobenzene, 2-methyl-1,3,5-benzenetriamine, 5-methyl-1,2,4-benzenetriamine, 6-methyl-1,2,4-benzenetriamine, 4-methyl-1,2,3-benzenetriamine, 5-methyl-1,2,3-benzenetriamine, and 1,3,5-tris(4-aminophenyl)benzene. One of these may be used alone, or two or more thereof may be used as a mixture.

Examples of the alicyclic triamine component include 1,3,5-cyclohexanetriamine and 1,3,5-cyclohexanetriyltrimethanamine. One of these may be used alone, or two or more thereof may be used as a mixture.

Examples of the aliphatic triamine component include 2-(aminomethyl)-1,3-propanediamine and 3-(2-aminoethyl)-1,5-pentanediamine. One of these may be used alone, or two or more thereof may be used as a mixture.

From the viewpoint of heat-resisting properties of the triimide tricarboxylic acid-based compound and the epoxy resin-cured product obtained using such compound, the triamine component of the triimide tricarboxylic acid-based compound preferably contains an aromatic triamine component and/or an alicyclic triamine component, more preferably an aromatic triamine component.

From the viewpoint of further improving the heat-resisting properties of the triimide tricarboxylic acid-based compound and the epoxy resin-cured product obtained using such compound, the triamine component of the triimide tricarboxylic acid-based compound preferably contains only an aromatic triamine component and/or an alicyclic triamine component, more preferably only an aromatic triamine component.

From the viewpoint of solubility and non-coloring properties of the triimide tricarboxylic acid-based compound, among the above-mentioned triamine components, it is preferable to use an alicyclic triamine component and/or an aliphatic triamine component as the triamine component of the triimide tricarboxylic acid-based compound.

From the viewpoint of further improving the solubility and non-coloring properties of the triimide tricarboxylic acid-based compound, among the above-mentioned triamine components, it is preferable to use only an alicyclic triamine component and/or an aliphatic triamine component as the triamine component of the triimide tricarboxylic acid-based compound.

From the viewpoint of versatility, among the above-mentioned triamine components, the triamine component of the triimide tricarboxylic acid-based compound preferably contains one or more compounds selected from Group G12 consisting of 1,3,5-triaminobenzene, 1,2,4-triaminobenzene, 1,2,3-triaminobenzene, 2-methyl-1,3,5-benzenetriamine, 5-methyl-1,2,4-benzenetriamine, 6-methyl-1,2,4-benzenetriamine, 4-methyl-1,2,3-benzenetriamine, 5-methyl-1,2,3-benzenetriamine, and 1,3,5-tris(4-aminophenyl)benzene.

From the viewpoint of further improving the versatility, among the above-mentioned triamine components, the triamine component of the triimide tricarboxylic acid-based compound preferably contains only one or more compounds selected from the above-mentioned Group G12.

(Tetraimide Tetracarboxylic Acid-Based Compound)

A tetraimide tetracarboxylic acid-based compound can be produced as follows. Using a tricarboxylic acid anhydride component and a tetraamine component as the raw material compounds, a reaction between functional groups is performed to thereby produce an amic acid-based compound, and the amic acid-based compound is then subjected to an imidization reaction. Here, the reaction between functional groups may be performed in a solution or in a solid phase state, and the production method is not particularly limited. The tetraimide tetracarboxylic acid-based compound is a compound having four imide groups and four carboxy groups in one molecule.

The tetraimide tetracarboxylic acid-based compound using a tricarboxylic acid anhydride component and a tetraamine component is a compound in which four molecules of the tricarboxylic acid anhydride component are allowed to react with one molecule of the tetraamine component to thereby form four imide groups.

In the production of a tetraimide tetracarboxylic acid-based compound using a tricarboxylic acid anhydride component and a tetraamine component, the tetraamine component is usually used in a molar amount of about 0.25 times, for example 0.05 to 0.6 times, preferably 0.1 to 0.5 times, more preferably 0.15 to 0.4 times, even more preferably 0.20 to 0.3 times that of the tricarboxylic acid anhydride component.

The tricarboxylic acid anhydride component capable of constituting the tetraimide tetracarboxylic acid-based compound is a tricarboxylic acid anhydride component that is same as the tricarboxylic acid anhydride component capable of constituting the diimide dicarboxylic acid-based compound, and specifically, includes an aromatic tricarboxylic acid anhydride component, an alicyclic tricarboxylic acid anhydride component, and an aliphatic tricarboxylic acid anhydride component that are same as those of the tricarboxylic acid anhydride component capable of constituting the diimide dicarboxylic acid-based compound.

From the viewpoint of heat-resisting properties of the tetraimide tetracarboxylic acid-based compound and the epoxy resin-cured product obtained using such compound, the tricarboxylic acid anhydride component of the tetraimide tetracarboxylic acid-based compound preferably contains an aromatic tricarboxylic acid anhydride component and/or an alicyclic tricarboxylic acid anhydride component, more preferably an aromatic tricarboxylic acid anhydride component.

From the viewpoint of further improving the heat-resisting properties of the tetraimide tetracarboxylic acid-based compound and the epoxy resin-cured product obtained using such compound, the tricarboxylic acid anhydride component of the tetraimide tetracarboxylic acid-based compound preferably contains only an aromatic tricarboxylic acid anhydride component and/or an alicyclic tricarboxylic acid anhydride component, more preferably only an aromatic tricarboxylic acid anhydride component.

From the viewpoint of versatility, among the above-mentioned tricarboxylic acid anhydride components, the tricarboxylic acid anhydride component of the tetraimide tetracarboxylic acid-based compound preferably contains one or more compounds selected from trimellitic anhydride and 1,2,4-cyclohexanetricarboxylic acid anhydride.

From the viewpoint of further improving the versatility, among the above-mentioned tricarboxylic acid anhydride components, the tricarboxylic acid anhydride component of the tetraimide tetracarboxylic acid-based compound preferably contains only one or more compounds selected from trimellitic anhydride and 1,2,4-cyclohexanetricarboxylic acid anhydride.

The tetraamine component capable of constituting the tetraimide tetracarboxylic acid-based compound includes an aromatic tetraamine component containing an aromatic ring, an alicyclic tetraamine component containing an aliphatic ring but not an aromatic ring, and an aliphatic tetraamine component that does not contain an aromatic ring and an alicyclic ring. The tetraamine component may contain an ether group and/or a thioether group, and/or one or more hydrogen atoms may be substituted with a halogen atom (e.g., fluorine atom, chlorine atom, and bromine atom).

Examples of the aromatic tetraamine component include 3,3'-diaminobenzidine and 3,3',4,4'-tetraaminodiphenylsulphone. One of these may be used alone, or two or more thereof may be used as a mixture.

Examples of the alicyclic tetraamine component include 1,2,3,4-cyclopentanetetramine. One of these may be used alone, or two or more thereof may be used as a mixture.

Examples of the aliphatic tetraamine component include butane-1,1,4,4-tetraamine. One of these may be used alone, or two or more thereof may be used as a mixture.

From the viewpoint of heat-resisting properties of the tetraimide tetracarboxylic acid-based compound and the epoxy resin-cured product obtained using such compound, the tetraamine component of the tetraimide tetracarboxylic acid-based compound preferably contains an aromatic tetraamine component and/or an alicyclic tetraamine component, more preferably an aromatic tetraamine component.

From the viewpoint of further improving the heat-resisting properties of the tetraimide tetracarboxylic acid-based compound and the epoxy resin-cured product obtained using such compound, the tetraamine component of the tetraimide tetracarboxylic acid-based compound preferably contains only an aromatic tetraamine component and/or an alicyclic tetraamine component, more preferably only an aromatic tetraamine component.

From the viewpoint of solubility and non-coloring properties of the tetraimide tetracarboxylic acid-based compound, among the above-mentioned tetraamine components, it is preferable to use an alicyclic tetraamine component and/or an aliphatic tetraamine component as the tetraamine component of the tetraimide tetracarboxylic acid-based compound.

From the viewpoint of further improving the solubility and non-coloring properties of the tetraimide tetracarboxylic acid-based compound, among the above-mentioned tetraamine components, it is preferable to use only an alicyclic tetraamine component and/or an aliphatic tetraamine component as the tetraamine component of the tetraimide tetracarboxylic acid-based compound.

From the viewpoint of versatility, among the above-mentioned tetraamine components, the tetraamine component of the tetraimide tetracarboxylic acid-based compound preferably contains one or more compounds selected from Group G13 consisting of 3,3'-diaminobenzidine and 3,3',4,4'-tetraaminodiphenylsulphone.

From the viewpoint of further improving the versatility, among the above-mentioned tetraamine components, the tetraamine component of the tetraimide tetracarboxylic acid-based compound preferably contains only one or more compounds selected from the above-mentioned Group G13.

(Amide Group-Containing Diimide Dicarboxylic Acid-Based Compound)

An amide group-containing diimide dicarboxylic acid-based compound can be produced as follows. In the production method of the diimide dicarboxylic acid-based compound as described above, when using a tricarboxylic acid anhydride component and a diamine component as the raw material compounds, a reaction between functional groups is performed to thereby produce a diimide dicarboxylic acid-based compound, a diamine component containing an amide group as the diamine component is used to produce an amic acid-based compound, and the amic acid-based compound is then subjected to an imidization reaction. When the diimide dicarboxylic acid-based compound contains an amide group, for example, the solubility, fluidity at the time of melting, heat-resisting properties and mechanical properties of the epoxy resin-cured product obtained by using such diimide dicarboxylic acid-based compound can be improved. Here, the reaction between functional groups may be performed in a solution or in a solid phase state, and the production method is not particularly limited. The amide group-containing diimide dicarboxylic acid-based compound is a compound having one or more amide groups, two imide groups, and two carboxyl groups in one molecule.

The amide group-containing diimide dicarboxylic acid-based compound using a tricarboxylic acid anhydride component and an amide group-containing diamine component is a compound in which two molecules of the tricarboxylic acid anhydride component are allowed to react with one molecule of the amide group-containing diamine component to thereby form two imide groups.

In the production of an amide group-containing diimide dicarboxylic acid-based compound using a tricarboxylic acid anhydride component and an amide group-containing diamine component, the amide group-containing diamine component is usually used in a molar amount of about 0.5 times, for example 0.1 to 0.7 times, preferably 0.3 to 0.7 times, more preferably 0.4 to 0.6 times, even more preferably 0.45 to 0.55 times that of the tricarboxylic acid anhydride component.

The tricarboxylic acid anhydride component capable of constituting the amide group-containing diimide dicarboxylic acid-based compound is a tricarboxylic acid anhydride component that is same as the tricarboxylic acid anhydride component capable of constituting the diimide dicarboxylic acid-based compound, and specifically, includes an aromatic tricarboxylic acid anhydride component, an alicyclic tricarboxylic acid anhydride component, and an aliphatic tricarboxylic acid anhydride component that are same as those of the tricarboxylic acid anhydride component capable of constituting the diimide dicarboxylic acid-based compound.

From the viewpoint of heat-resisting properties of the amide group-containing diimide dicarboxylic acid-based compound and the epoxy resin-cured product obtained using such compound, the tricarboxylic acid anhydride component of the amide group-containing diimide dicarboxylic acid-based compound preferably contains an aromatic tricarboxylic acid anhydride component and/or an alicyclic tricarboxylic acid anhydride component, more preferably an aromatic tricarboxylic acid anhydride component.

From the viewpoint of further improving the heat-resisting properties of the amide group-containing diimide dicarboxylic acid-based compound and the epoxy resin-cured product obtained using such compound, the tricarboxylic acid anhydride component of the amide group-containing diimide dicarboxylic acid-based compound preferably contains only an aromatic tricarboxylic acid anhydride component and/or an alicyclic tricarboxylic acid anhydride component, more preferably only an aromatic tricarboxylic acid anhydride component.

From the viewpoint of solubility and non-coloring properties of the amide group-containing diimide dicarboxylic acid-based compound, among the above-mentioned tricarboxylic acid anhydride components, it is preferable to use an alicyclic tricarboxylic acid anhydride component and/or an aliphatic tricarboxylic acid anhydride component as the tricarboxylic acid anhydride component of the amide group-containing diimide dicarboxylic acid-based compound.

From the viewpoint of further improving the solubility and non-coloring properties of the amide group-containing diimide dicarboxylic acid-based compound, among the above-mentioned tricarboxylic acid anhydride components, it is preferable to use only an alicyclic tricarboxylic acid anhydride component and/or an aliphatic tricarboxylic acid anhydride component as the tricarboxylic acid anhydride component of the amide group-containing diimide dicarboxylic acid-based compound.

From the viewpoint of versatility, among the above-mentioned tricarboxylic acid anhydride components, the tricarboxylic acid anhydride component of the amide group-containing diimide dicarboxylic acid-based compound preferably contains one or more compounds selected from Group G14 consisting of trimellitic anhydride and 1,2,4-cyclohexanetricarboxylic acid anhydride.

From the viewpoint of further improving the versatility, among the above-mentioned tricarboxylic acid anhydride components, the tricarboxylic acid anhydride component of the amide group-containing diimide dicarboxylic acid-based compound preferably contains only one or more compounds selected from the above-mentioned Group G14.

The amide group-containing diamine component capable of constituting an amide group-containing diimide dicarboxylic acid-based compound includes an amide group-containing aromatic diamine component containing an amide group and an aromatic ring, an amide group-containing alicyclic diamine component containing an amide group and an aliphatic ring but not an aromatic ring, and an amide group-containing aliphatic diamine component that does not contain an aromatic ring and an alicyclic ring. The amide group-containing diamine component may contain an ether group and/or a thioether group, and/or one or more hydrogen atoms may be substituted with a halogen atom (e.g., fluorine atom, chlorine atom, and bromine atom).

Examples of the amide group-containing aromatic diamine component include 4,4'-diaminobenzanilide. One of these may be used alone, or two or more thereof may be used as a mixture.

Examples of the amide group-containing alicyclic diamine component include 4-amino-N-(4-aminocyclohexyl)cyclohexanecarboxamide. One of these may be used alone, or two or more thereof may be used as a mixture.

Examples of the amide group-containing aliphatic diamine component include 4-amino-N-(2-aminoethyl)butaneamide, and 7-amino-N-(2-aminoethyl)heptaneamide. One of these may be used alone, or two or more thereof may be used as a mixture.

From the viewpoint of heat-resisting properties of the amide group-containing diimide dicarboxylic acid-based compound and the epoxy resin-cured product obtained using such compound, the amide group-containing diamine component of the amide group-containing diimide dicarboxylic acid-based compound preferably contains an amide group-containing aromatic diamine component and/or an amide group-containing alicyclic diamine component, more preferably an amide group-containing aromatic diamine component.

From the viewpoint of further improving the heat-resisting properties of the amide group-containing diimide dicarboxylic acid-based compound and the epoxy resin-cured product obtained using such compound, the amide group-containing diamine component of the amide group-containing diimide dicarboxylic acid-based compound preferably contains only an amide group-containing aromatic diamine component and/or an amide group-containing alicyclic diamine component, more preferably only an amide group-containing aromatic diamine component.

From the viewpoint of versatility, among the above-mentioned amide group-containing diamine components, the amide group-containing diamine component of the amide group-containing diimide dicarboxylic acid-based compound preferably contains one or more compounds selected from Group G15 consisting of 4,4'-diaminobenzanilide.

From the viewpoint of further improving the versatility, among the above-mentioned amide group-containing diamine components, the amide group-containing diamine component of the amide group-containing diimide dicarboxylic acid-based compound preferably contains only one or more compounds selected from the above-mentioned Group G15.

(Amide Group-Containing Monoimide Dicarboxylic Acid-Based Compound)

An amide group-containing monoimide dicarboxylic acid-based compound can be produced as follows. Using a tricarboxylic acid anhydride halide component and a monoaminomonocarboxylic acid component as the raw material compounds, a reaction between functional groups is performed to thereby produce an amic acid-based compound, and the amic acid-based compound is then subjected to an imidization reaction. When the monoimide dicarboxylic acid-based compound contains an amide group, for example, the solubility, fluidity at the time of melting, heat-resisting properties and mechanical properties of the epoxy resin-cured product obtained by using such compound can be improved. Here, the reaction between functional groups may be performed in a solution or in a solid phase state, and the production method is not particularly limited. The amide group-containing monoimide dicarboxylic acid-based compound is a compound having one or more amide groups, one imide group, and two carboxyl groups in one molecule.

The amide group-containing monoimide dicarboxylic acid-based compound using a tricarboxylic acid anhydride halide component and a monoaminomonocarboxylic acid component is a compound in which two molecules of the monoaminomonocarboxylic acid component is allowed to react with one molecule of the tricarboxylic acid anhydride halide to thereby form one imide group and one amide group.

In the production of an amide group-containing monoimide dicarboxylic acid-based compound using a tricarboxylic acid anhydride halide component and a monoaminomonocarboxylic acid component, the monoaminomonocarboxylic acid component is usually used in a molar amount of about 2 time the molar amount of the tricarboxylic acid anhydride halide component, for example 1.5 to 10.0 times, preferably 1.8 to 2.2 times, more preferably 1.9 to 2.1 times, even more preferably 1.95 to 2.05 times.

The tricarboxylic acid anhydride halide component capable of constituting the amide group-containing monoimide dicarboxylic acid-based compound is an acid halide of a tricarboxylic acid anhydride component that is same as the tricarboxylic acid anhydride component capable of constituting the diimide dicarboxylic acid-based compound, and specifically, includes acid halides of an aromatic tricarboxylic acid anhydride component, an alicyclic tricarboxylic acid anhydride component, and an aliphatic tricarboxylic acid anhydride component that are same as those of the tricarboxylic acid anhydride component capable of constituting the diimide dicarboxylic acid-based compound.

From the viewpoint of heat-resisting properties of the amide group-containing monoimide dicarboxylic acid-based compound and the epoxy resin-cured product obtained using such compound, the tricarboxylic acid anhydride halide component of the amide group-containing monoimide dicarboxylic acid-based compound preferably contains an acid halide of an aromatic tricarboxylic acid anhydride component and/or an acid halide of an alicyclic tricarboxylic acid anhydride component, more preferably an acid halide of an aromatic tricarboxylic acid anhydride component.

From the viewpoint of further improving the heat-resisting properties of the amide group-containing monoimide dicarboxylic acid-based compound and the epoxy resin-cured product obtained using such compound, the tricarboxylic acid anhydride halide component of the amide group-containing monoimide dicarboxylic acid-based compound preferably contains only an acid halide of an aromatic tricarboxylic acid anhydride component and/or an acid halide of an alicyclic tricarboxylic acid anhydride component, more preferably only an acid halide of an aromatic tricarboxylic acid anhydride component.

From the viewpoint of versatility, among the above-mentioned tricarboxylic acid anhydride halide components, the tricarboxylic acid anhydride halide component of the amide group-containing monoimide dicarboxylic acid-based compound preferably contains one or more compounds selected from Group G16 consisting of trimellitic anhydride chloride.

From the viewpoint of further improving the versatility, among the above-mentioned tricarboxylic acid anhydride halide components, the tricarboxylic acid anhydride halide component of the amide group-containing monoimide dicarboxylic acid-based compound preferably contains only one or more compounds selected from the above-mentioned Group G16.

The monoaminomonocarboxylic acid component capable of constituting the amide group-containing monoimide dicarboxylic acid-based compound is a monoaminomonocarboxylic acid component that is same as the monoaminomonocarboxylic acid component capable of constituting the diimide dicarboxylic acid-based compound, and specifically, includes an aromatic monoaminomonocarboxylic acid component, an alicyclic monoaminomonocarboxylic acid component, and an aliphatic monoaminomonocarboxylic acid component that are same as those of the monoaminomonocarboxylic acid component of the diimide dicarboxylic acid-based compound.

From the viewpoint of heat-resisting properties of the amide group-containing monoimide dicarboxylic acid-based compound and the epoxy resin-cured product obtained using such compound, the monoaminomonocarboxylic acid component of the amide group-containing monoimide dicarboxylic acid-based compound preferably contains an aromatic monoaminomonocarboxylic acid component and/or an alicyclic monoaminomonocarboxylic acid component, more preferably an aromatic monoaminomonocarboxylic acid component.

From the viewpoint of further improving the heat-resisting properties of the amide group-containing monoimide dicarboxylic acid-based compound and the epoxy resin-cured product obtained using such compound, the monoaminomonocarboxylic acid component of the amide group-containing monoimide dicarboxylic acid-based compound preferably contains only an aromatic monoaminomonocarboxylic acid component and/or an alicyclic monoaminomonocarboxylic acid component, more preferably only an aromatic monoaminomonocarboxylic acid component.

From the viewpoint of versatility, among the above-mentioned monoaminomonocarboxylic acid components, the monoaminomonocarboxylic acid component of the amide group-containing monoimide dicarboxylic acid-based compound preferably contains one or more compounds selected from Group G17 consisting of 2-aminobenzoic acid, 3-aminobenzoic acid, 4-aminobenzoic acid, 2-amino-3-methylbenzoic acid, 2-amino-4-methylbenzoic acid, 2-amino-5-methylbenzoic acid, 2-amino-6-methylbenzoic acid, 3-amino-2-methylbenzoic acid, 3-amino-4-methylbenzoic acid, 4-amino-2-methylbenzoic acid, 4-amino-3-methylbenzoic acid, 5-amino-2-methylbenzoic acid, 2-amino-3,4-dimethylbenzoic acid, 2-amino-4,5-dimethylbenzoic acid, 2-amino-4-methoxybenzoic acid, 3-amino-4-methoxybenzoic acid, and 4-amino-2-methoxybenzoic acid.

From the viewpoint of further improving the versatility, among the above-mentioned monoaminomonocarboxylic acid components, the monoaminomonocarboxylic acid component of the amide group-containing monoimide dicarboxylic acid-based compound preferably contains only one or more compounds selected from the above-mentioned Group G17.

(Amide Group-Containing Monoimide Tetracarboxylic Acid-Based Compound)

An amide group-containing monoimide tetracarboxylic acid-based compound can be produced as follows. Using a tricarboxylic acid anhydride halide component and a monoaminodicarboxylic acid component as the raw material compounds, a reaction between functional groups is performed to thereby produce an amic acid-based compound, and the amic acid-based compound is then subjected to an imidization reaction. When the monoimide tetracarboxylic acid-based compound contains an amide group, for example, the heat-resisting properties and mechanical properties of the epoxy resin-cured product obtained by using such compound can be improved. Here, the reaction between functional groups may be performed in a solution or in a solid phase state, and the production method is not particularly limited. The amide group-containing monoimide tetracarboxylic acid-based compound is a compound having one or more amide groups, one imide group, and four carboxyl groups in one molecule.

The amide group-containing monoimide tetracarboxylic acid-based compound using a tricarboxylic acid anhydride halide component and a monoaminodicarboxylic acid component is a compound in which two molecules of the monoaminodicarboxylic acid component is allowed to react with one molecule of the tricarboxylic acid anhydride halide to thereby form one imide group and one amide group.

In the production of an amide group-containing monoimide tetracarboxylic acid-based compound using a tricarboxylic acid anhydride halide component and a monoaminodicarboxylic acid component, the monoaminodicarboxylic acid component is usually used in a molar amount of about 2 time the molar amount of the tricarboxylic acid anhydride halide component, for example 1.5 to 10.0 times, preferably 1.8 to 2.2 times, more preferably 1.9 to 2.1 times, even more preferably 1.95 to 2.05 times.

The tricarboxylic acid anhydride halide component capable of constituting the amide group-containing monoimide tetracarboxylic acid-based compound is an acid halide of a tricarboxylic acid anhydride component that is same as the tricarboxylic acid anhydride component capable of constituting the diimide dicarboxylic acid-based compound, and specifically, includes acid halides of an aromatic tricarboxylic acid anhydride component, an alicyclic tricarboxylic acid anhydride component, and an aliphatic tricarboxylic acid anhydride component that are same as those of the tricarboxylic acid anhydride component capable of constituting the diimide dicarboxylic acid-based compound.

From the viewpoint of heat-resisting properties of the amide group-containing monoimide tetracarboxylic acid-based compound and the epoxy resin-cured product obtained using such compound, the tricarboxylic acid anhydride halide component of the amide group-containing monoimide tetracarboxylic acid-based compound preferably contains an acid halide of an aromatic tricarboxylic acid anhydride component and/or an acid halide of an alicyclic tricarboxylic acid anhydride component, more preferably an acid halide of an aromatic tricarboxylic acid anhydride component.

From the viewpoint of further improving the heat-resisting properties of the amide group-containing monoimide tetracarboxylic acid-based compound and the epoxy resin-cured product obtained using such compound, the tricarboxylic acid anhydride halide component of the amide group-containing monoimide tetracarboxylic acid-based compound preferably contains only an acid halide of an aromatic tricarboxylic acid anhydride component and/or an acid halide of an alicyclic tricarboxylic acid anhydride component, more preferably only an acid halide of an aromatic tricarboxylic acid anhydride component.

From the viewpoint of versatility, among the above-mentioned tricarboxylic acid anhydride halide components, the tricarboxylic acid anhydride halide component of the amide group-containing monoimide tetracarboxylic acid-based compound preferably contains one or more compounds selected from Group G18 consisting of trimellitic anhydride chloride.

From the viewpoint of further improving the versatility, among the above-mentioned tricarboxylic acid anhydride halide components, the tricarboxylic acid anhydride halide component of the amide group-containing monoimide tetracarboxylic acid-based compound preferably contains only one or more compounds selected from the above-mentioned Group G18.

The monoaminodicarboxylic acid component capable of constituting the amide group-containing monoimide tetracarboxylic acid-based compound is a monoaminodicarboxylic acid component that is same as the monoaminodicarboxylic acid component capable of constituting the diimide tetracarboxylic acid-based compound, and specifically, includes an aromatic monoaminodicarboxylic acid component, an alicyclic monoaminodicarboxylic acid component, and an aliphatic monoaminodicarboxylic acid component that are same as those of the monoaminodicarboxylic acid component capable of constituting the diimide tetracarboxylic acid-based compound.

From the viewpoint of heat-resisting properties of the amide group-containing monoimide tetracarboxylic acid-based compound and the epoxy resin-cured product obtained using such compound, the monoaminodicarboxylic acid component of the amide group-containing monoimide tetracarboxylic acid-based compound preferably contains an aromatic monoaminodicarboxylic acid component and/or an alicyclic monoaminodicarboxylic acid component, more preferably an aromatic monoaminodicarboxylic acid component.

From the viewpoint of further improving the heat-resisting properties of the amide group-containing monoimide tetracarboxylic acid-based compound and the epoxy resin-cured product obtained using such compound, the monoaminodicarboxylic acid component of the amide group-containing monoimide tetracarboxylic acid-based compound preferably contains only an aromatic monoaminodicarboxylic acid component and/or an alicyclic monoaminodicarboxylic acid component, more preferably only an aromatic monoaminodicarboxylic acid component.

From the viewpoint of versatility, among the above-mentioned monoaminodicarboxylic acid components, the monoaminodicarboxylic acid component of the amide group-containing monoimide tetracarboxylic acid-based compound preferably contains one or more compounds selected from Group G19 consisting of 2-aminoterephthalic acid, 5-aminoisophthalic acid, 3-aminophthalic acid, and 4-aminophthalic acid.

From the viewpoint of further improving the versatility, among the above-mentioned monoaminodicarboxylic acid components, the monoaminodicarboxylic acid component of the amide group-containing monoimide tetracarboxylic acid-based compound preferably contains only one or more compounds selected from the above-mentioned Group G19.

(Diimide Dicarboxymonohydroxy-Based Compound)

A diimide dicarboxymonohydroxy-based compound can be produced as follows. Using a tricarboxylic acid anhydride component and a monohydroxydiamine component as the raw material compounds, a reaction between functional groups is performed to thereby produce an amic acid-based compound, and the amic acid-based compound is then subjected to an imidization reaction. Here, the reaction between functional groups may be performed in a solution or in a solid phase state, and the production method is not particularly limited. The diimide dicarboxymonohydroxy-based compound is a compound having two imide groups, two carboxy groups, and one hydroxyl group in one molecule.

The diimide dicarboxymonohydroxy-based compound using a tricarboxylic acid anhydride component and a monohydroxydiamine component is a compound in which two molecules of the tricarboxylic acid anhydride component are allowed to react with one molecule of the monohydroxydiamine component to thereby form two imide groups.

In the production of a diimide dicarboxymonohydroxy-based compound using a tricarboxylic acid anhydride component and a monohydroxydiamine component, the monohydroxydiamine component is usually used in a molar amount of about 0.5 times, for example 0.1 to 0.7 times, preferably 0.3 to 0.7 times, more preferably 0.4 to 0.6 times, even more preferably 0.45 to 0.55 times that of the tricarboxylic acid anhydride component.

The tricarboxylic acid anhydride component capable of constituting the diimide dicarboxymonohydroxy-based compound is a tricarboxylic acid anhydride component that is same as the tricarboxylic acid anhydride component capable of constituting the diimide dicarboxylic acid-based compound, and specifically, includes an aromatic tricarboxylic acid anhydride component, an alicyclic tricarboxylic acid anhydride component, and an aliphatic tricarboxylic acid anhydride component that are same as those of the tricarboxylic acid anhydride component capable of constituting the diimide dicarboxylic acid-based compound.

From the viewpoint of heat-resisting properties of the diimide dicarboxy monohydroxy-based compound and the epoxy resin-cured product obtained using such compound, the tricarboxylic acid anhydride component of the diimide dicarboxy monohydroxy-based compound preferably contains an aromatic tricarboxylic acid anhydride component and/or an alicyclic tricarboxylic acid anhydride component, more preferably an aromatic tricarboxylic acid anhydride component.

From the viewpoint of further improving the heat-resisting properties of the diimide dicarboxy monohydroxy-based compound and the epoxy resin-cured product obtained using such compound, the tricarboxylic acid anhydride component of the diimide dicarboxy monohydroxy-based compound preferably contains only an aromatic tricarboxylic acid anhydride component and/or an alicyclic tricarboxylic acid anhydride component, more preferably only an aromatic tricarboxylic acid anhydride component.

From the viewpoint of versatility, among the above-mentioned tricarboxylic acid anhydride components, the tricarboxylic acid anhydride component of the diimide dicarboxy monohydroxy-based compound preferably contains one or more compounds selected from trimellitic anhydride and 1,2,4-cyclohexanetricarboxylic acid anhydride.

From the viewpoint of further improving the versatility, among the above-mentioned tricarboxylic acid anhydride components, the tricarboxylic acid anhydride component of the diimide dicarboxy monohydroxy-based compound preferably contains only one or more compounds selected from trimellitic anhydride and 1,2,4-cyclohexanetricarboxylic acid anhydride.

The monohydroxydiamine component capable of constituting the diimide dicarboxymonohydroxy-based compound includes an aromatic monohydroxydiamine component containing an aromatic ring, an alicyclic monohydroxydiamine component containing an aliphatic ring but not an aromatic ring, and an aliphatic monohydroxydiamine component that does not contain an aromatic ring and an alicyclic ring. The monohydroxydiamine component may contain an ether group and/or a thioether group, and/or one or more hydrogen atoms may be substituted with a halogen atom (e.g., fluorine atom, chlorine atom, and bromine atom).

Examples of the aromatic monohydroxydiamine component include 3,4-diaminophenol, 3,5-diaminophenol, and 2,5-diaminophenol. One of these may be used alone, or two or more thereof may be used as a mixture.

Examples of the alicyclic monohydroxydiamine component include 3,5-diaminocyclohexanol, 3,4-diaminocyclohexanol, and 2,3-diaminocyclohexanol. One of these may be used alone, or two or more thereof may be used as a mixture.

Examples of the aliphatic monohydroxydiamine component include 1,3-diamino-1-propanol and 1,3-diamino-2-propanol. One of these may be used alone, or two or more thereof may be used as a mixture.

From the viewpoint of heat-resisting properties of the diimide dicarboxy monohydroxy-based compound and the epoxy resin-cured product obtained using such compound, the monohydroxydiamine component of the diimide dicarboxy monohydroxy-based compound preferably contains an aromatic monohydroxydiamine component and/or an alicyclic monohydroxydiamine component, more preferably an aromatic monohydroxydiamine component.

From the viewpoint of further improving the heat-resisting properties of the diimide dicarboxy monohydroxy-based compound and the epoxy resin-cured product obtained using such compound, the monohydroxydiamine component of the diimide dicarboxy monohydroxy-based compound preferably contains only an aromatic monohydroxydiamine component and/or an alicyclic monohydroxydiamine component, more preferably only an aromatic monohydroxydiamine component.

From the viewpoint of solubility and non-coloring properties of the diimide dicarboxymonohydroxy-based compound, among the above-mentioned monohydroxydiamine components, it is preferable to use an alicyclic monohydroxydiamine component and/or an aliphatic monohydroxydiamine component as the monohydroxydiamine component of the diimide dicarboxymonohydroxy-based compound.

From the viewpoint of further improving the solubility and non-coloring properties of the diimide dicarboxymonohydroxy-based compound, among the above-mentioned monohydroxydiamine components, it is preferable to use only an alicyclic monohydroxydiamine component and/or an aliphatic monohydroxydiamine component as the monohydroxydiamine component of the diimide dicarboxymonohydroxy-based compound.

From the viewpoint of versatility, among the above-mentioned monohydroxydiamine components, the monohydroxydiamine component of the diimide dicarboxymonohydroxy-based compound preferably contains one or more compounds selected from Group G22 consisting of 3,4-diaminophenol, 3,5-diaminophenol, and 2,5-diaminophenol.

From the viewpoint of further improving the versatility, among the above-mentioned monohydroxydiamine components, the monohydroxydiamine component of the diimide dicarboxymonohydroxy-based compound preferably contains only one or more compounds selected from the above-mentioned Group G22.

(Diimide Dicarboxydihydroxy-Based Compound)

A diimide dicarboxydihydroxy-based compound can be produced as follows. Using a tricarboxylic acid anhydride component and a dihydroxydiamine component as the raw material compounds, a reaction between functional groups is performed to thereby produce an amic acid-based compound, and the amic acid-based compound is then subjected to an imidization reaction. Here, the reaction between functional groups may be performed in a solution or in a solid phase state, and the production method is not particularly limited. The diimide dicarboxydihydroxy-based compound is a compound having two imide groups, two carboxy groups, and two hydroxyl groups in one molecule.

The diimide dicarboxydihydroxy-based compound using a tricarboxylic acid anhydride component and a dihydroxydiamine component is a compound in which two molecules of the tricarboxylic acid anhydride component are allowed to react with one molecule of the dihydroxydiamine component to thereby form two imide groups.

In the production of a diimide dicarboxydihydroxy-based compound using a tricarboxylic acid anhydride component and a dihydroxydiamine component, the dihydroxydiamine component is usually used in a molar amount of about 0.5 times, for example 0.1 to 0.7 times, preferably 0.3 to 0.7 times, more preferably 0.4 to 0.6 times, even more preferably 0.45 to 0.55 times that of the tricarboxylic acid anhydride component.

The tricarboxylic acid anhydride component capable of constituting the diimide dicarboxydihydroxy-based compound is a tricarboxylic acid anhydride component that is same as the tricarboxylic acid anhydride component capable of constituting the diimide dicarboxylic acid-based compound, and specifically, includes an aromatic tricarboxylic acid anhydride component, an alicyclic tricarboxylic acid anhydride component, and an aliphatic tricarboxylic acid anhydride component that are same as those of the tricarboxylic acid anhydride component capable of constituting the diimide dicarboxylic acid-based compound.

From the viewpoint of heat-resisting properties of the diimide dicarboxydihydroxy-based compound and the epoxy resin-cured product obtained using such compound, the tricarboxylic acid anhydride component of the diimide dicarboxydihydroxy-based compound preferably contains an aromatic tricarboxylic acid anhydride component and/or an alicyclic tricarboxylic acid anhydride component, more preferably an aromatic tricarboxylic acid anhydride component.

From the viewpoint of further improving the heat-resisting properties of the diimide dicarboxydihydroxy-based compound and the epoxy resin-cured product obtained using such compound, the tricarboxylic acid anhydride component of the diimide dicarboxydihydroxy-based compound preferably contains only an aromatic tricarboxylic acid anhydride component and/or an alicyclic tricarboxylic acid anhydride component, more preferably only an aromatic tricarboxylic acid anhydride component.

From the viewpoint of versatility, among the above-mentioned tricarboxylic acid anhydride components, the tricarboxylic acid anhydride component of the diimide dicarboxydihydroxy-based compound preferably contains one or more compounds selected from trimellitic anhydride and 1,2,4-cyclohexanetricarboxylic acid anhydride.

From the viewpoint of further improving the versatility, among the above-mentioned tricarboxylic acid anhydride components, the tricarboxylic acid anhydride component of the diimide dicarboxydihydroxy-based compound preferably contains only one or more compounds selected from trimellitic anhydride and 1,2,4-cyclohexanetricarboxylic acid anhydride.

The dihydroxydiamine component capable of constituting the diimide dicarboxydihydroxy-based compound includes an aromatic dihydroxydiamine component containing an aromatic ring, an alicyclic dihydroxydiamine component containing an aliphatic ring but not an aromatic ring, and an aliphatic dihydroxydiamine component that does not contain an aromatic ring and an alicyclic ring. The dihydroxydiamine component may contain an ether group and/or a thioether group, and/or one or more hydrogen atoms may be substituted with a halogen atom (e.g., fluorine atom, chlorine atom, and bromine atom).

Examples of the aromatic dihydroxydiamine component include 4,6-diaminoresorcin, 3,3'-dihydroxybenzidine, 2,2-bis(3-amino-4-hydroxyphenyl)-hexafluoropropane. One of these may be used alone, or two or more thereof may be used as a mixture.

Examples of the alicyclic dihydroxydiamine component include 4,5-diamino-1,2-cyclohexanediol. One of these may be used alone, or two or more thereof may be used as a mixture.

From the viewpoint of heat-resisting properties of the diimide dicarboxydihydroxy-based compound and the epoxy resin-cured product obtained using such compound, the dihydroxydiamine component of the diimide dicarboxydihydroxy-based compound preferably contains an aromatic dihydroxydiamine component and/or an alicyclic dihydroxydiamine component, more preferably an aromatic dihydroxydiamine component.

From the viewpoint of further improving the heat-resisting properties of the diimide dicarboxydihydroxy-based compound and the epoxy resin-cured product obtained using such compound, the dihydroxydiamine component of the diimide dicarboxydihydroxy-based compound preferably contains only an aromatic dihydroxydiamine component and/or an alicyclic dihydroxydiamine component, more preferably only an aromatic dihydroxydiamine component.

From the viewpoint of solubility and non-coloring properties of the diimide dicarboxydihydroxy-based compound, among the above-mentioned dihydroxydiamine components, it is preferable to use an alicyclic dihydroxydiamine component and/or an aliphatic dihydroxydiamine component as the dihydroxydiamine component of the diimide dicarboxydihydroxy-based compound.

From the viewpoint of further improving the solubility and non-coloring properties of the diimide dicarboxydihydroxy-based compound, among the above-mentioned dihydroxydiamine components, it is preferable to use only an alicyclic dihydroxydiamine component and/or an aliphatic dihydroxydiamine component as the dihydroxydiamine component of the diimide dicarboxydihydroxy-based compound.

From the viewpoint of versatility, among the above-mentioned dihydroxydiamine components, the dihydroxydiamine component of the diimide dicarboxydihydroxy-based compound preferably contains one or more compounds selected from Group G23 consisting of 4,6-diaminoresorcin, 3,3'-dihydroxybenzidine, and 2,2-bis(3-amino-4-hydroxyphenyl)-hexafluoropropane.

From the viewpoint of further improving the versatility, among the above-mentioned dihydroxydiamine components, the dihydroxydiamine component of the diimide dicarboxydihydroxy-based compound preferably contains only one or more compounds selected from the above-mentioned Group G23.

(Triimide Tricarboxymonohydroxy-Based Compound)

A triimide tricarboxymonohydroxy-based compound can be produced as follows. Using a tricarboxylic acid anhydride component and a monohydroxytriamine component as the raw material compounds, a reaction between functional groups is performed to thereby produce an amic acid-based compound, and the amic acid-based compound is then subjected to an imidization reaction. Here, the reaction between functional groups may be performed in a solution or in a solid phase state, and the production method is not particularly limited. The triimide tricarboxymonohydroxy-based compound is a compound having three imide groups, three carboxy groups, and one hydroxyl group in one molecule.

The triimide tricarboxymonohydroxy-based compound using a tricarboxylic acid anhydride component and a monohydroxytriamine component is a compound in which three molecules of the tricarboxylic acid anhydride component are allowed to react with one molecule of the monohydroxytriamine component to thereby form three imide groups.

In the production of a triimide tricarboxymonohydroxy-based compound using a tricarboxylic acid anhydride component and a monohydroxytriamine component, the monohydroxytriamine component is usually used in a molar amount of about 0.33 times, for example 0.1 to 0.7 times, preferably 0.2 to 0.6 times, more preferably 0.25 to 0.5 times, even more preferably 0.3 to 0.4 times that of the tricarboxylic acid anhydride component.

The tricarboxylic acid anhydride component capable of constituting the triimide tricarboxymonohydroxy-based compound is a tricarboxylic acid anhydride component that is same as the tricarboxylic acid anhydride component capable of constituting the diimide dicarboxylic acid-based compound, and specifically, includes an aromatic tricarboxylic acid anhydride component, an alicyclic tricarboxylic acid anhydride component, and an aliphatic tricarboxylic acid anhydride component that are same as those of the tricarboxylic acid anhydride component capable of constituting the diimide dicarboxylic acid-based compound.

From the viewpoint of heat-resisting properties of the triimide tricarboxy monohydroxy-based compound and the epoxy resin-cured product obtained using such compound, the tricarboxylic acid anhydride component of the triimide tricarboxy monohydroxy-based compound preferably contains an aromatic tricarboxylic acid anhydride component and/or an alicyclic tricarboxylic acid anhydride component, more preferably an aromatic tricarboxylic acid anhydride component.

From the viewpoint of further improving the heat-resisting properties of the triimide tricarboxy monohydroxy-based compound and the epoxy resin-cured product obtained using such compound, the tricarboxylic acid anhydride component of the triimide tricarboxy monohydroxy-based compound preferably contains only an aromatic tricarboxylic acid anhydride component and/or an alicyclic tricarboxylic acid anhydride component, more preferably only an aromatic tricarboxylic acid anhydride component.

From the viewpoint of versatility, among the above-mentioned tricarboxylic acid anhydride components, the tricarboxylic acid anhydride component of the triimide tricarboxymonohydroxy-based compound preferably contains one or more compounds selected from trimellitic anhydride and 1,2,4-cyclohexanetricarboxylic acid anhydride.

From the viewpoint of further improving the versatility, among the above-mentioned tricarboxylic acid anhydride components, the tricarboxylic acid anhydride component of the triimide tricarboxy monohydroxy-based compound preferably contains only one or more compounds selected from trimellitic anhydride and 1,2,4-cyclohexanetricarboxylic acid anhydride.

The monohydroxytriamine component capable of constituting the triimide tricarboxymonohydroxy-based compound includes an aromatic monohydroxytriamine component containing an aromatic ring, an alicyclic monohydroxytriamine component containing an alicyclic ring but not an aromatic ring, and an aliphatic monohydroxytriamine component that does not contain an aromatic ring and an alicyclic ring. The monohydroxytriamine component may contain an ether group and/or a thioether group, and/or one or more hydrogen atoms may be substituted with a halogen atom (e.g., fluorine atom, chlorine atom, and bromine atom).

Examples of the aromatic monohydroxytriamine component include 2,4,6-triaminophenol. One of these may be used alone, or two or more thereof may be used as a mixture.

From the viewpoint of heat-resisting properties of the triimide tricarboxy monohydroxy-based compound and the epoxy resin-cured product obtained using such compound, the monohydroxy triamine component of the triimide tricarboxy monohydroxy-based compound preferably contains an aromatic monohydroxy triamine component and/or an alicyclic monohydroxy triamine component, more preferably an aromatic monohydroxy triamine component.

From the viewpoint of further improving the heat-resisting properties of the triimide tricarboxy monohydroxy-based compound and the epoxy resin-cured product obtained using such compound, the monohydroxy triamine component of the triimide tricarboxy monohydroxy-based compound preferably contains only an aromatic monohydroxy triamine component and/or an alicyclic monohydroxy triamine component, more preferably only an aromatic monohydroxy triamine component.

From the viewpoint of solubility and non-coloring properties of the triimide tricarboxymonohydroxy-based compound, among the above-mentioned monohydroxytriamine components, it is preferable to use an alicyclic monohydroxytriamine component and/or an aliphatic monohydroxytriamine component as the monohydroxytriamine component of the triimide tricarboxymonohydroxy-based compound.

From the viewpoint of further improving the solubility and non-coloring properties of the triimide tricarboxymonohydroxy-based compound, among the above-mentioned monohydroxytriamine components, it is preferable to use only an alicyclic monohydroxytriamine component and/or an aliphatic monohydroxytriamine component as the monohydroxytriamine component of the triimide tricarboxymonohydroxy-based compound.

From the viewpoint of versatility, among the above-mentioned monohydroxytriamine components, the monohydroxytriamine component of the triimide tricarboxymonohydroxy-based compound preferably contains one or more compounds selected from Group G24 consisting of 2,4,6-triaminophenol.

From the viewpoint of further improving the versatility, among the above-mentioned monohydroxytriamine components, the monohydroxytriamine component of the triimide tricarboxymonohydroxy-based compound preferably contains only one or more compounds selected from the above-mentioned Group G24.

In the epoxy resin solution of the present invention, a curing agent different from the imide group-containing curing agent may be used in combination as the curing agent. Examples of other curing agents include aliphatic polyamine compounds such as diethylenetriamine, triethylenetetramine, tetraethylenepentamine, dicyandiamine, adipic acid dihydrazide, and polyamidepolyamine; alicyclic polyamine compounds such as mensendiamine, isophoronediamine, bis(4-amino)-3-methylcyclohexyl)methane, and bis(4-aminocyclohexyl)methane; aromatic polyamine compounds such as meta-xylenediamine, diaminodiphenylmethane, diaminodiphenylsulfone, and meta-phenylenediamine; monofunctional acid anhydrides such as phthalic anhydride, tetrahydrophthalic anhydride, hexahydrophthalic anhydride, methyltetrahydrophthalic anhydride, methylhexahydrophthalic anhydride, methylnadic anhydride, dodecyl succinic anhydride, and chlorendic anhydride; bifunctional acid anhydrides such as pyromellitic dianhydride, benzophenonetetracarboxylic anhydride, ethylene glycol bis(anhydrotrimate), and methylcyclohexane tetracarboxylic anhydride; and free acid anhydrous carboxylic acid such as trimellitic anhydride and polyazelaic anhydride. The other curing agents may be used alone or in combination of two or more thereof.

(Production Method of Imide Group-Containing Curing Agent)

The imide group-containing curing agent can be produced in a solvent or in the absence of a solvent, but the production method is not particularly limited.

A method for producing an imide group-containing curing agent in a solvent comprises in, for example, adding a predetermined raw material (e.g., an acid anhydride, and a diamine, a diaminomonocarboxylic acid, a monoaminodicarboxylic acid, a monoaminomonocarboxylic acid, a triamine, a tetraamine, a monohydroxymonoamine, a monohydroxydiamine, a dihydroxydiamine, or a monohydroxytriamine) to an aprotic solvent such as N-methyl 2-pyrrolidone and stirring the mixture at 80° C. to perform imidization.

The imidization method is not particularly limited, and for example, a heating imidization method performed by heating to 250° C. to 300° C. in a nitrogen atmosphere, or a chemical imidization method performed by treating with a cyclodehydration reagent such as a mixture of a carboxylic acid anhydride and a tertiary amine may be used.

Examples of the method for producing an imide group-containing curing agent in the absence of a solvent include a method utilizing a mechanochemical effect. The method utilizing a mechanochemical effect is a method for obtaining an organic compound by utilizing mechanical energy generated when a raw material compound used in the reaction is pulverized, to exhibit a mechanochemical effect.

The mechanochemical effect is an effect (or phenomenon) in which a raw material compound in a solid state under a reactive environment is pulverized by applying mechanical energy (compressive force, shearing force, impact force, grinding force, etc.) to the raw material compound, to thereby activate the pulverization interface thus formed. This causes a reaction between functional groups. The reaction between functional groups usually occurs between two or more raw material compound molecules. For example, the reaction between functional groups may occur between two raw material compound molecules having different chemical structures, or between two raw material compound molecules having the same chemical structure. The reaction between functional groups occur not only between a limited set of two raw material compound molecules, but also usually occur between other sets of two raw material compound molecules. A new reaction between functional groups may occur between a compound molecule formed by the reaction between functional groups, and the raw material compound molecule. The reaction between functional groups is usually a chemical reaction, which allows the functional group of each raw material compound molecule to form a bond group (particularly a covalent bond) between the two raw material compound molecules, to thereby form another compound molecule.

The reactive environment means an environment in which the raw material compound is placed for the reaction, that is, an environment in which mechanical energy is applied, and may be, for example, an environment in an apparatus. Being in a solid state under a reactive environment means being in a solid state under an environment where mechanical energy is applied (e.g., under a temperature and a pressure in an apparatus). The raw material compound in the solid state under the reactive environment may usually be in a solid state at normal temperature (25° C.) and normal pressure (101.325 kPa). The raw material compound in the solid state under the reactive environment may be in a solid state at the start of applying mechanical energy. In the present invention, as the mechanical energy continues to be applied, the temperature and/or pressure increases, so that the raw material compound in the solid state under the reactive environment may still be changed to be in a liquid state (e.g., a molten state) during the reaction (or treatment), but from the viewpoint of improving the reaction rate, it is preferable that the raw material compound is continuously in the solid state during the reaction (or treatment).

The details of the mechanochemical effect are not clear, but it is considered to follow the following principle. When mechanical energy is applied to one or more raw material compounds in a solid state to cause pulverization, the pulverization interface is activated by absorption of the mechanical energy. It is considered that surface active energy of such a pulverization interface causes a chemical reaction between two raw material compound molecules. Pulverization means that when mechanical energy is applied to the raw material compound particles, the particles absorb the mechanical energy, so that cracks occur in the particles, and their surfaces are renewed. Renewing the surface means forming a pulverization interface as a new surface. In the mechanochemical effect, the state of the new surface formed by surface renewal is not particularly limited as long as the pulverization interface is activated due to the pulverization, and may be in a dry state or in a wet state. The wet state of the new surface due to the surface renewal is caused by the raw material compound in the liquid state different from the raw material compound in the solid state.

The mechanical energy is applied to a raw material mixture containing one or more raw material compounds that are in a solid state under the reactive environment. The state of the raw material mixture is not particularly limited as long as the raw material compound in the solid state is pulverized by applying the mechanical energy. For example, the raw material mixture may be in a dry state due to the fact that all the raw material compounds contained in the raw material mixture are in a solid state. Further, for example, the raw material mixture may be in a wet state due to the fact that at least one raw material compound contained in the raw material mixture is in a solid state and the remaining raw material compounds are in a liquid state. Specifically, for example, when the raw material mixture contains only one raw material compound, the one raw material compound is in a solid state. Further, for example, when the raw material mixture contains two raw material compounds, the two raw material compounds may be in a solid state, or one of the raw material compounds may be in a solid state and the other raw material compound may be in a liquid state.

In the method utilizing the mechanochemical effect, the functional group is a monovalent group (atomic group) that can become a cause of reactivity in the molecular structure, and is used in a concept other than an unsaturated bond group (e.g., radical polymerizable group) such as a carbon-carbon double bond group or a carbon-carbon triple bond group. The functional group is a group containing a carbon atom and a hetero atom. The hetero atom is one or more atoms selected from the group consisting of an oxygen atom, a nitrogen atom, and a sulfur atom, particularly the group consisting of an oxygen atom and a nitrogen atom. The functional group may further contain a hydrogen atom. Usually two functional groups are subjected to the reaction, and a raw material compound molecule having one functional group and a raw material compound molecule having the other functional group may be different or identical in structure. The reaction allows a bond (particularly a covalent bond) to be formed between the two raw material compound molecules, thereby forming one molecule. Small molecules such as water, carbon dioxide, and/or alcohol may or may not be by-produced through the reaction between functional groups.

The reaction between functional groups may be a reaction between any functional groups (particularly monovalent functional groups) capable of chemically reacting with each other, and is, for example, a reaction between two functional groups selected from the group consisting of a carboxyl group and a halide (group) thereof, an acid anhydride group, an amino group, an isocyanate group, a hydroxyl group, and the like. The two functional groups are not particularly limited as long as a they causes a chemical reaction, and may be, for example, two functional groups having different chemical structures or two functional groups having the same chemical structure.

Examples of the reaction between functional groups include a condensation reaction, an addition reaction, or a composite reaction thereof, and the like.

The condensation reaction is a reaction in which a bond or link between raw material compound molecules is achieved with elimination of small molecules such as water, carbon dioxide, and alcohol between the raw material compound molecules. Examples of the condensation reaction include a reaction in which an amide group is formed (amidation reaction), a reaction in which an imide group is formed (imidization reaction), and a reaction in which an ester group is formed (esterification reaction).

The addition reaction is an addition reaction performed between functional groups, and is a reaction in which a bond or link between raw material compound molecules is achieved without elimination of small molecules between the raw material compound molecules. Examples of the addition reaction include a reaction in which a urea group is formed, a reaction in which a urethane group is formed, and a reaction in which a ring structure is opened (that is, a ring-opening reaction). The ring-opening reaction is a reaction in which, in a raw material compound having a ring structure (e.g., an acid anhydride group-containing compound, a cyclic amide compound, a cyclic ester compound, and an epoxy compound), a part of the ring structure is cleaved, and a bond or link between the cleaved site and a functional group of the other raw material compound is achieved. The ring-opening reaction results in the formation of, for example, an amide group, a carboxyl group, an ester group, and an ether group. In particular, in the ring-opening reaction of an acid anhydride group in an acid anhydride group-containing compound as the raw material compound, the acid anhydride group is opened, and a bond or a link with another raw material compound molecule (amino group or hydroxyl group) is achieved. As a result, for example, an amide group or an ester group, and a carboxyl group are simultaneously formed.

More specifically, the reaction between functional groups may be, for example, one or more reactions selected from the group consisting of the following reactions:

(A) A reaction in which an acid anhydride group and an amino group are allowed to react to form (a1) an amide group and a carboxyl group, (a2) an imide group, (a3) an isoimide group or (a4) a mixture thereof;

(B) a reaction in which an acid anhydride group and an isocyanate group are allowed to react to form an imide group;

(C) a reaction in which a carboxyl group or a halide (group) thereof and an amino group or an isocyanate group are allowed to react to form an amide group;

(D) a reaction in which a carboxyl group or a halide (group) thereof and a hydroxyl group are allowed to react to form an ester group;

(E) a reaction in which an isocyanate group and an amino group are allowed to react to form a urea group;

(F) a reaction in which an isocyanate group and a hydroxyl group are allowed to react to form a urethane group; and (G) a reaction in which an acid anhydride group and a hydroxyl group are allowed to react to form an ester group and a carboxyl group.

In the method for producing an imide group-containing curing agent in the absence of a solvent, after the method utilizing the mechanochemical effect is performed, imidization may be performed by the same method as the imidization method in the method for producing it in a solvent.

[Epoxy Resin]

The epoxy resin used in the present invention is not particularly limited as long as it is an organic compound having two or more epoxy groups in one molecule. Specific examples of the epoxy resin include bisphenol A type epoxy resin, bisphenol A type epoxy resin, bisphenol F type epoxy resin, bisphenol S type epoxy resin, naphthalene type epoxy resin, bisphenyl type epoxy resin, dicyclopentadiene type epoxy resin, phenol novolac type epoxy resin, cresol novolac type epoxy resin, isocyanurate type epoxy resin, alicyclic epoxy resin, acrylic acid modified epoxy resin, polyfunctional epoxy resin, brominated epoxy resin, and phosphorus modified epoxy resin. The epoxy resins may be used alone or in combination of two or more thereof. The epoxy group may be a glycidyl group.

The epoxy resin usually has an epoxy equivalent of 100 to 3000, preferably 150 to 300.

[Organic Solvent]

The organic solvent used in the epoxy resin solution of the present invention is not particularly limited as long as the curing agent and the epoxy resin can be uniformly dissolved, and a non-halogenated solvent is preferable from the viewpoint of environmental impact. Examples of such a non-halogenated solvent include amide compounds such as N,N-dimethylformamide, N,N-dimethylacetamide, and N-methyl-2-pyrrolidone. All of these non-halogenated solvents are useful as general purpose solvents. The organic solvents may be used alone or in combination of two or more thereof

[Additive]

The epoxy resin solution of the present invention may contain a curing accelerator. The curing accelerator is not particularly limited, and examples thereof include imidazoles such as 2-methylimidazole, 2-ethyl-4-methylimidazole, and 2-phenylimidazole; tertiary amines such as 4-dimethylaminopyridine, benzyldimethylamine, 2-(dimethylaminomethyl)phenol, and 2,4,6-tris(dimethylaminomethyl)phenol; and organic phosphines such as triphenylphosphine and tributylphosphine. The curing accelerators may be used alone or in combination of two or more thereof.

The formulating amount of the curing accelerator is not particularly limited, and is, for example, from 0.01 to 2% by mass with respect to the total amount of the epoxy resin solution, and is preferably from 0.01 to 1% by mass, more preferably from 0.05 to 0.5% by mass, from the viewpoint of further improving the heat-resisting properties and dielectric properties of the epoxy resin-cured product.

The epoxy resin solution of the present invention may further contain a thermosetting resin such as a cyanate resin, an isocyanate resin, a maleimide resin, a polyimide resin, a urethane resin, or a phenol resin.

The epoxy resin solution of the present invention may further contain an inorganic filler. Examples of the inorganic filler include silica, glass, alumina, talc, mica, barium sulfate, aluminum hydroxide, magnesium hydroxide, calcium carbonate, magnesium carbonate, magnesium oxide, titanium oxide, silicon nitride, and boron nitride. The inorganic fillers may be used alone or in combination of two or more thereof. Further, the inorganic filler is preferably surface-treated with a surface treatment agent such as an epoxy silane coupling agent or an amino silane coupling agent.

The epoxy resin solution of the present invention may contain an antioxidant as long as its properties are not impaired. Examples of the antioxidant include hindered phenol-based antioxidants, phosphorus-based antioxidants, and thioether-based antioxidants.

Examples of the hindered phenol-based antioxidant include 1,3,5-tris(3,5-di-t-butyl-4-hydroxybenzyl)isocyanurate and 1,1,3-tri(4-hydroxy-2-methyl-5-t-butylphenyl)butane.

Examples of the phosphorus-based antioxidant include 3,9-bis(p-nonylphenoxy)-2,4,8,10-tetraoxa-3,9-diphosphaspiro[5.5]undecane and 3,9-bis(octadecyloxy)-2,4,8,10-tetraoxa-3,9-diphosphaspiro[5.5]undecane.

Examples of the thioether-based antioxidant include 4,4'-thiobis[2-t-butyl-5-methylphenol] bis[3-(dodecylthio)propionate].

The antioxidants may be used alone or in combination of two or more thereof.

The epoxy resin composition of the present invention may contain a flame retardant. Halogen-free flame retardants are preferable from the viewpoint of environmental impact. Examples of the flame retardant include phosphorus-based flame retardants, nitrogen-based flame retardants, and silicone-based flame retardants. The flame retardants may be used alone or in combination of two or more thereof <Production Method of Epoxy Resin Solution>

The method for producing the epoxy resin solution of the present invention is not particularly limited, and may be, for example, an individual dissolution method, a batch dissolution method, or the like. The individual dissolution method is preferable from the viewpoint of obtaining a uniform resin solution in a short time. The individual dissolution method is a method in which an imide group-containing curing agent and an epoxy resin are separately mixed with an organic solvent and dissolved in advance, and then the resulting mixtures are mixed. The batch dissolution method is a method in which an imide group-containing curing agent and an epoxy resin are simultaneously mixed with an organic solvent and then dissolved. In the individual dissolution method and the batch dissolution method, the mixing temperature is not particularly limited and may be, for example, from 80 to 180° C., particularly from 100 to 160° C. The heating to achieve the mixing temperature may be, for example, reflux heating of an organic solvent.

In the epoxy resin solution of the present invention, the formulating amount of the imide group-containing curing agent is preferably such an amount that the imide group-containing curing agent has a functional group equivalent of preferably from 0.5 to 1.5, more preferably from 0.7 to 1.3 in terms of equivalent ratio to the epoxy equivalent of the epoxy resin, from the viewpoint of further improving the heat-resisting properties and dielectric properties of the obtained epoxy resin-cured product. The functional group equivalent of the imide group-containing curing agent corresponds to the equivalent calculated from the contents of the hydroxy group and the carboxyl group.

In the epoxy resin solution of the present invention, the total formulating amount of the imide group-containing curing agent and the epoxy resin is not particularly limited, and is preferably from 30 to 90% by mass, more preferably from 40 to 80% by mass, even more preferably from 50 to 70% by mass, based on the total amount of the epoxy resin solution, from the viewpoint of further improving the heat-resisting properties and dielectric properties of the obtained epoxy resin-cured product.

The epoxy resin solution of the present invention usually has a viscosity of 10 to 70 Pa·s, particularly 40 to 60 Pa·s, and does not have a so-called gel form. A gel does not have a viscosity and is generally a solid state having no fluidity.

Specifically, when the epoxy resin solution of the present invention is mixed with an additional solvent, the mixed solution and solvent are easily compatible with each other and are uniformly mixed at the molecular level as a whole. However, even when the gel is mixed with an additional solvent, the mixed gel and solvent remain in massive form without being compatible with each other and are not uniformly mixed at the molecular level as a whole. When the compatibility is determined, 100 g of the solution or gel and 100 g of an additional solvent may usually be mixed under stirring conditions of normal temperature (25° C.), normal pressure (101.325 kPa), and 100 rpm. At this time, the "additional solvent" is a solvent that is compatible with the solvent contained in the solution or gel, and is, for example, a solvent represented by the same structural formula as the solvent contained in the solution or gel. The viscosity of the epoxy resin solution is the viscosity at 30° C. measured by a Brookfield Digital Viscometer.

The epoxy resin solution of the present invention may have a relatively low viscosity as described above because the epoxy resin is unlikely to react unexpectedly. Therefore, the epoxy resin solution of the present invention can be used to produce a cured product with adequate working properties. Specifically, the epoxy resin solution of the present invention usually has a reaction rate of 10% or less. Reaction rate is the rate of the number of glycidyl groups reacted in the epoxy resin solution to the total number of glycidyl groups contained in the epoxy resin.

<Use of Epoxy Resin Solution>

A film can be obtained by applying the epoxy resin solution of the present invention on a substrate, drying to form a coat and peeling the coat from the substrate.

Examples of the substrate include a PET film, a polyimide film, a glass plate, a stainless steel plate, and an aluminum plate. Examples of the applying method include a wire bar coater coating method, a film applicator coating method, a brush coating method, a spray coating method, a gravure roll coating method, a screen printing method, a reverse roll coating method, a lip coating method, an air knife coating method, a curtain flow coating method, and a dip coating method.

The epoxy resin solution of the present invention is impregnated into or applied to a reinforcing fiber cloth and then dried to obtain a prepreg.

Examples of the reinforcing fiber constituting the reinforcing fiber cloth include a glass fiber, a carbon fiber, an organic fiber, and a ceramic fiber. Any form of these reinforcing fibers such as woven fabric and non-woven fabric can be used. In addition, synthetic paper obtained by mixing and papermaking these fibers in the state of short fibers using fibrid may be used. Among them, glass fibers and carbon fibers are preferable because they are excellent in processability. The reinforcing fiber cloth preferably has a thickness of 5 to 50 μm, more preferably 10 to 45 μm, and even more preferably 15 to 40 μm.

The method of impregnating the reinforcing fiber cloth with the epoxy resin solution is not particularly limited, and a known method can be used. Examples of the impregnation method include a method using a commercially available or a self-made continuous impregnation device, a method of immersing the reinforcing fiber in the epoxy resin solution, and a method of spreading the reinforcing fiber on a plate such as a release paper, a glass plate, or a stainless steel plate, and then coating the fiber with the epoxy resin solution. The prepreg is obtained by, after the coating, evaporating and drying an organic solvent from the coated epoxy resin solution.

The method of coating the reinforcing fiber cloth with the epoxy resin solution is not particularly limited, and a known method can be used. As the coating method, for example, coating can be performed using a commercially available coating machine. In the case of performing double-sided coating, a method of coating one surface, drying the coated surface once, and then coating the other surface, a method of coating one surface and then coating the other surface without drying, or a method of simultaneously coating both surfaces may be used. These coating methods can be appropriately selected in consideration of working properties and the performance of the obtained prepreg. The prepreg is obtained by, after the coating, evaporating and drying an organic solvent from the coated epoxy resin solution.

The thickness of the prepreg varies depending on the thickness of the reinforcing fiber cloth used, and is preferably from 10 to 150 μm, more preferably from 20 to 140 μm, and even more preferably from 30 to 130 μm. The prepreg can be obtained by impregnating or coating the reinforcing fiber cloth with the epoxy resin solution and then drying the cloth. However, by providing the prepreg with a thickness of approximately three times the thickness of the reinforcing fiber cloth used, a prepreg having excellent heat-resisting properties, dielectric properties, mechanical properties, adhesiveness, and appearance can be obtained.

The prepreg of the present invention can be used as it is without heat treatment for curing or the like. Further, since the imide group-containing curing agent contained in the prepreg melts and exhibits fluidity when heated above its glass transition temperature, the prepreg can be densified as it is or by laminating several sheets and heat-pressing, to form a laminated body. Since the laminated body is excellent in adhesiveness between prepregs, it exhibits sufficiently improved mechanical strength, and also excellent in heat-resisting properties and dielectric properties. Further, the laminated body can be used as a high-strength plate-like molded body. Further, this plate-like molded body can be molded into a desired shape. For moldability, though depending on the material of the reinforcing fiber cloth used and the amount of solids contained in the prepreg, shaping corresponding to a predetermined mold is possible. Punching or the like may be performed within a range that does not significantly impair the mechanical properties. Cold working is possible for shaping and punching, but warming working can also be performed if necessary.

By heating the coat, film, prepreg and its laminated body obtained using the epoxy resin solution of the present invention, the imide group-containing curing agent and the epoxy resin can be allowed to react to completely achieve curing. The heating temperature (curing temperature) is usually from 80 to 350° C., preferably from 130 to 300° C. The heating time (curing time) is usually from 1 minute to 20 hours, preferably from 5 minutes to 10 hours.

With the epoxy resin solution of the present invention, a cured product adequately excellent in heat-resisting properties and dielectric properties can be obtained. The obtained cured products can be suitably used as electric and electronic components such as printed wiring boards (particularly insulating materials for printed wiring boards), molding materials for bushing transformers, molding materials for solid insulation switch gears, electric penetration for nuclear power plants, semiconductor sealing materials and build-up laminated boards, and lightweight and high-strength materials such as carbon fiber reinforced plastics and glass fiber reinforced plastics.

EXAMPLES

While in the following, the present invention will be specifically described with reference to Examples, the present invention is not limited thereto. The evaluation and measurement were performed by the following methods.

A. Evaluation and Measurement

[Preparation and Evaluation Methods of Imide Group-Containing Curing Agent]

(1) Preparation Method of Imide Group-Containing Curing Agent

A sample of 150 g obtained by mixing an acid component and an amine component in the ratio listed in the table was subjected to mixing/pulverization three times with a Wonder Crusher (Osaka Chemical Co., Ltd.) WC-3C at a rotation speed of approximately 9000 rpm for 1 minute to perform mechanochemical treatment.

The treated sample was transferred to a glass container and subjected to an imidization reaction in an inert oven (Yamato Scientific Co., Ltd.) DN411I at a firing temperature of 300° C. for a firing time of 2 hours in a nitrogen atmosphere.

The identification of an imide group-containing curing agent was performed based on the facts that the molecular weight is the same as the molecular weight of the target structure and that there is absorption derived from an imide group in infrared spectroscopy, as described later.

(2) Molecular Weight of Imide Group-Containing Curing Agent

The molecular weight was determined by measuring under the following conditions with a high-performance liquid chromatograph-mass spectrometer (LC/MS).

Sample: Imide group-containing curing agent/DMSO solution (200 μg/mL)

Equipment: microTOF2-kp made by Bruker Daltonics

Column: Cadenza CD-C18 3 μm 2 mm×150 mm

Mobile phase: (Mobile phase A) 0.1% aqueous formic acid solution, (Mobile phase B) methanol Gradient (B Conc.): 0 min (50%)—5.7 min (60%)—14.2 min (60%)—17 min (100%)—21.6 min (100%)—27.2 min (50%)—34 min (50%)

Ionization method: ESI

Detection condition: Negative mode (3) Confirmation of Reaction

Identification was performed by measuring under the following conditions by infrared spectroscopy (IR).

Infrared spectroscopy (IR)

Equipment: Perkin Elmer System 2000 Infrared spectrometer

Method: KBr method

Total number of times: 64 scans (resolution 4 cm$^{-1}$)

The presence or absence of absorption around 1778 cm$^{-1}$ and around 1714 cm$^{-1}$ was confirmed.

∘: Presence (reaction progressed)

x: Absence (no reaction progressed)

[Epoxy Resin-Cured Product Evaluation Method]

(1) Reactivity

Each of epoxy resin-cured products obtained by Examples was subjected to transmitted infrared absorption spectrum (IR) measurement under the following conditions, and the absorbance ratio of the glycidyl group was obtained.

Absorption derived from the glycidyl group is usually detected in a wavenumber region of 900 to 950 cm$^{-1}$. A line linearly connecting bases on both sides of an absorption peak detected at such wavenumber was used as a baseline, and a length from an intersection of a line that was drawn perpendicular to the baseline from the apex of the peak, to the apex of the peak was calculated as an absorbance.

Infrared spectroscopy (IR)

Equipment: Perkin Elmer System 2000 Infrared spectrometer

Method: KBr method

Total number of times: 64 scans (resolution 4 cm$^{-1}$)

Next, details of a method of calculating a reaction rate of the glycidyl group will be described.

First, each of epoxy resin solutions obtained by Examples was mixed with KBr powder to prepare a sample for IR measurement, and the measurement was performed. It was confirmed that the intensity of the peak showing the highest absorbance in the obtained spectra was within the absorbance range of 0.8 to 1.0, and an absorbance α of the glycidyl group was determined. Next, this sample was heat-treated in an oven at a temperature of 300° C. under a nitrogen stream for 2 hours to allow the curing reaction to proceed completely. This cured sample was subjected to IR measurement by the same method, and an absorbance α' at the wavenumber arising from the glycidyl group was determined. At this time, the reaction rate of the sample was calculated from the following formula, assuming that the reaction rate of the glycidyl group before the curing reaction was 0%.

Reaction rate (%)={1−(α'/α)}×100

⊙: 90% or more and 100% or less (best);

∘: 80% or more and less than 90% (good);

Δ: 70% or more and less than 80% (no problem in practical use); and x: Less than 70% (problem in practical use).

(2) Glass Transition Temperature (Tg)

Identification was performed by measuring under the following conditions with a differential scanning calorimetry device (DSC).

Equipment: Perkin Elmer DSC 7

Heating rate: 20° C./min

The temperature was increased from 25° C. to 300° C., lowered, and thereafter increased again from 25° C. to 300° C., and the starting temperature in a discontinuous change derived from the transition temperature in the obtained temperature rise curve was set as a glass transition temperature (Tg).

In a case of using "jER828: Bisphenol A type epoxy resin, made by Mitsubishi Chemical Corporation" as the epoxy resin, ⊙: 160° C.≤Tg (best);

∘: 150° C.≤Tg<160° C. (good);

Δ: 140° C.≤Tg<150° C. (no problem in practical use); and x: Tg<140° C. (problem in practical use).

In a case of using "EOCN-1020-55: o-Cresol novolac type epoxy resin, made by Nippon Kayaku Co., Ltd." as the epoxy resin, ⊙: 170° C.≤Tg (best);

∘: 160° C.≤Tg<170° C. (good);

Δ: 150° C.≤Tg<160° C. (no problem in practical use); and x: Tg<150° C. (problem in practical use).

(3) Dielectric Properties (Dielectric Constant, Dielectric Loss Tangent)

Evaluation was performed by measuring under the following conditions with an impedance analyzer.

Impedance Analyzer

Equipment: E4991A RF Impedance/Material Analyzer made by Agilent Technologies Japan, Ltd.

Sample dimensions: length 20 mm×width 20 mm×thickness 150 μm

Frequency: 1 GHz

Measurement temperature: 23° C.

Test environment: 23° C.±1° C., 50% RH±5% RH

In a case of using "jER828: Bisphenol A type epoxy resin, made by Mitsubishi Chemical Corporation" as the epoxy resin, ⊙: Dielectric constant≤2.8 (best);

○: 2.8<Dielectric constant≤3.2 (good);

Δ: 3.2<Dielectric constant≤3.3 (no problem in practical use); and x: 3.3<Dielectric constant (problem in practical use).

⊙: Dielectric loss tangent≤0.0175 (best);

○: 0.0175<Dielectric loss tangent≤0.020 (good);

Δ: 0.020<Dielectric loss tangent≤0.030 (no problem in practical use); and x: 0.035<Dielectric loss tangent (problem in practical use).

In a case of using "EOCN-1020-55: o-Cresol novolac type epoxy resin, made by Nippon Kayaku Co., Ltd." as the epoxy resin, ⊙: Dielectric constant≤3.0 (best);

○: 3.0<Dielectric constant≤3.3 (good);

Δ: 3.3<Dielectric constant≤3.4 (no problem in practical use); and x: 3.4<Dielectric constant (problem in practical use).

⊙: Dielectric loss tangent≤0.0195 (best);

○: 0.0195<Dielectric loss tangent≤0.030 (good);

Δ: 0.030<Dielectric loss tangent≤0.042 (no problem in practical use); and x: 0.042<Dielectric loss tangent (problem in practical use).

[Epoxy Resin Solution Evaluation Method]

(1) Viscosity of Epoxy Resin Solution

The viscosity (Pa·s) of the epoxy resin solution obtained in each Example was measured at 30° C. using a Brookfield Digital Viscometer (Toki Sangyo TVB-15M).

(2) Solubility of Imide Group-Containing Curing Agent Contained in Epoxy Resin Solution The presence or absence of undissolved components (residues) in the epoxy resin solution obtained in each Example was visually observed.

○ (Soluble): No undissolved residue; completely dissolved within 10 minutes.

Δ (Soluble): No undissolved residue; completely dissolved in more than 10 minutes (the dissolution requires time).

x (Insoluble): Undissolved residues are present.

B. Raw Materials (1) Imide Group-Containing Curing Agent

[Preparation of Diimide Dicarboxylic Acid]

Synthesis Example A-1

A diimide dicarboxylic acid was prepared based on the above-mentioned "Preparation method of imide group-containing curing agent". The details are as follows.

To a pulverizing chamber, 669 parts by mass of granular trimellitic anhydride and 331 parts by mass of p-phenylenediamine were added, and then subjected to mixing/pulverization.

Subsequently, the mixture was transferred to a glass container and subjected to an imidization reaction in an inert oven at 300° C. for 2 hours in a nitrogen atmosphere to prepare an imide group-containing curing agent.

Synthesis Examples A-2 to A-16

An imide group-containing curing agent was obtained by performing the same operation as in Synthesis Example A-1, except that the composition of the diamine was changed.

Synthesis Example B-1

A diimide dicarboxylic acid was prepared based on the above-mentioned "Preparation method of imide group-containing curing agent". The details are as follows.

To a pulverizing chamber, 444 parts by mass of granular pyromellitic anhydride and 556 parts by mass of 4-aminobenzoic acid were added, and then subjected to mixing/pulverization.

Subsequently, the mixture was transferred to a glass container and subjected to an imidization reaction in an inert oven at 300° C. for 2 hours in a nitrogen atmosphere to prepare an imide group-containing curing agent.

Synthesis Examples B-2 to B-6

An imide group-containing curing agent was obtained by performing the same operation as in Synthesis Example B-1, except that the composition of the acid dianhydride was changed.

[Preparation of Diimide Tricarboxylic Acid]

Synthesis Example C-1

A diimide tricarboxylic acid was prepared based on the above-mentioned "Preparation method of imide group-containing curing agent". The details are as follows.

To a pulverizing chamber, 716 parts by mass of granular trimellitic anhydride and 284 parts by mass of 3,4-diaminobenzoic acid were added, and then subjected to mixing/pulverization.

Subsequently, the mixture was transferred to a glass container and subjected to an imidization reaction in an inert oven at 300° C. for 2 hours in a nitrogen atmosphere to prepare an imide group-containing curing agent.

Synthesis Examples C-2 to C-4

An imide group-containing curing agent was obtained by performing the same operation as in Synthesis Example C-1, except that the composition of the diamine was changed.

[Preparation of Diimide Tetracarboxylic Acid]

Synthesis Example D-1

A diimide tetracarboxylic acid was prepared based on the above-mentioned "Preparation method of imide group-containing curing agent". The details are as follows.

To a pulverizing chamber, 377 parts by mass of granular pyromellitic anhydride and 623 parts by mass of 2-aminoterephthalic acid were added, and then subjected to mixing/pulverization.

Subsequently, the mixture was transferred to a glass container and subjected to an imidization reaction in an inert oven at 300° C. for 2 hours in a nitrogen atmosphere to prepare an imide group-containing curing agent.

Synthesis Examples D-2 to D-28

An imide group-containing curing agent was obtained by performing the same operation as in Synthesis Example D-1, except that the compositions of the acid dianhydride and monoamine were changed.

[Preparation of Monoimide Dicarboxylic Acid]

Synthesis Example E-1

A monoimide dicarboxylic acid was prepared based on the above-mentioned "Preparation method of imide group-containing curing agent". The details are as follows.

To a pulverizing chamber, 584 parts by mass of granular trimellitic anhydride and 416 parts by mass of 2-aminobenzoic acid were added, and then subjected to mixing/pulverization.

Subsequently, the mixture was transferred to a glass container and subjected to an imidization reaction in an inert oven at 300° C. for 2 hours in a nitrogen atmosphere to prepare an imide group-containing curing agent.

Synthesis Examples E-2 to E-17

An imide group-containing curing agent was obtained by performing the same operation as in Synthesis Example E-1, except that the composition of the monoamine was changed.

[Preparation of Monoimide Tricarboxylic Acid]

Synthesis Example F-1

A monoimide tricarboxylic acid was prepared based on the above-mentioned "Preparation method of imide group-containing curing agent". The details are as follows.

To a pulverizing chamber, 515 parts by mass of granular trimellitic anhydride and 485 parts by mass of 2-aminoterephthalic acid were added, and then subjected to mixing/pulverization.

Subsequently, the mixture was transferred to a glass container and subjected to an imidization reaction in an inert oven at 300° C. for 2 hours in a nitrogen atmosphere to prepare an imide group-containing curing agent.

Synthesis Examples F-2 to F-4

An imide group-containing curing agent was obtained by performing the same operation as in Synthesis Example F-1, except that the composition of the monoamine was changed.

[Preparation of Triimide Tricarboxylic Acid]

Synthesis Example G-1

A triimide tricarboxylic acid was prepared based on the above-mentioned "Preparation method of imide group-containing curing agent". The details are as follows.

To a pulverizing chamber, 824 parts by mass of granular trimellitic anhydride and 176 parts by mass of 1,3,5-triaminobenzene were added, and then subjected to mixing/pulverization.

Subsequently, the mixture was transferred to a glass container and subjected to an imidization reaction in an inert oven at 300° C. for 2 hours in a nitrogen atmosphere to prepare an imide group-containing curing agent.

Synthesis Examples G-2 to G-9

An imide group-containing curing agent was obtained by performing the same operation as in Synthesis Example G-1, except that the composition of the triamine was changed.

[Preparation of Tetraimide Tetracarboxylic Acid]

Synthesis Example H-1

A tetraimide tetracarboxylic acid was prepared based on the above-mentioned "Preparation method of imide group-containing curing agent". The details are as follows.

To a pulverizing chamber, 782 parts by mass of granular trimellitic anhydride and 218 parts by mass of 3,3'-diaminobenzidine were added, and then subjected to mixing/pulverization.

Subsequently, the mixture was transferred to a glass container and subjected to an imidization reaction in an inert oven at 300° C. for 2 hours in a nitrogen atmosphere to prepare an imide group-containing curing agent.

Synthesis Example H-2

An imide group-containing curing agent was obtained by performing the same operation as in Synthesis Example H-1, except that the composition of the tetraamine was changed.

[Preparation of Amide Group-Containing Diimide Dicarboxylic Acid]

Synthesis Example I-1

An amide group-containing diimide dicarboxylic acid was prepared based on the above-mentioned "Preparation method of imide group-containing curing agent". The details are as follows.

To a pulverizing chamber, 628 parts by mass of granular trimellitic anhydride and 372 parts by mass of 4,4'-diaminobenzanilide were added, and then subjected to mixing/pulverization.

Subsequently, the mixture was transferred to a glass container and subjected to an imidization reaction in an inert oven at 300° C. for 2 hours in a nitrogen atmosphere to prepare an imide group-containing curing agent.

[Preparation of Amide Group-Containing Monoimide Dicarboxylic Acid]

Synthesis Example J-1

An amide group-containing monoimide dicarboxylic acid was prepared based on the above-mentioned "Preparation method of imide group-containing curing agent". The details are as follows.

To a pulverizing chamber, 435 parts by mass of granular trimellitic anhydride chloride and 565 parts by mass of 2-aminobenzoic acid were added, and then subjected to mixing/pulverization.

Subsequently, the mixture was transferred to a glass container and subjected to an imidization reaction in an inert oven at 300° C. for 2 hours in a nitrogen atmosphere to prepare an imide group-containing curing agent.

Synthesis Examples J-2 to J-3

An imide group-containing curing agent was obtained by performing the same operation as in Synthesis Example J-1, except that the composition of the aminocarboxylic acid was changed.

[Preparation of Amide Group-Containing Monoimide Tetracarboxylic Acid]

Synthesis Example K-1

An amide group-containing monoimide tetracarboxylic acid was prepared based on the above-mentioned "Preparation method of imide group-containing curing agent". The details are as follows.

To a pulverizing chamber, 368 parts by mass of granular trimellitic anhydride chloride and 632 parts by mass of 2-aminoterephthalic acid were added, and then subjected to mixing/pulverization.

Subsequently, the mixture was transferred to a glass container and subjected to an imidization reaction in an inert oven at 300° C. for 2 hours in a nitrogen atmosphere to prepare an imide group-containing curing agent.

Synthesis Example K-2

An imide group-containing curing agent was obtained by performing the same operation as in Synthesis Example K-1, except that the composition of the aminocarboxylic acid was changed.

[Production of Diimide Dicarboxymonohydroxy-Based Compound]

Synthesis Example L-1

A diimide dicarboxymonohydroxy-based compound was prepared based on the above-mentioned "Preparation method of imide group-containing curing agent". The details are as follows.

To a pulverizing chamber, 755 parts by mass of granular trimellitic anhydride and 245 parts by mass of 3,4-diaminophenol were added, and then subjected to mixing/pulverization.

Subsequently, the mixture was transferred to a glass container and subjected to an imidization reaction in an inert oven at 300° C. for 2 hours in a nitrogen atmosphere to prepare an imide group-containing curing agent.

Synthesis Examples L-2 to L-3

An imide group-containing curing agent was obtained by performing the same operation as in Synthesis Example L-1, except that the composition of the monohydroxydiamine was changed.

[Production of Diimide Dicarboxydihydroxy-Based Compound]

Synthesis Example M-1

A diimide dicarboxydihydroxy-based compound was prepared based on the above-mentioned "Preparation method of imide group-containing curing agent". The details are as follows.

To a pulverizing chamber, 780 parts by mass of granular trimellitic anhydride and 220 parts by mass of 4,6-diaminoresorcin were added, and then subjected to mixing/pulverization.

Subsequently, the mixture was transferred to a glass container and subjected to an imidization reaction in an inert oven at 300° C. for 2 hours in a nitrogen atmosphere to prepare an imide group-containing curing agent.

Synthesis Examples M-2 to M-3

An imide group-containing curing agent was obtained by performing the same operation as in Synthesis Example M-1, except that the composition of the dihydroxydiamine was changed.

[Triimide Tricarboxymonohydroxy-Based Compound]

Synthesis Example N-1

A triimide tricarboxymonohydroxy-based compound was prepared based on the above-mentioned "Preparation method of imide group-containing curing agent". The details are as follows.)

To a pulverizing chamber, 806 parts by mass of granular trimellitic anhydride and 194 parts by mass of 2,4,6-triaminophenol were added, and then subjected to mixing/pulverization.

Subsequently, the mixture was transferred to a glass container and subjected to an imidization reaction in an inert oven at 300° C. for 2 hours in a nitrogen atmosphere to prepare an imide group-containing curing agent.

(2) Epoxy Resin jER828: Bisphenol A type epoxy resin, made by Mitsubishi Chemical Corporation, epoxy equivalent 184 to 194 g/eq EOCN-1020-55: o-Cresol novolac type epoxy resin, made by Nippon Kayaku Co., Ltd., epoxy equivalent 195 g/eq (3) Curing Agents Other than Imide-Based Curing Agent PHENOLITE TD-2131: Novolac type phenol resin, made by DIC, an imide group-free curing agent; the curing agent has the following structural formula.

[Chem. 5]

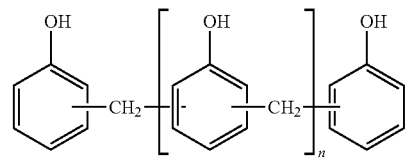

HN-2000: Alicyclic acid anhydride, made by Hitachi Chemical Co., Ltd., an imide group-free curing agent; the curing agent has the following structural formula.

[Chem. 6]

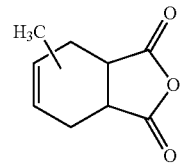

HN-5500: Alicyclic acid anhydride, made by Hitachi Chemical Co., Ltd., an imide group-free curing agent; the curing agent has the following structural formula.

[Chem. 7]

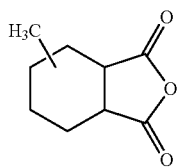

EH-3636AS: Dicyandiamide, made by ADEKA Corporation, an imide group-free curing agent; the curing agent has the following structural formula.

[Chem. 8]

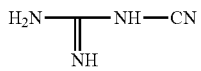

Example A-1

With 60 parts by mass of a sample obtained by mixing the imide group-containing curing agent obtained in Synthesis Example A-1 and the epoxy resin (jER828) at a ratio of 1.0/1.1 (equivalent ratio) mixed were 0.2 parts by mass of a curing accelerator (2-ethyl-4-methylimidazole, made by Tokyo Chemical Industry Co., Ltd.) and 39.8 parts by mass of dimethylformamide (DMF), and the mixture was subjected to reflux heating at 150° C. for 0.5 hours to obtain an epoxy resin solution).

The epoxy resin solution obtained in the Example had a viscosity of 50 Pa·s and had adequately good working properties.

An aluminum substrate was coated with the obtained epoxy resin solution so as to have a thickness of 300 μm, and the produced coating film was dried in an inert oven at 180° C. for 2 hours and then at 200° C. for 2 hours in a nitrogen atmosphere to remove solvents and perform curing reaction. The aluminum substrate was removed from the obtained sample with the aluminum substrate to obtain an epoxy resin-cured product.

Examples A-2 to N-1 and Comparative Examples 1 to 4

An epoxy resin solution and an epoxy resin-cured product were prepared by performing the same operations as in Example A-1, except that the composition was changed to that listed in the table. The imide group-containing curing agent used in each Example was obtained in Synthetic Example having the same number as the Example number.

The reaction rate of the glycidyl group in the epoxy resin contained in the epoxy resin solution obtained in any of Examples A-2 to N-1 was 10% or less.

The epoxy resin solutions obtained in Examples A-2 to N-1 each had a viscosity of 30 to 70 Pa·s, and had adequately good working properties.

The characteristic values of the curing agent in each Example or Comparative Example and the characteristic values of the obtained epoxy resin solution and epoxy resin-cured product are shown in Tables 1 to 15.

TABLE 1

| | | | Diimide dicarboxylic acid-based compound | | | | |
| | | | Mixing ratio (part(s) by mass) | | | Functional | |
| | | Raw materials | Acid | Amine | Molecular | group | Reaction |
| Examples | Acid component | Amine component | component | component | weight | equivalent | confirmation |
|---|---|---|---|---|---|---|---|
| A-1 | Trimellitic | p-Phenylenediamine | 669 | 331 | 456.4 | 228 | ○ |
| A-2 | anhydride | m-Phenylenediamine | 669 | 331 | 456.4 | 228 | ○ |
| A-3 | | 4,4'-Diaminodiphenyl ether | 521 | 479 | 548.5 | 274 | ○ |
| A-4 | | 3,4'-Diaminodiphenyl ether | 521 | 479 | 548.5 | 274 | ○ |
| A-5 | | 1,4-Bis(4-aminophenoxy)benzene | 427 | 573 | 640.6 | 320 | ○ |
| A-6 | | 1,3-Bis(4-aminophenoxy)benzene | 427 | 573 | 640.6 | 320 | ○ |
| A-7 | | 4,4'-Bis(4-aminophenoxy)biphenyl | 372 | 628 | 716.7 | 358 | ○ |
| A-8 | | 4,4'-Bis(3-aminophenoxy)biphenyl | 372 | 628 | 716.7 | 358 | ○ |
| A-9 | | 2,2-Bis[4-(4-aminophenoxy)phenyl]propane | 347 | 653 | 758.7 | 379 | ○ |
| A-10 | | Bis(4-aminophenyl)sulfone | 468 | 532 | 596.5 | 298 | ○ |
| A-11 | | Bis[4-(4-aminophenoxy)phenyl]sulfone | 335 | 665 | 780.7 | 390 | ○ |
| A-12 | | 9,9-Bis(4-aminophenyl)fluorene | 385 | 615 | 696.7 | 348 | ○ |
| A-13 | | trans-1,4-Cyclohexanediamine | 656 | 344 | 462.4 | 231 | ○ |
| A-14 | | 4,4'-Methylenebis(cyclohexylamine) | 509 | 491 | 558.6 | 279 | ○ |
| A-15 | | 1,4-Bis(aminomethyl)cyclohexane | 605 | 395 | 490.5 | 245 | ○ |
| A-16 | | Meta-xylenediamine | 616 | 384 | 484.4 | 242 | ○ |

TABLE 1-continued

| | Diimide dicarboxylic acid-based compound | | | | | | | | | |
|---|---|---|---|---|---|---|---|---|---|---|
| | | jER828 | | | | | o-Cresol novolac type epoxy resin | | | |
| | | | Dielectric properties | | | | | Dielectric properties | | |
| | | | (1 GHz) | | | | | | | |
| Examples | Reactivity | Tg (° C.) | Dielectric constant | Dielectric loss tangent | Solubility | Reactivity | Tg (° C.) | Dielectric constant | Dielectric loss tangent | Solubility |
| A-1 | ⊙ | 226⊙ | 2.39⊙ | 0.0149⊙ | ○ | ⊙ | 236⊙ | 2.59⊙ | 0.0169⊙ | ○ |
| A-2 | ⊙ | 220⊙ | 2.36⊙ | 0.0146⊙ | ○ | ⊙ | 230⊙ | 2.56⊙ | 0.0166⊙ | ○ |
| A-3 | ⊙ | 197⊙ | 2.49⊙ | 0.0156⊙ | ○ | ⊙ | 207⊙ | 2.69⊙ | 0.0176⊙ | ○ |
| A-4 | ⊙ | 190⊙ | 2.60⊙ | 0.0169⊙ | ○ | ⊙ | 200⊙ | 2.80⊙ | 0.0189⊙ | ○ |
| A-5 | ⊙ | 228⊙ | 2.30⊙ | 0.0139⊙ | ○ | ⊙ | 238⊙ | 2.50⊙ | 0.0159⊙ | ○ |
| A-6 | ⊙ | 190⊙ | 2.34⊙ | 0.0143⊙ | ○ | ⊙ | 200⊙ | 2.54⊙ | 0.0163⊙ | ○ |
| A-7 | ⊙ | 238⊙ | 2.29⊙ | 0.0138⊙ | ○ | ⊙ | 248⊙ | 2.49⊙ | 0.0158⊙ | ○ |
| A-8 | ⊙ | 228⊙ | 2.40⊙ | 0.0149⊙ | ○ | ⊙ | 238⊙ | 2.60⊙ | 0.0169⊙ | ○ |
| A-9 | ⊙ | 178⊙ | 2.79⊙ | 0.0173⊙ | ○ | ⊙ | 188⊙ | 2.99⊙ | 0.0193⊙ | ○ |
| A-10 | ⊙ | 198⊙ | 2.60⊙ | 0.0154⊙ | ○ | ⊙ | 208⊙ | 2.80⊙ | 0.0174⊙ | ○ |
| A-11 | ⊙ | 170⊙ | 2.62⊙ | 0.0156⊙ | ○ | ⊙ | 180⊙ | 2.82⊙ | 0.0176⊙ | ○ |
| A-12 | ⊙ | 201⊙ | 2.50⊙ | 0.0144⊙ | ○ | ⊙ | 211⊙ | 2.70⊙ | 0.0164⊙ | ○ |
| A-13 | ⊙ | 167⊙ | 2.45⊙ | 0.0139⊙ | ○ | ⊙ | 177⊙ | 2.65⊙ | 0.0159⊙ | ○ |
| A-14 | ⊙ | 156○ | 2.39⊙ | 0.0134⊙ | ○ | ⊙ | 166○ | 2.59⊙ | 0.0154⊙ | ○ |
| A-15 | ⊙ | 140▲ | 2.35⊙ | 0.0130⊙ | ○ | ⊙ | 150▲ | 2.55⊙ | 0.0150⊙ | ○ |
| A-16 | ⊙ | 162⊙ | 2.55⊙ | 0.0150⊙ | ○ | ⊙ | 172⊙ | 2.75⊙ | 0.0170⊙ | ○ |

TABLE 2

| | Diimide dicarboxylic acid-based compound | | | | | | |
|---|---|---|---|---|---|---|---|
| | | | Mixing ratio (part(s) by mass) | | | Functional | |
| | Raw materials | | Acid | Amine | Molecular | group | Reaction |
| Examples | Acid component | Amine component | component | component | weight | equivalent | confirmation |
| B-1 | Pyromellitic anhydride | 4-Aminobenzoic acid | 444 | 556 | 456.4 | 228 | ○ |
| B-2 | 3,3',4,4'-Biphenyltetracarboxylic dianhydride | | 518 | 482 | 456.4 | 228 | ○ |
| B-3 | 2,3,3',4'-Biphenyltetracarboxylic dianhydride | | 518 | 482 | 548.5 | 274 | ○ |
| B-4 | 3,3',4,4'-Benzophenone tetracarboxylic dianhydride | | 541 | 459 | 548.5 | 274 | ○ |
| B-5 | 4,4'-Oxydiphtalic anhydride | | 531 | 469 | 640.6 | 320 | ○ |
| B-6 | 4,4'-(Hexafluoroisopropyridene)diphthalic anhydride | | 619 | 381 | 640.6 | 320 | ○ |

| | jER828 | | | | | o-Cresol novolac type epoxy resin | | | |
|---|---|---|---|---|---|---|---|---|---|
| | | Dielectric properties | | | | | Dielectric properties | | |
| | | (1 GHz) | | | | | | | |
| Examples | Reactivity | Tg (° C.) | Dielectric constant | Dielectric loss tangent | Solubility | Reactivity | Tg (° C.) | Dielectric constant | Dielectric loss tangent | Solubility |
| B-1 | ⊙ | 225⊙ | 2.39⊙ | 0.0122⊙ | ○ | ⊙ | 235⊙ | 2.59⊙ | 0.0132⊙ | ○ |
| B-2 | ⊙ | 232⊙ | 2.58⊙ | 0.0132⊙ | ○ | ⊙ | 242⊙ | 2.78⊙ | 0.0142⊙ | ○ |
| B-3 | ⊙ | 228⊙ | 2.48⊙ | 0.0142⊙ | ○ | ⊙ | 238⊙ | 2.68⊙ | 0.0152⊙ | ○ |
| B-4 | ⊙ | 229⊙ | 2.47⊙ | 0.0145⊙ | ○ | ⊙ | 239⊙ | 2.67⊙ | 0.0155⊙ | ○ |
| B-5 | ⊙ | 224⊙ | 2.55⊙ | 0.0143⊙ | ○ | ⊙ | 234⊙ | 2.75⊙ | 0.0153⊙ | ○ |
| B-6 | ⊙ | 228⊙ | 2.45⊙ | 0.0133⊙ | ○ | ⊙ | 238⊙ | 2.65⊙ | 0.0143⊙ | ○ |

TABLE 3

Diimide tricarboxylic acid-based compound

| Examples | Raw materials Acid component | Raw materials Amine component | Mixing ratio (part(s) by mass) Acid component | Mixing ratio (part(s) by mass) Amine component | Molecular weight | Functional group equivalent | Reaction confirmation |
|---|---|---|---|---|---|---|---|
| C-1 | Trimellitic anhydride | 3,4-Diaminobenzoic acid | 716 | 284 | 500.4 | 167 | ○ |
| C-2 | | 3,5-Diaminobenzoic acid | 716 | 284 | 500.4 | 167 | ○ |
| C-3 | | 2,5-Diaminobenzoic acid | 716 | 284 | 500.4 | 167 | ○ |
| C-4 | | 3,5-Bis(4-aminophenoxy)benzoic acid | 533 | 467 | 684.6 | 228 | ○ |

| Examples | jER828 Reactivity | jER828 Tg (° C.) | jER828 Dielectric properties (1 GHz) Dielectric constant | jER828 Dielectric properties (1 GHz) Dielectric loss tangent | jER828 Solubility | o-Cresol novolac type epoxy resin Reactivity | o-Cresol novolac type epoxy resin Tg (° C.) | o-Cresol novolac type epoxy resin Dielectric properties Dielectric constant | o-Cresol novolac type epoxy resin Dielectric properties Dielectric loss tangent | o-Cresol novolac type epoxy resin Solubility |
|---|---|---|---|---|---|---|---|---|---|---|
| C-1 | ◉ | 187◉ | 2.69◉ | 0.0156◉ | ○ | ◉ | 197◉ | 2.89◉ | 0.0166◉ | ○ |
| C-2 | ◉ | 190◉ | 2.75◉ | 0.0180◉ | ○ | ◉ | 200◉ | 2.95◉ | 0.0190◉ | ○ |
| C-3 | ◉ | 185◉ | 2.70◉ | 0.0176○ | ○ | ◉ | 195◉ | 2.90◉ | 0.0186◉ | ○ |
| C-4 | ◉ | 183◉ | 2.66◉ | 0.0188○ | ○ | ◉ | 193◉ | 2.86◉ | 0.0198○ | ○ |

TABLE 4

Diimide tetracarboxylic acid-based compound

| Examples | Raw materials Acid component | Raw materials Amine component | Mixing ratio (part by mass) Acid component | Mixing ratio (part by mass) Amine component | Molecular weight | Functional group equivalent |
|---|---|---|---|---|---|---|
| D-1 | Pyromellitic anhydride | 2-Aminoterephthalic acid | 377 | 623 | 544.4 | 136 |
| D-2 | | 5-Aminoisophthalic acid | 377 | 623 | 544.4 | 136 |
| D-3 | | 3-Aminophthalic acid | 377 | 623 | 544.4 | 136 |
| D-4 | | 4-Aminophthalic acid | 377 | 623 | 544.4 | 136 |
| D-5 | 3,3',4,4'-Biphenyltetracarboxylic dianhydride | 2-Aminoterephthalic acid | 449 | 551 | 620.5 | 155 |
| D-6 | | 5-Aminoisophthalic acid | 449 | 551 | 620.5 | 155 |
| D-7 | | 3-Aminophthalic acid | 449 | 551 | 620.5 | 155 |
| D-8 | | 4-Aminophthalic acid | 449 | 551 | 620.5 | 155 |
| D-9 | 2,3,3',4'-Biphenyltetracarboxylic dianhydride | 2-Aminoterephthalic acid | 449 | 551 | 620.5 | 155 |
| D-10 | | 5-Aminoisophthalic acid | 449 | 551 | 620.5 | 155 |
| D-11 | | 3-Aminophthalic acid | 449 | 551 | 620.5 | 155 |
| D-12 | | 4-Aminophthalic acid | 449 | 551 | 620.5 | 155 |
| D-13 | 3,3',4,4'-Benzophenone-tetracarboxylic dianhydride | 2-Aminoterephthalic acid | 471 | 529 | 648.5 | 162 |
| D-14 | | 5-Aminoisophthalic acid | 471 | 529 | 648.5 | 162 |
| D-15 | | 3-Aminophthalic acid | 471 | 529 | 648.5 | 162 |
| D-16 | | 4-Aminophthalic acid | 471 | 529 | 648.5 | 162 |
| D-17 | 4,4'-Oxydiphthalic anhydride | 2-Aminoterephthalic acid | 462 | 538 | 636.5 | 159 |
| D-18 | | 5-Aminoisophthalic acid | 462 | 538 | 636.5 | 159 |
| D-19 | | 3-Aminophthalic acid | 462 | 538 | 636.5 | 159 |
| D-20 | | 4-Aminophthalic acid | 462 | 538 | 636.5 | 159 |
| D-21 | 4,4'-(Hexafluoroisopropyridene)diphthalic anhydride | 2-Aminoterephthalic acid | 552 | 448 | 770.5 | 193 |
| D-22 | | 5-Aminoisophthalic acid | 552 | 448 | 770.5 | 193 |
| D-23 | | 3-Aminophthalic acid | 552 | 448 | 770.5 | 193 |
| D-24 | | 4-Aminophthalic acid | 552 | 448 | 770.5 | 193 |
| D-25 | 4,4'-(4,4'-Isopropyridene-diphenoxy)diphthalic anhydride | 2-Aminoterephthalic acid | 590 | 410 | 846.8 | 212 |
| D-26 | | 5-Aminoisophthalic acid | 590 | 410 | 846.8 | 212 |
| D-27 | | 3-Aminophthalic acid | 590 | 410 | 846.8 | 212 |
| D-28 | | 4-Aminophthalic acid | 590 | 410 | 846.8 | 212 |

TABLE 4-continued

Diimide tetracarboxylic acid-based compound

| | | | jER828 | | | | | o-Cresol novolac type epoxy resin | | |
| | | | | Dielectric properties | | | | | Dielectric properties | |
| | | | | (1 GHz) | | | | | | |
| Examples | Reaction confirmation | Reactivity | Tg (° C.) | Dielectric constant | Dielectric loss tangent | Solubility | Reactivity | Tg (° C.) | Dielectric constant | Dielectric loss tangent | Solubility |
|---|---|---|---|---|---|---|---|---|---|---|---|
| D-1 | ○ | ⊙ | 220⊙ | 2.58⊙ | 0.0183○ | ○ | ⊙ | 230⊙ | 2.78⊙ | 0.0233○ | ○ |
| D-2 | ○ | ⊙ | 232⊙ | 2.68⊙ | 0.0187○ | ○ | ⊙ | 242⊙ | 2.88⊙ | 0.0237○ | ○ |
| D-3 | ○ | ⊙ | 226⊙ | 2.65⊙ | 0.0195○ | ○ | ⊙ | 236⊙ | 2.85⊙ | 0.0245○ | ○ |
| D-4 | ○ | ⊙ | 229⊙ | 2.58⊙ | 0.0202Δ | ○ | ⊙ | 239⊙ | 2.78⊙ | 0.0252○ | ○ |
| D-5 | ○ | ⊙ | >350⊙ | 2.30⊙ | 0.0119⊙ | ○ | ⊙ | >350⊙ | 2.50⊙ | 0.0169⊙ | ○ |
| D-6 | ○ | ⊙ | >350⊙ | 2.34⊙ | 0.0123⊙ | ○ | ⊙ | >350⊙ | 2.54⊙ | 0.0173⊙ | ○ |
| D-7 | ○ | ⊙ | >350⊙ | 2.29⊙ | 0.0118⊙ | ○ | ⊙ | >350⊙ | 2.49⊙ | 0.0168⊙ | ○ |
| D-8 | ○ | ⊙ | >350⊙ | 2.32⊙ | 0.0121⊙ | ○ | ⊙ | >350⊙ | 2.52⊙ | 0.0171⊙ | ○ |
| D-9 | ○ | ⊙ | 310⊙ | 2.30⊙ | 0.0119⊙ | ○ | ⊙ | 320⊙ | 2.50⊙ | 0.0169⊙ | ○ |
| D-10 | ○ | ⊙ | 299⊙ | 2.28⊙ | 0.0117⊙ | ○ | ⊙ | 309⊙ | 2.48⊙ | 0.0167⊙ | ○ |
| D-11 | ○ | ⊙ | 287⊙ | 2.26⊙ | 0.0115⊙ | ○ | ⊙ | 297⊙ | 2.46⊙ | 0.0165⊙ | ○ |
| D-12 | ○ | ⊙ | 278⊙ | 2.24⊙ | 0.0113⊙ | ○ | ⊙ | 288⊙ | 2.44⊙ | 0.0163⊙ | ○ |
| D-13 | ○ | ⊙ | 225⊙ | 2.42⊙ | 0.0187○ | ○ | ⊙ | 235⊙ | 2.62⊙ | 0.0237○ | ○ |
| D-14 | ○ | ⊙ | 237⊙ | 2.40⊙ | 0.0119⊙ | ○ | ⊙ | 247⊙ | 2.60⊙ | 0.0169⊙ | ○ |
| D-15 | ○ | ⊙ | 231⊙ | 2.38⊙ | 0.0117⊙ | ○ | ⊙ | 241⊙ | 2.58⊙ | 0.0167⊙ | ○ |
| D-16 | ○ | ⊙ | 234⊙ | 2.36⊙ | 0.0115⊙ | ○ | ⊙ | 244⊙ | 2.56⊙ | 0.0165⊙ | ○ |
| D-17 | ○ | ⊙ | 226⊙ | 2.44⊙ | 0.0189○ | ○ | ⊙ | 236⊙ | 2.64⊙ | 0.0239○ | ○ |
| D-18 | ○ | ⊙ | 238⊙ | 2.42⊙ | 0.0123⊙ | ○ | ⊙ | 248⊙ | 2.62⊙ | 0.0173⊙ | ○ |
| D-19 | ○ | ⊙ | 232⊙ | 2.40⊙ | 0.0121⊙ | ○ | ⊙ | 242⊙ | 2.60⊙ | 0.0171⊙ | ○ |
| D-20 | ○ | ⊙ | 235⊙ | 2.38⊙ | 0.0119⊙ | ○ | ⊙ | 245⊙ | 2.58⊙ | 0.0169⊙ | ○ |
| D-21 | ○ | ⊙ | 229⊙ | 2.58⊙ | 0.0220Δ | ○ | ⊙ | 239⊙ | 2.78⊙ | 0.0270○ | ○ |
| D-22 | ○ | ⊙ | 233⊙ | 2.56⊙ | 0.0220Δ | ○ | ⊙ | 243⊙ | 2.76⊙ | 0.0270○ | ○ |
| D-23 | ○ | ⊙ | 236⊙ | 2.54⊙ | 0.0154⊙ | ○ | ⊙ | 246⊙ | 2.74⊙ | 0.0204○ | ○ |
| D-24 | ○ | ⊙ | 228⊙ | 2.52⊙ | 0.0152⊙ | ○ | ⊙ | 238⊙ | 2.72⊙ | 0.0202○ | ○ |
| D-25 | ○ | ⊙ | 225⊙ | 2.60⊙ | 0.0240Δ | ○ | ⊙ | 235⊙ | 2.80⊙ | 0.0290○ | ○ |
| D-26 | ○ | ⊙ | 229⊙ | 2.58⊙ | 0.0240Δ | ○ | ⊙ | 239⊙ | 2.78⊙ | 0.0290○ | ○ |
| D-27 | ○ | ⊙ | 232⊙ | 2.56⊙ | 0.0174⊙ | ○ | ⊙ | 242⊙ | 2.76⊙ | 0.0224○ | ○ |
| D-28 | ○ | ⊙ | 224⊙ | 2.54⊙ | 0.0172⊙ | ○ | ⊙ | 234⊙ | 2.74⊙ | 0.0222○ | ○ |

TABLE 5

Monoimide dicarboxylic acid-based compound

| | Raw materials | | Mixing ratio (part(s) by mass) | | | Functional | |
| Examples | Acid component | Amine component | Acid component | Amine component | Molecular weight | group equivalent | Reaction confirmation |
|---|---|---|---|---|---|---|---|
| E-1 | Trimellitic anhydride | 2-Aminobenzoic acid | 584 | 416 | 311.3 | 156 | ○ |
| E-2 | | 3-Aminobenzoic acid | 584 | 416 | 311.3 | 156 | ○ |
| E-3 | | 4-Aminobenzoic acid | 584 | 416 | 311.3 | 156 | ○ |
| E-4 | | 2-Amino-3-methylbenzoic acid | 560 | 440 | 325.3 | 163 | ○ |
| E-5 | | 2-Amino-4-methylbenzoic acid | 560 | 440 | 325.3 | 163 | ○ |
| E-6 | | 2-Amino-5-methylbenzoic acid | 560 | 440 | 325.3 | 163 | ○ |
| E-7 | | 2-Amino-6-methylbenzoic acid | 560 | 440 | 325.3 | 163 | ○ |
| E-8 | | 3-Amino-2-methylbenzoic acid | 560 | 440 | 325.3 | 163 | ○ |
| E-9 | | 3-Amino-4-methylbenzoic acid | 560 | 440 | 325.3 | 163 | ○ |
| E-10 | | 4-Amino-2-methylbenzoic acid | 560 | 440 | 325.3 | 163 | ○ |
| E-11 | | 4-Amino-3-methylbenzoic acid | 560 | 440 | 325.3 | 163 | ○ |
| E-12 | | 5-Amino-2-methylbenzoic acid | 560 | 440 | 325.3 | 163 | ○ |
| E-13 | | 2-Amino-3,4-dimethylbenzoic acid | 538 | 462 | 339.3 | 170 | ○ |
| E-14 | | 2-Amino-4,5-dimethylbenzoic acid | 538 | 462 | 339.3 | 170 | ○ |
| E-15 | | 2-Amino-4-methoxybenzoic acid | 535 | 465 | 341.3 | 171 | ○ |
| E-16 | | 3-Amino-4-methoxybenzoic acid | 535 | 465 | 341.3 | 171 | ○ |
| E-17 | | 4-Amino-2-methoxybenzoic acid | 535 | 465 | 341.3 | 171 | ○ |

TABLE 5-continued

Monoimide dicarboxylic acid-based compound

| | | | jER828 | | | | | o-Cresol novolac type epoxy resin | | |
|---|---|---|---|---|---|---|---|---|---|---|
| | | | Dielectric properties (1 GHz) | | | | | Dielectric properties | | |
| Examples | Reactivity | Tg (° C.) | Dielectric constant | Dielectric loss tangent | Solubility | Reactivity | Tg (° C.) | Dielectric constant | Dielectric loss tangent | Solubility |
| E-1 | ⊙ | 194⊙ | 2.58⊙ | 0.0136⊙ | ○ | ⊙ | 204⊙ | 2.78⊙ | 0.0186⊙ | ○ |
| E-2 | ⊙ | 190⊙ | 2.64⊙ | 0.0135⊙ | ○ | ⊙ | 200⊙ | 2.84⊙ | 0.0185⊙ | ○ |
| E-3 | ⊙ | 192⊙ | 2.69⊙ | 0.0144⊙ | ○ | ⊙ | 202⊙ | 2.89⊙ | 0.0194⊙ | ○ |
| E-4 | ⊙ | 186⊙ | 2.55⊙ | 0.0134⊙ | ○ | ⊙ | 196⊙ | 2.75⊙ | 0.0184⊙ | ○ |
| E-5 | ⊙ | 182⊙ | 2.61⊙ | 0.0149⊙ | ○ | ⊙ | 192⊙ | 2.81⊙ | 0.0199○ | ○ |
| E-6 | ⊙ | 184⊙ | 2.66⊙ | 0.0129⊙ | ○ | ⊙ | 194⊙ | 2.86⊙ | 0.0179⊙ | ○ |
| E-7 | ⊙ | 178⊙ | 2.56⊙ | 0.0133⊙ | ○ | ⊙ | 188⊙ | 2.76⊙ | 0.0183⊙ | ○ |
| E-8 | ⊙ | 184⊙ | 2.62⊙ | 0.0138⊙ | ○ | ⊙ | 194⊙ | 2.82⊙ | 0.0188⊙ | ○ |
| E-9 | ⊙ | 186⊙ | 2.67⊙ | 0.0137⊙ | ○ | ⊙ | 196⊙ | 2.87⊙ | 0.0187⊙ | ○ |
| E-10 | ⊙ | 180⊙ | 2.58⊙ | 0.0146⊙ | ○ | ⊙ | 190⊙ | 2.78⊙ | 0.0196○ | ○ |
| E-11 | ⊙ | 182⊙ | 2.64⊙ | 0.0136⊙ | ○ | ⊙ | 192⊙ | 2.84⊙ | 0.0186⊙ | ○ |
| E-12 | ⊙ | 185⊙ | 2.69⊙ | 0.0151⊙ | ○ | ⊙ | 195⊙ | 2.89⊙ | 0.0201○ | ○ |
| E-13 | ⊙ | 178⊙ | 2.48⊙ | 0.0131⊙ | ○ | ⊙ | 188⊙ | 2.68⊙ | 0.0181⊙ | ○ |
| E-14 | ⊙ | 175⊙ | 2.44⊙ | 0.0135⊙ | ○ | ⊙ | 185⊙ | 2.64⊙ | 0.0185⊙ | ○ |
| E-15 | ⊙ | 183⊙ | 2.49⊙ | 0.0140⊙ | ○ | ⊙ | 193⊙ | 2.69⊙ | 0.0190⊙ | ○ |
| E-16 | ⊙ | 180⊙ | 2.57⊙ | 0.0139⊙ | ○ | ⊙ | 190⊙ | 2.77⊙ | 0.0189⊙ | ○ |
| E-17 | ⊙ | 185⊙ | 2.56⊙ | 0.0148⊙ | ○ | ⊙ | 195⊙ | 2.76⊙ | 0.0198○ | ○ |

TABLE 6

Monoimide tricarboxylic acid-based compound

| | Raw materials | | Mixing ratio (part(s) by mass) | | | Functional | |
|---|---|---|---|---|---|---|---|
| Examples | Acid component | Amine component | Acid component | Amine component | Molecular weight | group equivalent | Reaction confirmation |
| F-1 | Trimellitic anhydride | 2-Aminoterephthalic acid | 515 | 485 | 355.3 | 118 | ○ |
| F-2 | | 5-Aminoisophthalic acid | 515 | 485 | 355.3 | 118 | ○ |
| F-3 | | 3-Aminophthalic acid | 515 | 485 | 355.3 | 118 | ○ |
| F-4 | | 4-Aminophthalic acid | 515 | 485 | 355.3 | 118 | ○ |

| | | | jER828 | | | | | o-Cresol novolac type epoxy resin | | |
|---|---|---|---|---|---|---|---|---|---|---|
| | | | Dielectric properties (1 GHz) | | | | | Dielectric properties | | |
| Examples | Reactivity | Tg (° C.) | Dielectric constant | Dielectric loss tangent | Solubility | Reactivity | Tg (° C.) | Dielectric constant | Dielectric loss tangent | Solubility |
| F-1 | ⊙ | 176⊙ | 2.79⊙ | 0.0143⊙ | ○ | ⊙ | 186⊙ | 2.99⊙ | 0.0193⊙ | ○ |
| F-2 | ⊙ | 225⊙ | 2.67⊙ | 0.0182○ | ○ | ⊙ | 235⊙ | 2.87⊙ | 0.0232○ | ○ |
| F-3 | ⊙ | 201⊙ | 2.85⊙ | 0.0137⊙ | ○ | ⊙ | 211⊙ | 3.05○ | 0.0187⊙ | ○ |
| F-4 | ⊙ | 213⊙ | 2.70⊙ | 0.0141⊙ | ○ | ⊙ | 223⊙ | 2.9⊙ | 0.0191⊙ | ○ |

TABLE 7

Triimide tricarboxylic acid-based compound

| | Raw materials | | Mixing ratio (part(s) by mass) | | | Functional | |
|---|---|---|---|---|---|---|---|
| Examples | Acid component | Amine component | Acid component | Amine component | Molecular weight | group equivalent | Reaction confirmation |
| G-1 | Trimellitic anhydride | 1,3,5-Triaminobenzene | 824 | 176 | 645.5 | 215 | ○ |
| G-2 | | 1,2,4-Triaminobenzene | 824 | 176 | 645.5 | 215 | ○ |

TABLE 7-continued

Triimide tricarboxylic acid-based compound

| | | | | | | |
|---|---|---|---|---|---|---|
| G-3 | 1,2,3-Triaminobenzene | 824 | 176 | 645.5 | 215 | ○ |
| G-4 | 2-Methyl-1,3,5-benzenetriamine | 808 | 192 | 659.5 | 220 | ○ |
| G-5 | 5-Methyl-1,2,4-benzenetriamine | 808 | 192 | 659.5 | 220 | ○ |
| G-6 | 6-Methyl-1,2,4-benzenetriamine | 808 | 192 | 659.5 | 220 | ○ |
| G-7 | 4-Methyl-1,2,3-benzenetriamine | 808 | 192 | 659.5 | 220 | ○ |
| G-8 | 5-Methyl-1,2,3-benzenetriamine | 808 | 192 | 659.5 | 220 | ○ |
| G-9 | 1,3,5-Tris(4-aminophenyl)benzene | 621 | 379 | 873.8 | 291 | ○ |

| | jER828 | | | | | o-Cresol novolac type epoxy resin | | | |
|---|---|---|---|---|---|---|---|---|---|
| | | | Dielectric properties | | | | | Dielectric properties | |
| | | | (1 GHz) | | | | | | |
| Examples | Reactivity | Tg (° C.) | Dielectric constant | Dielectric loss tangent | Solubility | Reactivity | Tg (° C.) | Dielectric constant | Dielectric loss tangent | Solubility |
| G-1 | ☉ | 300☉ | 2.81○ | 0.0144☉ | ○ | ☉ | 310☉ | 2.91☉ | 0.0164☉ | ○ |
| G-2 | ☉ | 302☉ | 2.73☉ | 0.0122☉ | ○ | ☉ | 312☉ | 2.83☉ | 0.0142☉ | ○ |
| G-3 | ☉ | 305☉ | 2.76☉ | 0.0114☉ | ○ | ☉ | 315☉ | 2.86☉ | 0.0134☉ | ○ |
| G-4 | ☉ | 299☉ | 2.78☉ | 0.0132☉ | ○ | ☉ | 309☉ | 2.88☉ | 0.0152☉ | ○ |
| G-5 | ☉ | 287☉ | 2.80☉ | 0.0116☉ | ○ | ☉ | 297☉ | 2.90☉ | 0.0136☉ | ○ |
| G-6 | ☉ | 296☉ | 3.10○ | 0.0099☉ | ○ | ☉ | 306☉ | 3.20○ | 0.0119☉ | ○ |
| G-7 | ☉ | 303☉ | 2.69☉ | 0.0135☉ | ○ | ☉ | 313☉ | 2.79☉ | 0.0155☉ | ○ |
| G-8 | ☉ | 298☉ | 2.93○ | 0.0189☉ | ○ | ☉ | 308☉ | 3.03○ | 0.0209☉ | ○ |
| G-9 | ☉ | >350☉ | 2.67☉ | 0.0120☉ | ○ | ☉ | >350☉ | 2.77☉ | 0.0140☉ | ○ |

TABLE 8

Tetraimide tetracarboxylic acid-based compound

| | Raw materials | | Mixing ratio (part(s) by mass) | | Molecular weight | Functional group equivalent |
|---|---|---|---|---|---|---|
| Examples | Acid component | Amine component | Acid component | Amine component | | |
| H-1 | Trimellitic anhydride | 3,3'-diaminobenzidine | 782 | 218 | 910.7 | 228 |
| H-2 | | 3,3',4,4'-Tetraaminodiphenylsulfone | 734 | 266 | 974.8 | 244 |

| | jER828 | | | | | | o-Cresol novolac type epoxy resin | | | |
|---|---|---|---|---|---|---|---|---|---|---|
| | | | | Dielectric properties | | | | | Dielectric properties | |
| | | | | (1 GHz) | | | | | | |
| Examples | Reaction confirmation | Reactivity | Tg (° C.) | Dielectric constant | Dielectric loss tangent | Solubility | Reactivity | Tg (° C.) | Dielectric constant | Dielectric loss tangent | Solubility |
| H-1 | ○ | ☉ | >350☉ | 2.820 | 0.0156☉ | ○ | ☉ | >350☉ | 2.84☉ | 0.0176☉ | ○ |
| H-2 | ○ | ☉ | >350☉ | 2.920 | 0.0190☉ | ○ | ☉ | >350☉ | 2.94☉ | 0.0210○ | ○ |

TABLE 9

Amide group-containing diimide dicarboxylic acid-based compound

| | Raw materials | | Mixing ratio (part(s) by mass) | | Molecular weight | Functional group equivalent | Reaction confirmation |
|---|---|---|---|---|---|---|---|
| Examples | Acid component | Amine component | Acid component | Amine component | | | |
| I-1 | Trimellitic anhydride | 4,4'-Diaminobenzanilide | 628 | 372 | 575.5 | 288 | ○ |

| | | jER828 | | | | o-Cresol novolac type epoxy resin | | | |
| | | Dielectric properties (1 GHz) | | | | | Dielectric properties | | |
| Examples | Reactivity | Tg (° C.) | Dielectric constant | Dielectric loss tangent | Solubility | Reactivity | Tg (° C.) | Dielectric constant | Dielectric loss tangent | Solubility |
|---|---|---|---|---|---|---|---|---|---|---|
| I-1 | ⊙ | 236⊙ | 2.35⊙ | 0.0168⊙ | ○ | ⊙ | 246⊙ | 3.15○ | 0.0218○ | ○ |

TABLE 10

Amide group-containing monoimide dicarboxylic acid-based compound

| | Raw materials | | Mixing ratio (part(s) by mass) | | Molecular weight | Functional group equivalent | Reaction confirmation |
|---|---|---|---|---|---|---|---|
| Examples | Acid component | Amine component | Acid component | Amine component | | | |
| J-1 | Trimellitic anhydride chloride | 2-Aminobenzoic acid | 435 | 565 | 430.4 | 215 | ○ |
| J-2 | | 3-Aminobenzoic acid | 435 | 565 | 430.4 | 215 | ○ |
| J-3 | | 4-Aminobenzoic acid | 435 | 565 | 430.4 | 215 | ○ |

| | | jER828 | | | | o-Cresol novolac type epoxy resin | | | |
| | | Dielectric properties (1 GHz) | | | | | Dielectric properties | | |
| Examples | Reactivity | Tg (° C.) | Dielectric constant | Dielectric loss tangent | Solubility | Reactivity | Tg (° C.) | Dielectric constant | Dielectric loss tangent | Solubility |
|---|---|---|---|---|---|---|---|---|---|---|
| J-1 | ⊙ | 220○ | 2.96○ | 0.0131⊙ | ○ | ⊙ | 230⊙ | 3.16○ | 0.0231○ | ○ |
| J-2 | ⊙ | 217○ | 2.94○ | 0.0142⊙ | ○ | ⊙ | 227○ | 3.14○ | 0.0242○ | ○ |
| J-3 | ⊙ | 216○ | 2.81○ | 0.0150⊙ | ○ | ⊙ | 226○ | 3.01○ | 0.0250○ | ○ |

TABLE 11

Amide group-containing monoimide tetracarboxylic acid-based compound

| | Raw materials | | Mixing ratio (part(s) by mass) | | Molecular weight | Functional group equivalent | Reaction confirmation |
|---|---|---|---|---|---|---|---|
| Examples | Acid component | Amine component | Acid component | Amine component | | | |
| K-1 | Trimellitic anhydride chloride | 2-Aminoterephthalic acid | 368 | 632 | 518.4 | 259 | ○ |
| K-2 | | 5-Aminoisophthalic acid | 368 | 632 | 518.4 | 259 | ○ |

TABLE 11-continued

Amide group-containing monoimide tetracarboxylic acid-based compound

| | jER828 | | | | | o-Cresol novolac type epoxy resin | | | | |
|---|---|---|---|---|---|---|---|---|---|---|
| | | Dielectric properties (1 GHz) | | | | | | Dielectric properties | | |
| Examples | Reactivity | Tg (° C.) | Dielectric constant | Dielectric loss tangent | Solubility | Reactivity | Tg (° C.) | Dielectric constant | Dielectric loss tangent | Solubility |
| K-1 | ⊙ | 225 ⊙ | 2.91 ○ | 0.0230 Δ | ○ | ⊙ | 235 ⊙ | 3.11 ○ | 0.0330 Δ | ○ |
| K-2 | ⊙ | 246 ⊙ | 2.90 ○ | 0.0136 ⊙ | ○ | ⊙ | 256 ⊙ | 3.1 ○ | 0.0236 ○ | ○ |

TABLE 12

Diimide dicarboxymonohydroxy-based compound

| | Raw materials | | Mixing ratio (part(s) by mass) | | | Functional | |
|---|---|---|---|---|---|---|---|
| Examples | Acid component | Amine component | Acid component | Amine component | Molecular weight | group equivalent | Reaction confirmation |
| L-1 | Trimellitic anhydride | 3,4-Diaminophenol | 755 | 245 | 472.4 | 157 | ○ |
| L-2 | | 3,5-Diaminophenol | 755 | 245 | 472.4 | 157 | ○ |
| L-3 | | 2,5-Diaminophenol | 755 | 245 | 472.4 | 157 | ○ |

| | jER828 | | | | | o-Cresol novolac type epoxy resin | | | | |
|---|---|---|---|---|---|---|---|---|---|---|
| | | Dielectric properties (1 GHz) | | | | | | Dielectric properties | | |
| Examples | Reactivity | Tg (° C.) | Dielectric constant | Dielectric loss tangent | Solubility | Reactivity | Tg (° C.) | Dielectric constant | Dielectric loss tangent | Solubility |
| L-1 | ⊙ | 183 ⊙ | 2.73 ⊙ | 0.0223 Δ | ○ | ⊙ | 193 ⊙ | 2.93 ⊙ | 0.0223 ○ | ○ |
| L-2 | ⊙ | 199 ⊙ | 2.64 ⊙ | 0.0208 Δ | ○ | ⊙ | 209 ⊙ | 2.84 ⊙ | 0.0208 ○ | ○ |
| L-3 | ⊙ | 190 ⊙ | 2.68 ⊙ | 0.0196 ○ | ○ | ⊙ | 200 ⊙ | 2.88 ⊙ | 0.0196 ○ | ○ |

TABLE 13

Diimide dicarboxydihydroxy-based compound

| | Raw materials | | Mixing ratio (part(s) by mass) | | | Functional |
|---|---|---|---|---|---|---|
| Examples | Acid component | Amine component | Acid component | Amine component | Molecular weight | group equivalent |
| M-1 | Trimellitic anhydride | 4,6-Diaminoresorcin | 780 | 220 | 456.4 | 114 |
| M-2 | | 3,3'-Dihydroxybenzidine | 639 | 361 | 564.4 | 141 |
| M-3 | | 2,2-Bis(3-amino-4-hydroxyphenyl)-Hexafluoropropane | 511 | 489 | 714.5 | 179 |

| | | jER828 | | | | | o-Cresol novolac type epoxy resin | | | | |
|---|---|---|---|---|---|---|---|---|---|---|---|
| | | | Dielectric properties (1 GHz) | | | | | | Dielectric properties | | |
| Examples | Reaction confirmation | Reactivity | Tg (° C.) | Dielectric constant | Dielectric loss tangent | Solubility | Reactivity | Tg (° C.) | Dielectric constant | Dielectric loss tangent | Solubility |
| M-1 | ○ | ⊙ | 233 ⊙ | 2.69 ⊙ | 0.0166 ⊙ | ○ | ⊙ | 243 ⊙ | 2.89 ⊙ | 0.0366 Δ | ○ |
| M-2 | ○ | ⊙ | 244 ⊙ | 2.72 ⊙ | 0.0180 ○ | ○ | ⊙ | 254 ⊙ | 2.92 ⊙ | 0.018 ⊙ | ○ |
| M-3 | ○ | ⊙ | 256 ⊙ | 2.81 ⊙ | 0.0189 ⊙ | ○ | ⊙ | 266 ⊙ | 3.01 ○ | 0.0189 ⊙ | ○ |

TABLE 14

| | | | Mixing ratio (part(s) by mass) | | | Functional | |
|---|---|---|---|---|---|---|---|
| | Raw materials | | Acid | Amine | Molecular | group | Reaction |
| Examples | Acid component | Amine component | component | component | weight | equivalent | confirmation |
| N-1 | Trimellitic anhydride | 2,4,6-Triaminophenol | 806 | 194 | 661.5 | 165 | ◯ |

Triimide tricarboxymonohydroxy-based compound

| | jER828 | | | | | o-Cresol novolac type epoxy resin | | | |
|---|---|---|---|---|---|---|---|---|---|
| | | Dielectric properties (1 GHz) | | | | | Dielectric properties | | |
| Examples | Reactivity | Tg (°C.) | Dielectric constant | Dielectric loss tangent | Solubility | Reactivity | Tg (°C.) | Dielectric constant | Dielectric loss tangent | Solubility |
| N-1 | ⊙ | 278⊙ | 2.88◯ | 0.0168⊙ | ◯ | ⊙ | 288⊙ | 2.98⊙ | 0.0188⊙ | ◯ |

TABLE 15

| | | jER828 | | | | | o-Cresol novolac type epoxy resin | | | |
|---|---|---|---|---|---|---|---|---|---|---|
| | | Dielectric properties (1 GHz) | | | | | Dielectric properties | | | |
| Comparative Examples | Curing agent | Reactivity | Tg (°C.) | Dielectric constant | Dielectric loss tangent | Solubility | Reactivity | Tg (°C.) | Dielectric constant | Dielectric loss tangent | Solubility |
| 1 | PHENOLITE TD-2131 | ◯ | 130X | 3.39X | 0.037X | Δ | ◯ | 140X | 3.59X | 0.040Δ | Δ |
| 2 | HN-2000 | Δ | 136X | 2.90◯ | 0.040X | ◯ | Δ | 146X | 3.12◯ | 0.043X | ◯ |
| 3 | HN-5500 | Δ | 148Δ | 3.00◯ | 0.042X | ◯ | Δ | 158Δ | 3.13◯ | 0.045X | ◯ |
| 4 | EH-3636AS | ◯ | 162⊙ | 3.50X | 0.085X | Δ | ◯ | 172⊙ | 3.64X | 0.088X | Δ |

Since the resin solutions of Examples A-1 to N-1 satisfied the requirements of the present invention, they were adequately excellent in all the properties of glass transition temperature, dielectric constant, and dielectric loss tangent.

Among these Examples, in particular, in all the Examples relating to the diimide dicarboxylic acid-based compound containing an aromatic tricarboxylic acid anhydride component (particularly only an aromatic tricarboxylic acid anhydride component) as a tricarboxylic acid anhydride component and containing an aromatic diamine component (particularly only an aromatic diamine component) as a diamine component, and in all the Examples relating to the diimide dicarboxylic acid-based compound containing an aromatic tetracarboxylic dianhydride component (particularly only an aromatic tetracarboxylic dianhydride component) as a tetracarboxylic dianhydride component and containing an aromatic monoaminomonocarboxylic acid component (particularly only an aromatic monoaminomonocarboxylic acid component) as a monoaminomonocarboxylic acid component, all the evaluation results of Tg and dielectric properties have achieved ⊙.

Since the resin solutions of Comparative Examples 1 to 4 used a curing agent containing no imide group, they were inferior in at least one of the properties of glass transition temperature, dielectric constant, and dielectric loss tangent.

INDUSTRIAL APPLICABILITY

With the epoxy resin solution of the present invention, a cured product more adequately excellent in heat-resisting properties and dielectric properties can be obtained with more adequately good working properties ensured. Therefore, the epoxy resin solution of the present invention is useful in the field of electric and electronic components such as printed wiring boards (particularly insulating materials for printed wiring boards), semiconductor sealing materials and build-up laminated boards, and the field of lightweight and high-strength materials such as carbon fiber reinforced plastics and glass fiber reinforced plastics.

The invention claimed is:

1. An epoxy resin solution containing at least a curing agent and an epoxy resin mixed in an organic solvent, wherein the curing agent comprises an imide group-containing curing agent,
   wherein the imide group-containing curing agent is a diimide dicarboxylic acid-based compound having a structure of following general formula (1),
   wherein a total formulating amount of the imide group-containing curing agent and the epoxy resin is from 50 to 70% by mass based on a total amount of the epoxy resin solution, and
   wherein a reaction rate of a glycidyl group contained in the epoxy resin in the epoxy resin solution is 10% or less,

[Chem. 1]

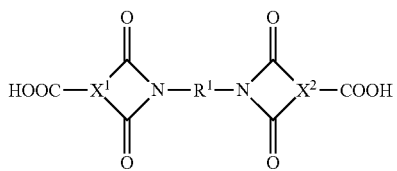

(1)

in the general formula (1), $X^1$ and $X^2$ each independently represent a structure derived from an aromatic tricarboxylic acid anhydride component, an alicyclic tricarboxylic acid anhydride component, or an aliphatic tricarboxylic acid anhydride component; and $R^1$ represents a structure derived from an aromatic diamine component containing 1 to 2 aromatic rings, an alicyclic diamine component, or an aliphatic diamine component.

2. The epoxy resin solution of claim 1, wherein the epoxy resin has two or more epoxy groups in one molecule.

3. The epoxy resin solution of claim 1, wherein the organic solvent is a non-halogenated solvent.

4. The epoxy resin solution of claim 1, wherein a formulating amount of the imide group-containing curing agent is such an amount that the imide group-containing curing agent has a functional group equivalent of 0.5 to 1.5 in terms of equivalent ratio to an epoxy equivalent of the epoxy resin.

5. The epoxy resin solution of claim 1, wherein the curing agent comprises only the imide group-containing curing agent.

6. The epoxy resin solution of claim 1, wherein the imide group-containing curing agent and the epoxy resin are dissolved in the organic solvent.

7. An epoxy resin-cured product, being a cured product of the imide group-containing curing agent and the epoxy resin contained in the epoxy resin solution of claim 1.

8. The epoxy resin-cured product of claim 7, wherein the epoxy resin-cured product is contained in electric and electronic components.

9. A prepreg, wherein the epoxy resin solution of claim 1 is impregnated into or applied to a reinforcing fiber cloth.

10. A laminated body, comprising the prepreg of claim 9 being laminated.

* * * * *